US011742779B2

(12) United States Patent
Reed et al.

(10) Patent No.: US 11,742,779 B2
(45) Date of Patent: Aug. 29, 2023

(54) ELECTROSTATIC MOTOR HAVING FLUID MANAGEMENT FEATURES

(71) Applicant: C-Motive Technologies, Inc., Middleton, WI (US)

(72) Inventors: Justin Kyle Reed, Madison, WI (US); Ryan Knippel, Madison, WI (US); William D. Butrymowicz, Madison, WI (US); Graham T. Reitz, Madison, WI (US); Matthew Maroon, Middleton, WI (US); Baoyun Ge, Madison, WI (US); Daniel Colin Ludois, Middleton, WI (US); Aditya Nandakumar Ghule, Madison, WI (US); Serge Kuro, Madison, WI (US); Kevin Frankforter, Madison, WI (US)

(73) Assignee: C-Motive Technologies, Inc., Middleton, WI (US)

( * ) Notice: Subject to any disclaimer, the term of this patent is extended or adjusted under 35 U.S.C. 154(b) by 266 days.

(21) Appl. No.: 17/141,193

(22) Filed: Jan. 4, 2021

(65) Prior Publication Data
US 2021/0211069 A1 Jul. 8, 2021

Related U.S. Application Data

(60) Provisional application No. 62/956,821, filed on Jan. 3, 2020, provisional application No. 62/956,830, filed on Jan. 3, 2020.

(51) Int. Cl.
*H02N 1/00* (2006.01)
*H02N 2/12* (2006.01)

(52) U.S. Cl.
CPC ............ *H02N 1/006* (2013.01); *H02N 1/002* (2013.01); *H02N 1/004* (2013.01); *H02N 2/12* (2013.01)

(58) Field of Classification Search
CPC ........ H02N 1/006; H02N 1/002; H02N 1/004; H02N 1/12
See application file for complete search history.

(56) References Cited

U.S. PATENT DOCUMENTS

| 2,417,850 A | 3/1947 | Winslow |
| 3,094,653 A | 6/1963 | Le et al. |
(Continued)

FOREIGN PATENT DOCUMENTS

| CN | 1674428 A | 9/2005 |
| JP | H04183793 A | 6/1992 |
(Continued)

OTHER PUBLICATIONS

Buysch, "Ullman's Encyclopedia Of Industrial Chemistry", vol. 7, 2012, pp. 45-71.
(Continued)

*Primary Examiner* — Emily P Pham
(74) *Attorney, Agent, or Firm* — GTC Law Group PC & Affiliates

(57) ABSTRACT

An example electrostatic machine includes a number of stator plates, each having a stator electrode and rotationally fixed to a housing, a shaft at least partially defined within the housing and configured to rotate about an axis, and a number of rotor plates, each having a rotor electrode and rotational fixed to the shaft. The electrostatic machine includes a dielectric fluid disposed in the housing, and that fills a gap between the stator plates and the rotor plates. The electrostatic machine includes a seal associated with the shaft, where the seal includes a material compatible with the dielectric fluid.

47 Claims, 23 Drawing Sheets

(56) References Cited

U.S. PATENT DOCUMENTS

| | | | |
|---|---|---|---|
| 3,400,282 A | 9/1968 | Felici | |
| 3,433,981 A | 3/1969 | Bollee | |
| 3,455,954 A | 7/1969 | Prager | |
| 3,696,258 A | 10/1972 | Anderson et al. | |
| 3,948,788 A | 4/1976 | Munch | |
| 4,672,250 A | 6/1987 | Seitz | |
| 4,814,657 A | 3/1989 | Yano et al. | |
| 5,334,923 A | 8/1994 | Lorenz et al. | |
| 5,437,775 A | 8/1995 | Dittrich et al. | |
| 5,773,782 A * | 6/1998 | Storr | B23H 1/08 252/570 |
| 6,221,970 B1 | 4/2001 | Morken et al. | |
| 6,353,276 B1 | 3/2002 | Gendron | |
| 8,779,647 B2 | 7/2014 | Sashida | |
| 9,184,676 B2 | 11/2015 | Ludois | |
| 9,479,085 B1 | 10/2016 | Ludois et al. | |
| 9,571,010 B2 | 2/2017 | Ludois | |
| 9,866,148 B2 | 1/2018 | Petrowsky et al. | |
| 9,899,937 B2 * | 2/2018 | Ge | H02N 1/004 |
| 9,979,323 B1 | 5/2018 | Ghule et al. | |
| 2005/0006980 A1 * | 1/2005 | Horst | H02N 1/004 310/309 |
| 2005/0212382 A1 | 9/2005 | Odaka et al. | |
| 2008/0099483 A1 | 5/2008 | Anderson et al. | |
| 2008/0100162 A1 | 5/2008 | Garvey | |
| 2009/0115285 A1 | 5/2009 | Najafi et al. | |
| 2010/0166582 A1 | 7/2010 | Racicot et al. | |
| 2011/0232940 A1 | 9/2011 | Hwang et al. | |
| 2012/0051893 A1 | 3/2012 | Schofield et al. | |
| 2012/0282120 A1 | 11/2012 | Krahn et al. | |
| 2013/0106317 A1 | 5/2013 | Ludois | |
| 2013/0300252 A1 | 11/2013 | Johnson | |
| 2014/0175941 A1 | 6/2014 | Johnson | |
| 2015/0048716 A1 | 2/2015 | Johnson | |
| 2015/0134109 A1 | 5/2015 | Zhou et al. | |
| 2015/0191607 A1 | 7/2015 | Mcdaniel | |
| 2016/0099663 A1 | 4/2016 | Petrowsky et al. | |
| 2016/0211775 A1 | 7/2016 | Ge et al. | |
| 2016/0329780 A1 | 11/2016 | Reed et al. | |
| 2016/0344306 A1 | 11/2016 | Ge et al. | |
| 2017/0040910 A1 | 2/2017 | Hawes et al. | |
| 2018/0013331 A1 | 1/2018 | Post | |
| 2019/0253000 A1 | 8/2019 | Kratchman et al. | |
| 2019/0296659 A1 | 9/2019 | Reitz et al. | |
| 2021/0234476 A1 | 7/2021 | Reed et al. | |
| 2021/0242802 A1 | 8/2021 | Reed et al. | |
| 2021/0242803 A1 | 8/2021 | Butrymowicz et al. | |
| 2021/0242804 A1 | 8/2021 | Reed et al. | |
| 2021/0242805 A1 | 8/2021 | Knippel et al. | |
| 2021/0242806 A1 | 8/2021 | Reed et al. | |
| 2021/0257929 A1 | 8/2021 | Knippel et al. | |
| 2021/0257930 A1 | 8/2021 | Reed et al. | |
| 2021/0281193 A1 | 9/2021 | Reed et al. | |

FOREIGN PATENT DOCUMENTS

| | | | |
|---|---|---|---|
| JP | 2002083602 A | | 3/2002 |
| JP | 2004183793 A | | 7/2004 |
| JP | 2004207981 A | | 7/2004 |
| JP | 2005278324 A | | 10/2005 |
| JP | 2007298647 A | | 11/2007 |
| JP | 2008098563 A | | 4/2008 |
| JP | 2008214560 A | | 9/2008 |
| JP | 2009509355 A | | 3/2009 |
| JP | 2009115978 A | | 5/2009 |
| JP | 2009272354 A | | 11/2009 |
| JP | 2010156626 A | | 7/2010 |
| JP | 2010192326 A | | 9/2010 |
| JP | 2010198858 A | | 9/2010 |
| JP | 2011150958 A | | 8/2011 |
| JP | 2012200029 A | | 10/2012 |
| RU | 01069106 | | 1/1984 |
| RU | 73761 | U1 | 5/2008 |
| RU | 2414043 | C1 | 3/2011 |
| RU | 2471283 | C1 | 12/2012 |
| WO | 2006102444 | A1 | 9/2006 |
| WO | 2012102915 | A1 | 8/2012 |
| WO | 2016057333 | A1 | 4/2016 |
| WO | 2020101796 | A1 | 5/2020 |
| WO | 2021138690 | A1 | 7/2021 |
| WO | 2021138693 | A1 | 7/2021 |

OTHER PUBLICATIONS

Cargill, "Fr3 Fluid Technical Details Webpage", 2021, 17 Pages.
PCT/US2021/012120, "International Application Serial No. PCT/US2021/012120, International Preliminary Report on Patentability dated Jul. 14, 2022", C-Motive Technologies, Inc., 14 pages.
PCT/US2021/012123, "International Application Serial No. PCT/US2021/012123, International Preliminary Report on Patentability dated Jul. 14, 2022", C-Motive Technologies, Inc., 13 pages.
"Practical Dielectrics, Reading—Shen and Kong", MIT OpenCourseWare, Spring 2011, 6.007 Electromagnetic Energy From Motors to Lasers.
"Roland Albers Ph D Thesis", Technical University—Munich, Dissertation on Jan. 29, 2001, English translation provided for relevant pp. 100-102, 155 pages.
"The Electrostatic Wind Energy Converter, electric performance of a high voltage prototype", Dec. 10, 2008, 189 pages.
15849571.3, "European Application Serial No. 15849571.3, Extended European Search Report dated Sep. 26, 2018", C-Motive Technologies, Inc., 11 pages.
Coddington, et al., "Operation of a dielectric motor with a low conductivity liquid", J. Phys. D: Appl. Phys., revised Feb. 1970, vol. 3, pp. 1212-1218.
Crossland, et al., "Mechanical to electrical energy conversion in a hybrid liquid-solid dielectric electrostatic generator", Journal of Applied Physics 106, published online, Aug. 31, 2009, 4 Pages.
Dittrich, et al., "Abatement of High-Field Conduction in Liquid Dielectrics by Electrode Conditioning with Non-ionic Cage-Forming Polymers: A Novel Avenue to High-Power Engineering", 2000 Lyonel Baum, 5 Pages.
Dittrich, et al., "Abatement of injection currents in propylene carbonate", taken from IEEE Periodical 1990, pp. 166-170.
Felici, N. J., "Electrostatic generators", Electronics & Power, May 1965, pp. 169-171.
Felici, N., "High-Field Conduction in Dielectric Liquids Revisited", IEEE Transactions on Electrical Insulation vol. E1-20, No. 2, Apr. 1985, pp. 233-238.
Felici, N. J., "Ten Years of Research on Electrostatistics at the University of Grenoble 1942-1952", British Journal of Applied Physics, 1952, pp. S62-S67.
Fogler, Michael, "Electrostatics of two-dimensional structures: Exact Solutions and approximate methods", Physical Review B 69, 2004, pp. 245321-1 through 245321-15.
Ge, et al., "Evaluation of Dielectric Fluids for Macro-Scale Electrostatic Actuators and Machinery", 2014 IEEE, pp. 1457-1464.
Gung, et al., "Preliminary Kerr Electro-Optic Field Mapping Measurements in Propylene Carbonate Using Point-Plane Electrodes", Journal of Electrostatics 46, 1999, pp. 79-89.
Jefimenko, Oleg D., "Electrostatic Motors, Their History, Types and Principles of Operation", Copyright 1973 by Electret Scientific Company, 149 Pages.
Krupa, et al., "Main Modes of Electrohydrodynamic Spraying of Liquids", Third International Conference on Multiphase Flow, ICMF'98, Jun. 1998, 8 Pages.
Niino, et al., "Electrostatic Artificial Muscle: Compact, High-Power Linear Actuators with Multiple-Layer Structures", 1994 IEEE, pp. 130-135.
PCT/US2015/053746, "International Application Serial No. PCT/US2015/053746, International Preliminary Report on Patentability dated Apr. 11, 2017", C-Motive Technologies Inc., Apr. 11, 2017, 5 pages.
PCT/US2015/053746, "International Application Serial No. PCT/US2015/053746, International Search Report and Written Opinion dated Jan. 28, 2016", C-Motive Technologies Inc., Jan. 28, 2016, 7 Pages.

(56) References Cited

OTHER PUBLICATIONS

PCT/US2021/012120, "International Application Serial No. PCT/US2021/012120, International Search Report and Written Opinion dated May 26, 2021", C-Motive Technologies, Inc., 16 pages.
PCT/US2021/012120, "International Application Serial No. PCT/US2021/012120, Invitation to Pay Additional Fees and, Where Applicable, Protest Fee dated Apr. 1, 2021", C-Motive Technologies, Inc., 2 pages.
PCT/US2021/012123, "International Application Serial No. PCT/US2021/012123, International Search Report and Written Opinion dated Apr. 14, 2021", C-Motive Technologies, Inc., 13 pages.
Secker, et al., "A Simple Liquid Immersed Dielectric Motor", Journal of Applied Physics, 39, 1968, pp. 2957-2961.
Shenkman, et al., "A New Type of Capacitive Machine", Energy and Power Engineering, 2015, published online Feb. 2015, Scientific Research Publishing, pp. 31-40.
Vanslette, R. A., "Torque Generation using Ferroelectric Materials", IEEE Transactions on Aerospace and Electronic Systems, vol. AES-1, No. 2, Oct. 1965, 124-128.

\* cited by examiner

ELECTROSTATIC MOTOR HAVING FLUID MANAGEMENT FEATURES

CLAIM OF PRIORITY

This application claims priority to U.S. Provisional Patent Application Ser. No. 62/956,821, filed Jan. 3, 2020 and entitled "HYBRID ELECTRIC DRIVE MACHINE" (CMOV-9005-PO1), and U.S. Provisional Patent Application Ser. No. 62/956,830, filed Jan. 3, 2020 and entitled "PLATE COMPONENTS FOR AN ELECTRIC DRIVE MACHINE" (CMOV-9006-PO1).

Each of the foregoing applications is incorporated herein in the entirety, for all purposes.

BACKGROUND

Electrostatic machines operate on capacitive principles rather than inductive principles. Electrostatic machines have some advantages over inductive machines, including the ability to generate low loss torque at zero or low speeds, operation at generally higher inherent voltages than inductive machines, and lower cost of materials such as magnets and windings. However, presently known electrostatic machines suffer from a number of drawbacks, including low power density, and complexity of managing capacitive interfaces. Fluids to increase a permittivity in a capacitive gap for an electrostatic motor are critical to provide sufficient capacitive energy storage for operations of the electrostatic motor. Presently known fluids suffer from a number of drawbacks, including a sensitivity of the fluid to operating conditions of the electrostatic motor, and a harsh environment provided by the fluid for components of the electrostatic motor.

SUMMARY

An example electrostatic machine includes a plurality of stator plates, each including a stator electrode, and rotationally fixed to a housing; a shaft at least partially defined within the housing and configured to rotate about an axis; a plurality of rotor plates, each including a rotor electrode, and rotationally fixed to the shaft; a dielectric fluid disposed in the housing, and that fills a gap between the plurality of stator plates and the plurality of rotor plates; at least one seal associated with the shaft; and where the at least one seal includes a material compatible with the dielectric fluid.

Certain further aspects of the example system are described following, any one or more of which may be present in certain embodiments. The at least one seal includes a material compatible with the dielectric fluid at an operating temperature of the electrostatic machine. The at least one seal includes a first material encapsulated in a second material, where the second material is compatible with the dielectric fluid. The at least one seal includes a fluorinated ethylene propylene. The at least one seal includes a virgin polytetrafluoroethylene. The at least one seal includes polytetrafluoroethylene/polyetherimide. The at least one seal includes a high density terpolymer including ethylene, tetrafluoroethylene, and perfluoromethyl vinyl ether monomers. The at least one seal includes a perfluoroelastomer. Further including a second seal associated with an electrical coupling between an exciter fluidly isolated from the dielectric fluid and at least one of the stator plates or the rotor plates, and where the second seal includes a material compatible with the dielectric fluid. The second seal includes a cured potting material. The at least one seal includes a liquid seal. The liquid seal includes a ferrofluid.

An example electrostatic machine includes a plurality of stator plates, each including a stator electrode, and rotationally fixed to a housing; a shaft at least partially defined within the housing and configured to rotate about an axis; a plurality of rotor plates, each including a rotor electrode, and rotationally fixed to the shaft; a dielectric fluid disposed in the housing, and that fills a gap between the plurality of stator plates and the plurality of rotor plates; where the dielectric fluid includes a dielectric fluid base and at least one additive.

Certain further aspects of the example system are described following, any one or more of which may be present in certain embodiments. The dielectric fluid includes at least one base fluid selected from the fluids consisting of: a ketone, an ester, or a carbonate. The dielectric fluid includes at least one base fluid selected from the fluids consisting of: isoamyl isovalerate, hexyl isobutyrate, diethyl ethyl malonate, a malonate, delta-nonalactone, or a lactone. The dielectric fluid includes at least one base fluid selected from the fluids consisting of: a propylene carbonate-based fluid composition; an oxalate; an amide; an imide; or a lactam. The dielectric fluid includes at least one additive. The at least one additive includes a free radical scavenger. The free radical scavenger includes at least one compound selected from among: butylated hydroxytoluene, butylated hydroxyanisole, tertiary-butylhydroquinone, gallate, or a phenolic antioxidant. The at least one additive includes a contamination scavenger. The contamination scavenger includes at least one of an organo-metallic compound, trimethyl (phenyl) tin, or a bismuth organo-metallic. The at least one additive includes barium titanate. The at least one additive includes a water scavenger. The water scavenger includes at least one compound selected from among: an oxazolidine, a monomeric isocyanate, and an alkoxysilane. The water scavenger includes at least one compound selected from among: $CaCl$, $CaSO_4$, Copper (II) Sulfate, $LiAlH_4$, $MgSO_4$, phosphorous pentoxide, potassium carbonate, a silica gel, a monomeric isocyanate, and an alkoxysilane. The water scavenger includes a molecular sieve provided in fluid contact with the dielectric fluid. The water scavenger is provided as an additive in fluid contact with the electrode separation fluid. The at least one additive includes a coated metal oxide. Each of the at least one additive is present in an amount between 1 ppm and 1% by weight. The at least one additive includes a coated metal oxide.

DETAILED DESCRIPTION

Figure 1:
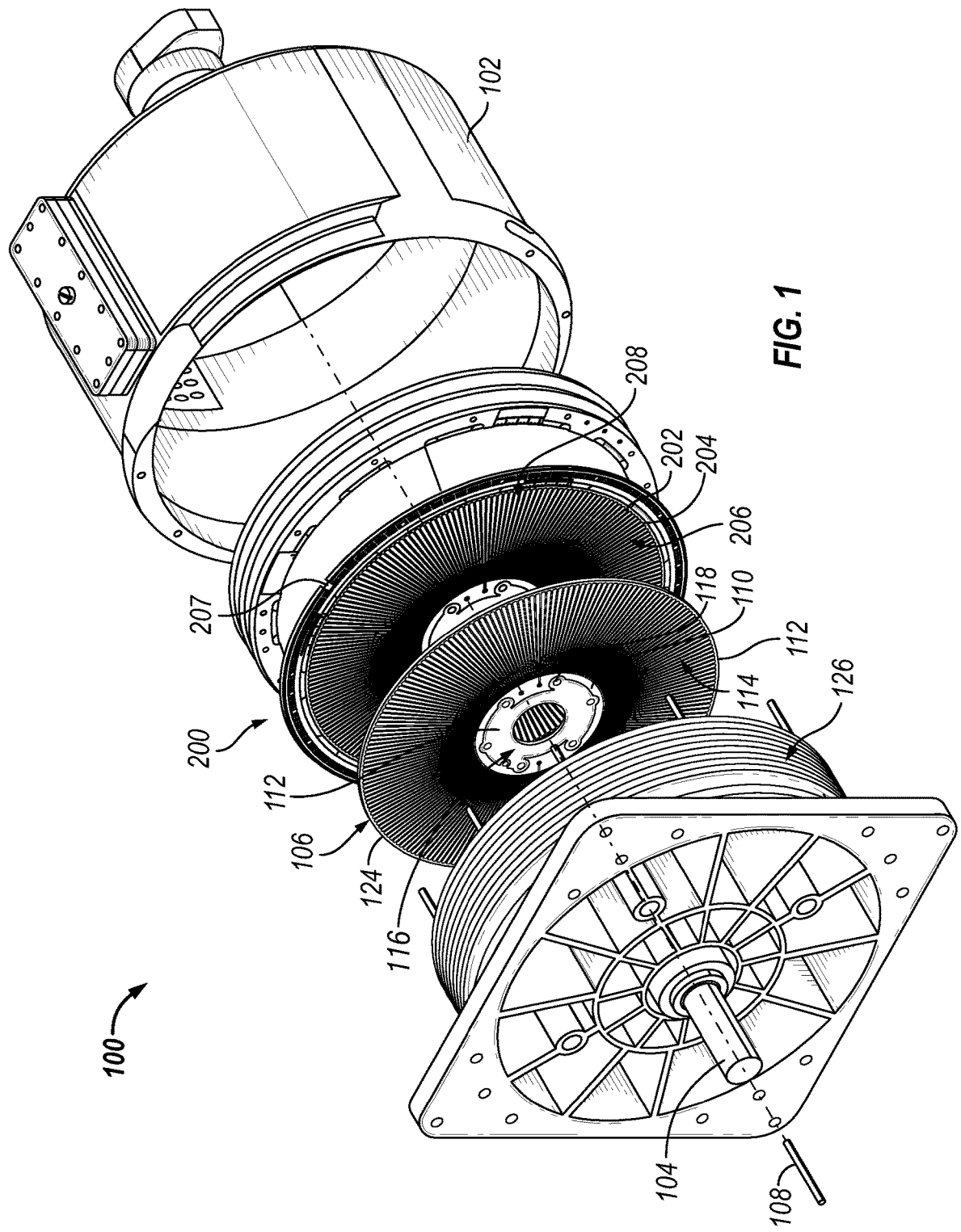
FIG. 1 is a schematic depiction of a system for an electrostatic motor.

Electrostatic machinery includes electric motors, generators and actuators that convert power between mechanical (e.g., kinetic) and electrical forms using electric field torque mechanisms. Electrostatic machines may be divided into six categories: electrostatic induction machines, variable capacitance/elastance machines, synchronous electrostatic machines, direct current (DC) electrostatic machines, electrostatic hysteresis synchronous machines, and corona machines. In some instances, a particular machine may fall into one or more of the categories. Such categories are not exclusive, and additional categories may exist. The use of such categories is used for explanatory purposes only, and is not meant to be limiting. Examples of electrostatic machines may be found in U.S. Pat. No. 9,866,148, which is incorporated by reference herein in its entirety for all purposes.

In general, electrostatic machines use capacitive principles (as opposed to the magnetostatic or quasi-magnetostatic principles used in electromagnetic induction, permanent magnet, wound field, reluctance, and other machines). In some embodiments, electrostatic machines can use circular plates located in close proximity to one another to create a capacitance between the plates. In some embodiments, the plates can alternate between rotor plates and stator plates, for example increasing the available torque and/or power density of the electrostatic machine (ESM). Rotor plates can be plates that rotate with a shaft of the motor, generator, and/or actuator and can be analogous to an armature of an induction, wound field, or reluctance motor. Stator plates can remain stationary with respect to a housing or enclosure of the motor and/or generator.

An illustrative ESM includes a rotor electrode and a stator electrode. The rotor electrode and the stator electrode are separated by a gap and form a capacitor. The rotor electrode is configured to move with respect to the stator electrode. The electrostatic machine further includes a housing configured to enclose the rotor electrode and the stator electrode. The stator electrode is fixed to the housing. An example ESM includes a fluid filling a void defined by the housing and between the rotor electrode and the stator electrode. The "gap", as referenced herein, should be understood broadly, where the gap may reference a minimum distance between electrodes, a maximum distance between electrodes, a distance defined according to an electrical characteristic, a distance defined according to the geometric characteristic, a mechanical gap between electrodes, or the like. The gap varies in magnitude, orientation, and/or geometry during operations of the ESM, due to rotation of the rotor stack, axial movement of the capacitive stack elements, variations of the applied electric field (and/or excitation), and changes to the fluid characteristics, and further varies in different ways between electrodes of the various components of the capacitive stack (e.g., stator electrodes of an end stator plate have a different variation environment than stator electrodes of a stator plate in the middle of the stator stack). The gap is referenced herein for purposes of illustration, and to demonstrate some of the principles of operation and design, but the description herein is not limiting to any particular conceptualization of the gap and/or any particular operating principle. The structures, operations, configurations, components, and the like as set forth herein may be configured as described for any reason, without limitation to the illustrative concepts set forth herein.

In general, energy storage systems (e.g., capacitors) can naturally store energy based on the arrangement of surfaces and electric potential between them. In the case of variable capacitance machines (and other electrostatic machines), surfaces affixed to a shaft (e.g., rotor plates) can form a capacitance with surfaces affixed to a housing (e.g., stator plates). When voltage is applied to the stator plates and/or rotor plates, the resulting electric field in the gap between them develops shear stress between the rotor plates and the stator plates and can exert a rotational force (e.g., torque) on the surfaces of the rotor plates and the stator plates. The electric field can also exert an attractive force on the surfaces of the rotor plates and the stator plates in a direction normal to the surfaces of the plates (e.g., toward one another, in an axial direction along the shaft). The attractive force can cause the rotor and stator plates to bend or otherwise collapse toward one another, particularly near the unsupported ends of the rotor plates and the stator plates (e.g., near an outer perimeter of the rotor plates away from the shaft and near an inner perimeter of the stator plates away from a location where the stator plates are secured to the housing). In certain embodiments, plates may additionally be loaded asymmetrically, for example terminating plates of a capacitive stack which may have electrodes on only one side, and/or electrodes that face an opposing plate on only one side, resulting in asymmetrical axial loading of the terminating plates during operations of the ESM. In certain embodiments, the terminating plates of the capacitive stack 702 may be axially secured (e.g., on the shaft, and/or to the housing), where other plates of the capacitive stack may be axially secured or have an axial degree of freedom.

The variation in the spacing between rotor plates and the stator plates, alters the capacitance and can impact the performance (e.g., electrical, mechanical, and/or torque generating) of the ESM. The attractive force can also cause the rotor plates and the stator plates to contact one another, resulting in a reduction in performance and, in extreme cases, damage to the plates and potentially other components of the electrostatic machine. The available energy storage, which determines available torque and other performance characteristics of the ESM, correlates with the capacitance of the stator/rotor electrode system, and a decreased gap distance between the stator electrode and the rotor electrode increases the capacitance. Accordingly, embodiments herein include aspects configured to allow for a small gap between the electrodes, without allowing the electrodes to touch.

In some cases, a machine producing high levels of torque (e.g., 1 N-m or greater) is desired for use in a variety of products and systems. It is commonly desired also for such a machine to have low capital and operating costs, low volume, low mass, and high performance. Therefore, a suitable machine may have high torque, low losses, and require minimal auxiliary systems such as cooling or clutches. Some electrostatic machines can produce a large electric field across a pair of electrodes (e.g., stator plates and rotor plates) to generate sufficient torque for practical applications. Air has a low breakdown voltage (e.g., is prone to arcing). Thus, in some embodiments, a high permittivity fluid, an electrode separation fluid (e.g., providing electrical separation between electrodes), and/or a dielectric fluid, can be located between the electrodes (e.g., stator plates and rotor plates) and a high electric field can be maintained without arcing between the electrodes. The available energy storage, which determines available torque and other performance characteristics of the ESM, also correlates with the field strength between the electrodes. A field strength, as utilized herein, may indicate a field strength determined based on a stator voltage and a rotor voltage, defining the field inside the gap. In another example, a field strength may indicate a rotor field (V/m) resulting from rotor voltage and geometry of the plates of a capacitive stack, a stator field resulting from stator voltage and the geometry of the plates, and a gap field resulting from the rotor and stator fields within the gap.

A combination of a high electric field and a minimally sized gap can lead to arcing between the electrodes, including at certain operating conditions (e.g., when a gap distance is momentarily reduced during axial flexing of the rotor and/or stator plates). Additionally, variability in the system, such as the presence of entrained and/or dissolved gases in the fluid, including gases generated from electrical and/or chemical activity during operations of the ESM, can reduce the effective permittivity of the fluid positioned within the gap (including the local fluid environment relative to the bulk fluid in a housing of the ESM). Further, the available torque of an ESM is related to the exposed electrode area forming the capacitive elements, and accordingly the performance of the ESM can be improved using a stack of alternating rotor and stator plates. The utilization of a stack of plates introduces challenges, as plates flex axially, causing capacitance variations to dynamically ripple through the stack, and/or causing a more complex mechanical separation environment between plates. Additionally or alternatively, the stack of plates provides a challenge with tolerance stack-ups between the plates of the capacitive stack.

The present description recites an illustrative arrangement with rotor plates that are rotationally fixed to a shaft, having a number of electrodes thereon that form a capacitive stack through interaction with alternating stator electrodes. The stator electrodes are on stator plates that are rotationally fixed to a housing, and are positioned alternately with the rotor plates. In certain embodiments, the stator electrodes are excited using an AC input, for example using a current source inverter (CSI), and/or further utilizing a voltage regulator. Any type of inverter to provide an AC input is contemplated herein, such as a voltage source inverter, and any type of inverter may include regulating components and/or control operations to provide the desired voltage profile on the stator electrodes during operations. In certain embodiments, the rotor electrodes are excited using a DC input, for example using a voltage source, field supply, and/or current source with voltage control. The described aspects are provided for clarity of the present description, but the illustrative arrangement set forth is not limiting to the present disclosure. Without limitation to any other aspect of the present disclosure, certain variances to the illustrative arrangement are set forth herein, where a given embodiment may include one or more of the variances. The described variances, as well as any other variances understood by one of skill in the art having the benefit of the present disclosure, are specifically contemplated herein.

An example variance includes providing the capacitive stack in a varying configuration, for example: in a first arrangement R-S-R-S-R-S (e.g., alternating, with a terminating rotor plate at one end of a capacitive stack and a terminating stator plate at the other end of the capacitive stack); in a second arrangement S-R-S-R-S (e.g., alternating, with a stator plate terminating each end of the capacitive stack); a third arrangement R-S-R-S-R-S-R (e.g., alternating, with a rotor plate terminating each end of the capacitive stack); a fourth arrangement R-S-S-R-R-S-S-R-R-S (e.g., pairs of each type of plate, with a terminating rotor plate at one end of the capacitive stack and a terminating stator plate at the other end of the capacitive stack); a fifth arrangement R-S-S-R-S-S-R-S-S-R-S (e.g., pairs of stator plates alternated with a single rotor plate, for example where electrodes are provided on both sides of rotor plates but only on a single side of the stator plates); and/or combinations of these. The available stored energy of the ESM, and accordingly the available torque output and/or power output, is related to the exposed surface areas of the rotor electrodes and stator electrodes. Accordingly, an alternating arrangement such as R-S-R-S-R-S, with each rotor plate and stator plate having electrodes on both sides (except, possibly, the terminating rotor plate(s) and/or stator plate(s)) maximizes the exposed electrode area within a given housing volume of the ESM, and thus maximizes the torque density and/or power density for a given arrangement (if all other parameters, such as applied voltages, gap distances, etc., are equal). However, other arrangements may be desirable in certain embodiments, for example manufacturing, assembly, electrical coupling within the ESM, and/or part uniformity considerations may make it desirable to include electrodes on only a single side of the rotor plate(s) and/or stator plate(s). In certain embodiments, electrical coupling of the rotor stack and/or stator stack to an excitation circuit may make it desirable to include a terminating plate of each type (e.g., a rotor plate terminating one end, and a stator plate terminating the other end of the capacitive stack), and/or to terminate each end of the capacitive stack with a same plate type (e.g., a rotor plate and/or a stator plate). In another example, varying power and/or torque densities and/or ratings (PTDR—or the combined concept of a power and/or torque rating and/or density, and can include concepts such as: a power rating, a torque rating, a power density, a torque density, and/or a combination of one or more of these) may provide for a variance in the capacitive stack construction, for example to provide highly distinct PTDR (e.g., to support different power and/or torque ratings) within a same housing utilizing a same number of plates by adjusting the arrangement of plates in the capacitive stack.

Another example variance includes the rotor stack (and/or stator stack, for example depending on the nomenclature utilized for the particular ESM) rotationally fixed to an outrunner, for example a rotating component within the housing that is positioned at a radially outward extent of the rotor plates. In the example, the stator stack may be rotationally fixed to the housing, for example engaging an end plate of the housing, and/or fixed to a non-rotating component such as a sleeve and/or partial sleeve of the shaft that does not rotate. In the example, depending upon the selected nomenclature of the system, an outrunner configuration may include the "stator" plates rotating relative to the housing (e.g., coupled to a sleeve, frame, or other rotating feature coupled at a radially outward position of the stator plates), with the "rotor" plates stationary and fixed to the shaft. The description utilizing a rotor plate or a stator plate is non-limiting, and depends upon whether the rotor and stator nomenclature reference physical action (e.g., rotor plates rotating, and stator plates stationary), physical arrangement (e.g., stator plates physically coupled at a radially outward position, and rotor plates coupled at a radially inward position such as the shaft), or electrical action (e.g., plates having DC excitation and/or applied field, which may be referenced as the "rotor plates" or the "stator plates", and which may be rotating or stationary, and plates having AC excitation, which may be referenced as the "stator plates" or the "rotor plates", and which may be rotating or stationary). The illustrative nomenclature herein is not limiting, and the excitation description (e.g., AC and/or DC excitation) is also illustrative. An example arrangement includes stator plates having electrodes that are excited by an AC electrical source, and which are rotationally coupled to the housing, and rotor plates having electrodes that are excited (and/or have an applied field voltage) by a DC electrical source, and which are rotationally coupled to a rotating shaft.

Another example variance includes a number of phases distributed across the rotor stack, for example where electrodes of a given rotor plate may be separated and excited with distinct phase profiles, and/or where electrodes of different rotor plates are excited with distinct phase profiles. Another example variance includes a number of phases distributed across the stator stack, for example where electrodes of a given stator plate may be separated and excited with distinct phase profiles, and/or where electrodes of different stator plates are excited with distinct phase profiles. A still further example variance includes more than one excitation component (e.g., a power supply) providing excitation for a given stack (e.g., two CSIs providing excitation for stator plates, for example to support scaling of a power requirement that may be limited by the performance of a single CSI). A still further example variance includes a controller 6200 capable to support redundancy operations, for example where electrode(s) and/or plate(s) of the capacitive stack have experienced a failure, fault value, or the like, where the controller 6200 responds to the failure or fault value by utilizing other plates of the stack to provide power/torque output, by utilizing an alternate power supply to excite selected plates, or the like.

Another example variance includes coupling of an excitation circuit to the rotor stack through a rotor power distribution board (e.g., reference FIGS. 32, 34), for example simplifying the circuit transition from the exciter (or electrical exciter) to the rotor stack, while incurring additional cost and/or footprint to accommodate the rotor power distribution board. In certain embodiments, the rotor power distribution board may be omitted, with the excitation circuit for the rotor stack directly coupling to rotor plate (e.g., a rotor plate at one end of the rotor stack, although coupling may be provided to an intermediate rotor plate, and/or to more than one rotor plate). Another example variance may include one or more additional rotor power distribution boards, for example to provide coupling to more than one excitation circuit, and/or to provide desired circuit characteristics (e.g., impedance, capacitance, dynamic response, etc.) for the rotor stack and/or excitation circuit(s) of the rotor stack.

Another example variance includes coupling of an excitation circuit to the stator stack through a stator power distribution board, for example simplifying the circuit transition from the exciter to the stator stack, while incurring additional cost and/or footprint to accommodate the stator power distribution board. In certain embodiments, the stator power distribution board may be omitted, with the excitation circuit for the stator stack directly coupling to the stator plate (e.g., a stator plate at one end of the stator stack, although coupling may be provided to an intermediate stator plate, and/or to more than one stator plate). Another example variance may include one or more additional stator power distribution boards, for example to provide coupling to more than one excitation circuit, and/or to provide desired circuit characteristics (e.g., impedance, capacitance, dynamic response, etc.) of the stator stack and/or excitation circuit(s) of the stator stack.

It can be seen that numerous aspects of an ESM provide a coordinated challenge to make a high torque, high density, or high performance. Increased field strengths increase the axial forces between plates, impose a higher requirement for gap permittivity management, and increase the likelihood that side effects such as gas generation and/or material breakdown, will affect the integrity of the dielectric fluid in the gap. Increased plate counts of the stack create a more complex mechanical integrity, plate movement, and torque generating environment. Increased plate diameters allow for a greater capacitive area, but increase the cantilever distance of the plates, as well as adding greater electrode facing area (for rotor plates) away from the anchoring position of the plates, which combine to increase an axial flexing force to the plates. Numerous aspects of the present disclosure address these and other challenges, allowing for embodiments of an ESM having higher power/torque density, greater reliability and performance consistency, and reducing capital and/or operating costs for an ESM.

Steady state operation, as utilized herein, should be understood broadly. Without limitation to any other aspect of the present disclosure, example and non-limiting steady state operations include: operations having a target rate of change (e.g., dT/dt; dP/dt; dS/dt; dθ/dt; where dT is differential torque, dP is differential power, dS is differential speed, dθ is differential angular position such as a position of the shaft, rotor, and/or a rotating load component, and dt is differential time) below a threshold value; operations having a target rate of change based on a distinct parameter other than time (e.g., dX/dθ, where dX is a differential control parameter, and where dθ is a differential angular position such as a position of the shaft, the rotor, and/or a rotating load component; and/or dX/dω, where dω is a differential angular velocity, such as of the shaft, the rotor, and/or a rotating load component) below a threshold value; operations near a saturation limit (e.g., where response against the saturation limit may have limited dynamic capability; where operations may be considered steady state allowing for simplification of control as steady state control, and/or where operations may be considered transient, providing for more aggressive response in view of the saturation limit, such as switching an excitation mode, adjusting the field with the other one of the rotor and/or stator, etc.); and/or operations categorized as a steady state operation (e.g., according to a state parameter determined based on operating parameters of the ESM 1002, such as duty cycle tracking, filtered torque requests, etc.; and/or according to a state parameter supplied by an external controller—not shown). In certain embodiments, operational changes having a time constant that is slower than a field change time constant of the excitation circuit modulating fields on the stator and/or rotor electrodes are considered to be a steady state operation. In certain embodiments, operational changes having a time constant that is much slower (e.g., 3×, 5×, 10×, etc.) than a field change time constant is considered to be a steady state operation. It will be understood that the field change time constant may be distinct values for each circuit (e.g., rotor versus stator; and/or for separate phases and/or otherwise separately excited circuits), and/or may change depending upon the operating condition of the ESM 1002 (e.g., rotational speed, voltage on the circuit, relative phase positions of the rotor(s) vs. stator(s), temperature of the dielectric fluid, etc.). One of skill in the art, having the benefit of the present disclosure, and information ordinarily available when considering a system having an ESM 1002, can readily determine whether operations of the system are considered to be steady state operations.

Transient operations, as utilized herein, should be understood broadly. Without limitation to any other aspect of the present disclosure, example and non-limiting steady state operations include: operations having a target rate of change (e.g., dT/dt; dP/dt; dS/dt; dθ/dt; where dT is differential torque, dP is differential power, dS is differential speed, dθ is differential angular position such as a position of the shaft, rotor, and/or a rotating load component, and dt is differential time) above a threshold value; operations having a target rate of change based on a distinct parameter other than time (e.g., dX/dθ, where dX is a differential control parameter, and where dθ is a differential angular position such as a position of the shaft, the rotor, and/or a rotating load component; and/or dX/dω, where dω is a differential angular velocity, such as of the shaft, the rotor, and/or a rotating load component) above a threshold value; operations near a saturation limit (e.g., where response against the saturation limit may have limited dynamic capability; where operations may be considered steady state allowing for simplification of control as steady state control, and/or where operations may be considered transient, providing for more aggressive response in view of the saturation limit, such as switching an excitation mode, adjusting the field with the other one of the rotor and/or stator, etc.); and/or operations categorized as a transient operation (e.g., according to a state parameter determined based on operating parameters of the ESM 1002, such as duty cycle tracking, filtered torque requests, etc.; and/or according to a state parameter supplied by an external controller—not shown). In certain embodiments, operational changes having a time constant that is faster than a field change time constant of the excitation circuit modulating fields on the stator and/or rotor electrodes are considered to be a transient operation. In certain embodiments, operational changes having a time constant that is similar to or even slower than a field change time constant (e.g., where F<3*T, F<5*T, F<10*T, etc., where F is the field change time constant, and where T is the operational change time constant) is considered to be a transient operation. It will be understood that the field change time constant may be distinct values for each circuit (e.g., rotor versus stator; and/or for separate phases and/or otherwise separately excited circuits), and/or may change depending upon the operating condition of the ESM 1002 (e.g., rotational speed, voltage on the circuit, relative phase positions of the rotor(s) vs. stator(s), temperature of the dielectric fluid, etc.). One of skill in the art, having the benefit of the present disclosure, and information ordinarily available when considering a system having an ESM 1002, can readily determine whether operations of the system are considered to be transient operations.

It can be seen that separate control schemes may be utilized for steady state operation (e.g., targeting efficiency, component life, etc.) versus transient operation (e.g., targeting dynamic response time, reduction of offset operation, correction of torque ripple in another component, etc.). In certain embodiments, control operations may be inherent to develop the desired behavior (e.g., torque response, speed, field strength, frequency components of these, etc.) for transient and/or dynamic response versus steady state and/or slow changing response without an explicit determination of whether operations are performed as steady state or transient operations. Additionally or alternatively, transient and/or steady state response characteristics may utilize stabilizing control features such as: mixing control schemes (e.g., interpolating between transient control schemes and steady state schemes); have responses smoothed during transitions (e.g., from a steady state scheme to a transient scheme, such as by filtering target values and/or excitation command values, utilizing a slew limit to target values and/or excitation command values, using a sliding weighted average between control schemes during transitions, etc.); have an applied hysteresis to transitions (e.g., to prevent or reduce dithering between control schemes); and/or have an applied deadband to transitions (e.g., smoothing, filtering, and/or applying a hysteresis for target values, excitation command values, or other system parameters that change direction, such as switching from increasing to decreasing, switching from a positive to negative, etc.). In certain embodiments, stabilizing control features, including without limitation any stabilizing control features described in relation to transient and/or steady state response characteristics, may be applied to any control parameter, including without limitation parameters such as: any target value (e.g., torque, voltage, charge, speed, etc.); any control gain change (e.g., a proportional, integral, and/or derivative gain); any feedback value (e.g., a voltage value, a field value, a charge value, a speed value, a torque value, etc.); any reset and/or limitation with regard to a control operation (e.g., an integrator reset and/or saturation value) and/or a command (e.g., an excitation command value 6216, field strength value 6908, voltage command value 7308, and/or charge command value 7906); and/or a discrete control scheme (e.g., switching between PWM mode 11502 and a discrete stepped mode 11504, etc.).

Certain considerations for determining operating conditions that are steady state operations (and/or transient operations) include: excitation circuit parameters (e.g., impedance and/or capacitance of the rotor and/or stator excitation circuits); excitation component performance values (e.g., current source inverter, voltage source, voltage regulation, etc.); system responsiveness characteristics (e.g., expected duty cycle, rate of load changes, rate of requested torque and/or power changes, expected performance of the ESM 1002 against these, etc.); the availability of efficiency gains and/or loss management for the ESM 1002 configuration through field management (e.g., the available back mmf loss management for the particular ESM 1002 through transient power management in the expected power/torque output regimes for the system); the sensitivity of capital costs versus operational costs (e.g., cost of a higher capability CSI, voltage source, etc.; cost of an improved excitation circuit—e.g. having an improved impedance/capacitance profile, and/or an adjustable impedance/capacitance profile; versus the efficiency savings available with those higher capability components) for the given system, application, and/or operator; the sensitivity of capital costs versus operational capability (e.g., the costs as before, compared to performance enhancement available with higher capability components) for the given system, application, and/or operator; and/or the availability of computing resources (e.g., processor cycles; memory storage for algorithms, supporting data such as look-up tables, operating diagrams 6700, etc., and/or intermediate memory storage used in determining steady state/transient operation and/or supporting control schemes, calculated values, buffered values, etc.; support for the cost of computing resources and development to implement steady state/transient control operations; and/or available space, weight, integration resources, etc. to support computing resources), including the costs of increasing computing resources, the benefits of using an existing computing resource set, etc., for the given system and/or application having the ESM 1002. The examples described herein are non-limiting illustrative examples to demonstrate aspects of the present disclosure. The utilization of steady state and transient terminology to reference control operations is provided for clarity of the present description, and operations set forth herein may be performed for any reason, and may utilize any terminology or no terminology to describe distinct control scheme operations.

Embodiments of the present disclosure relate generally to methods and devices for maintaining separation between the rotor plates and the stator plates of electrostatic machines. In particular, embodiments described herein relate generally to a separation assembly configured to prevent the rotor plates and the stator plates from moving toward one another (e.g., collapsing the gap), both near the unsupported radial ends of the rotor plates and the stator plates and in between the radial ends of the rotor and stator plates to protect against plate deflection during shock and vibration. In some embodiments, the separation assembly may be disposed at least partially within the gap between the rotor plates and the stator plates and engage adjacent surfaces of the rotor plates and the stator plates. For example, the separation assembly may include rolling elements configured to facilitate relative rotation between the rotor plates and the stator plates by rolling and/or sliding along grooves formed into opposing surfaces of the rotor plates and/or the stator plates. In other embodiments, the separation assembly may include a ball bearing assembly that is fixed to one of the rotor plate and the stator plate. In other embodiments, the separation assembly may include non-rolling element bearing types. For example, the separation assembly may include bumpers, thrust washers, or another mechanical separator. In another example, the separation assembly may include magnets (e.g., permanent magnets, electromagnets, electrets, etc.) fixed to the rotor plates and/or stator plates and configured to apply a force that opposes the attractive force between plates, and/or to apply a force that enforces a minimum separation distance of the gap between the rotor electrodes and the stator electrodes. In yet other embodiments, the separation assembly includes a hydrostatic bearing configured to maintain separation between the rotor plates and the stator plates via the application of fluid pressure between the rotor plates and the stator plates.

Referring to FIG. 1, an exploded view of a motor 100 of an electrostatic machine (ESM) is shown, according to an illustrative embodiment. The motor 100 includes a housing 102 and/or frame, a shaft 104, a rotor plate assembly 106, and a stator plate assembly 200. The housing 102 defines an enclosed volume (e.g., space, cavity, etc.) sized to receive the shaft 104, the rotor plate assembly 106, and the stator plate assembly 200 at least partially therein. In certain embodiments, multiple stator plates are included as a stator stack, and multiple rotor plates are included as a rotor stack. An example arrangement includes alternating rotor and stator plates, maximizing exposed surface area between rotor electrodes and stator electrodes. The combined rotor stack and stator stack may be referenced together as a capacitive stack 702 (e.g., reference FIG. 7).

The shaft 104 is rotatably coupled to the housing 102 at opposing ends of the shaft 104. As shown in FIG. 1, the motor 100 includes a plurality of rotor plate assemblies 106 and stator plate assemblies 200 that are stacked on top of one another in alternating arrangement in an axial direction 108 along the length of the shaft 104. The rotor plate assemblies 106 are "sandwiched" or otherwise disposed between adjacent ones of the stator plate assemblies 200. In some embodiments, the number of rotor plate assemblies 106 and stator plate assemblies 200 may be different. The number of rotor plate assemblies 106 and corresponding stator plate assemblies 200 can determine, at least in part, the amount of torque and/or power produced by the motor 100.

The description herein references directional terms, such as axial, radial, and azimuthal, for clarity of the present description. As used herein, axial references a direction aligned, at least generally, down the length of the shaft 104. As used herein, radial references a direction perpendicular to the shaft 104, for example from an inner portion of a plate toward an outer edge of the plate. As used herein, an azimuthal direction (or a circumferential direction) references an angular position around a plate, for example parallel to a rotational direction of the shaft 104. The directional terms utilized herein are provided for clarity of referencing components, movement, and the like, relative to the motor 100, and are not limiting to the description, and do not imply a particular arrangement of the motor 100 and/or components thereof.

As shown in FIG. 1, each rotor plate assembly 106 includes a rotor plate 110 and a plurality of rotor electrodes 112 disposed on stator facing surfaces 114 (e.g., opposing surfaces) of the rotor plate 110. The rotor plate 110 is shaped as a cylindrical disk. The rotor plate 110 includes a shaft opening 116 disposed at a central position along the rotor plate 110 and sized to receive the shaft 104 therein. The rotor plate 110 additionally includes a plurality of hub mounting openings 118 disposed proximate to the shaft opening 116. The hub mounting openings 118 are configured to rotatably couple (e.g., rotationally fix) the rotor plate 110 to the shaft 104 (e.g., to a shaft coupling, engaging a spline of the shaft, etc.). An example coupling arrangement between each rotor plate 110 and the shaft 104 includes ridges on each rotor plate 110 that engages a splined outer surface of the shaft 104, allowing for axial movement along the shaft 104 of the rotor plates 110 during assembly and operation of the motor. In certain embodiments, the axial freedom of movement for the rotor plates 110 and/or stator plates 202 provides for convenient assembly of the capacitive stack 702, for example allowing one end plate of the housing to be placed in a convenient position (e.g., with the shaft extending vertically upward, horizontally, or an intermediate position), the plates 110, 202 to be arranged over the shaft 104 to form the capacitive stack 702, and the housing to be placed over the capacitive stack 702, completing the assembly of the housing and capacitive stack 702. In certain embodiments, one or both terminating plates of the capacitive stack (e.g., stator plates 202) may be fixed to the housing and/or end plate of the housing, allowing for the other plates to be arranged over the shaft 104, where the placement of the housing over the capacitive stack 702 thereby positions the final terminating plate, completing the capacitive stack 702.

Any coupling arrangement to rotationally secure the rotor plates 110 to the shaft 104 is contemplated herein. An example embodiment includes rotor plates 110 having rotor electrodes 112 positioned on both sides, and stator plates 202 having stator electrodes 204 positioned on both sides. It can be seen that a terminating plate may have only one gap surface (e.g., a terminating stator plate 202 that faces a rotor plate 110 on a first side, but faces the housing 102 and/or a power distribution board on a second side). The terminating plates may be a stator plate 202 at each end (e.g., 5 stator plates alternating with 4 rotor plates 110), a rotor plate 110 at each end (e.g., 10 rotor plates 110 alternating with 9 stator plates 202), and/or a mix (e.g., a rotor plate 110 terminating one end of the capacitor stack, and a stator plate 202 terminating the other end of the capacitor stack). A terminating plate may have electrodes on both sides (e.g., to support part consistency and/or simplification of assembly), and/or only have electrodes on an active gap facing side (e.g., reducing material costs, simplification of interfaces with a power distribution board, etc.).

As shown in FIG. 1, the rotor electrodes 112 are electrical traces that are deposited or otherwise formed onto the stator facing surfaces 114 of the rotor plate 110 (e.g., surfaces of the rotor plate 110 that face toward the stator plate assembly 200, opposing surfaces of the rotor plate 110, etc.). The electrical traces may be arranged in strips that extend in a substantially radial direction from an inner perimeter edge 122 of the rotor plate 110 toward an outer perimeter edge 124 of the rotor plate 110. The electrical traces are spaced apart from one another along a circumferential direction at approximately equal intervals about the inner and outer perimeter of the rotor plate 110 to form an alternating arrangement of conducting sections and insulating sections. In other embodiments, the shape, arrangement, and/or number of rotor electrodes 112 may be different.

Similar to the rotor plate assemblies 106, each stator plate assembly 200 includes a stator plate 202 and a plurality of stator electrodes 204 disposed on rotor facing surfaces 206 (e.g., surfaces of the stator plate 202 that face toward the rotor plate assembly 106, opposing surfaces of the stator plate 202, etc.) of the stator plate 202. The stator plate 202 is shaped as a cylindrical disk spaced apart from the rotor plate 110 and arranged in substantially parallel orientation relative to the rotor plate 110. It will be understood that the stator plates 202 do not need to have a circular shape, as the stator plates 202 do not rotate. The stator plates 202 have electrodes configured to interact with the rotor electrodes, which may include the stator electrodes forming a circular cross-sectioned shape on the stator plate 202. It can be seen that certain considerations, such as ease of manufacture, assembly, and/or standardization of stator plate 202 components, the stator plates 202 may be circular, substantially circular, and/or having an outer edge shape matching the housing 102 (e.g., around at least a portion of the outer edge). An example motor 100 includes the stator plates 202 having ridges, tabs, mounting openings 207, holes, and/or cutouts that engage the housing 102 and/or an end wall coupled to the housing to secure the stator plates 202, and which may additionally provide an axial degree of freedom for movement of the stator plates 202 within the housing 102.

The separation between the stator plate 202 and the rotor plate 110 defines a gap, as will be further described. The size (e.g., width) of the gap between the stator plate 202 and the rotor plate 110, in a direction normal to opposing surfaces of the stator plate 202 and the rotor plate 110 (e.g., axially), is a part of determining the torque generated by the motor 100. In the motor 100 of FIG. 1, the size of the gap is less than approximately 3 centimeters, or less than approximately 1 centimeter in other embodiments. In other embodiments, the size of the gap may be different. In certain embodiments, gap sizes of less than 5 mm, less than 3 mm, between 0.5 mm and 3 mm, between 0.1 mm and 10 mm, and/or less than 1 mm. Aspects throughout the present disclosure allow for the provision of a small gap, even in view of axial flexing of rotor and/or stator plates during operation, as disclosed throughout the present disclosure.

An example system includes the coupled bearing sized to maintain a minimum separation distance between the rotor plate and the stator plate. In certain embodiments, sizing of the minimum separation distance, the radial extent of the electrodes (e.g., the inner radial extent to outer radial extent of electrodes positioned on the stator plates and/or rotor plates), the number of electrodes positioned on each plate, and/or the position of rolling elements, races, and/or other active separation enforcement devices (e.g., mechanical projections, bumpers, and/or magnetic separation devices)

are determined according to example design parameters set forth following. In certain embodiments, the sizes and ratios described herein may be sized according to requirements of the ESM (e.g., torque rating, power rating, etc.).

An example system includes selecting the minimum separation distance (G), the number of electrodes on each plate (or "poles", P), and the radial extent of the electrodes (e.g., a distance R that the electrodes progress in the radial direction), is determined according to a design relationship such as: $0 < R/(P*G) \leq 5$. For example and without limitation, a separation distance (G) of 1 mm, and 25 poles (electrodes, P) on each plate, would provide for a range of radial extent (R) that is up to 125 mm (e.g., 125 mm from a radially innermost position to a radially outermost position). The radial extent of the electrodes may be an outer plate radius (e.g., a distance from an outer plate edge to a beginning of the electrodes), and/or an inner plate radius (e.g., a distance from the outer plate edge to the innermost extent of the electrodes), where the value R/P*G is provided within selected bounds for either the outer plate radius, the inner plate radius, or both.

Where the separating assembly includes a feature positioned in the gap (e.g., a coupled bearing, rolling element, mechanical extension or bumper, etc.), the separation feature would typically (e.g., unless electrodes were to be divided into more than one radial portion, and/or where the separation feature traverses over the electrodes, for example with electrodes embedded within a glass substrate, but such an arrangement may nevertheless be undesirable due to potential disruption of the field) be positioned radially inside the electrode radial span, and/or positioned radially outside the electrode radial span. Accordingly, in certain embodiments, the R parameter may be utilized to determine a position of separation features of the ESM, and/or the position of the separation features may be utilized in lieu of the radial extent of the electrodes. The example design relationship is non-limiting. It will be seen that higher values of the R/(P*G) parameter may tend to provide a stronger field (e.g., a smaller gap and/or greater radial extent may tend to increase the capacitive field strength), although other parameters such as the dielectric strength of the fluid, electrical characteristic of the exciter circuit, may degrade the ability to fully achieve an ideal field strength, and/or manufacturing and/or control constraints may limit the ability to properly operate an ESM having extreme values of the R/(P*G) parameter. In certain embodiments, an example design relationship such as $0.1 \leq R/(P*G) \leq 3$, $0.5 \leq R/(P*G) \leq 1.5$, $0.3 \leq R/(P*G) \leq 6$; $1.5 \leq R/(P*G) \leq 5$, $0.01 \leq R/(P*G) \leq 8$ may be for an ESM. In certain embodiments, sizing of the parameters of the capacitive stack may be based on other parameters, and not utilize a design relationship such as depicted.

The stator plate 202 is configured to be fixed to the housing 102. An example arrangement includes the stator plates 202 having a plurality of stator mounting openings 207 sized to receive support pegs 126 (and/or fins, spline elements, or the like) that are fixed to the housing 102 (e.g., to an end wall of the housing 102 as shown in FIG. 1, and/or which may be formed as a part of the housing). In certain embodiments, support pegs 126 and/or other aspects of the housing and/or shaft coupling for stator plates 102 and/or rotor plates 110 may additionally enforce arrangement of the plates—for example ensuring that the plates have a proper radial alignment and/or orientation (e.g., which axial face of a plate faces which end of a housing of the ESM). The arrangement of the stator electrodes 204 along the stator plate 202 is similar to the arrangement of rotor electrodes 112 along the rotor plate 110. In other embodiments, the shape, arrangement, and/or number of stator electrodes 204 may be different. The example arrangement of FIG. 1 provides for ready assembly of an ESM 100, for example by building the capacitor stack 702 onto the shaft 104 and/or end wall of the housing 102, and then placing the housing 102 over the capacitor stack 702.

In operation, the rotor plate assemblies 106 rotate relative to the stator plate assemblies 200 about a central axis 108 of the shaft 104 (e.g., in a clockwise or counterclockwise direction). A capacitance is formed between the stator electrodes 204 and the rotor electrodes 112. The stator electrodes 204 can be negatively charged and the rotor electrodes 112 can be positively charged. In other embodiments, the stator electrodes 204 can be positively charged and the rotor electrodes 112 can be negatively charged. In yet other embodiments, a DC voltage is applied to the rotor electrodes 112 and an AC voltage is applied to the stator electrodes 204 (i.e., alternating polarity). In yet other embodiments, the stator electrodes 204 and the rotor electrodes 112 can alternate polarities over time. In certain embodiments, at least one of the stator electrodes 204 and/or the rotor electrodes 112 can utilize polyphase voltages.

As shown in FIG. 1, the stator plate assembly 200 additionally includes a plurality of separation assemblies 208 configured to maintain separation between the rotor plate 110 and the stator plate 202 during motor operation (e.g., to prevent the gap between the rotor plate 110 and the stator plate 202 from collapsing in the presence of a bias voltage between the rotor electrodes 112 and the stator electrodes 204). The separation assemblies 208, and/or other separation enforcement aspects herein, may be associated with the stator plates 202, rotor plates 110, and/or a combination of both. Certain advantages in utilizing the stator plates 202 include: reduction of rotating inertia by including mass carrying elements of the separation assemblies 208 on the stator plates 202, reduction of balancing requirements by including mass carrying elements of the separation assemblies 208 on the stator plates 202 (e.g., reducing a symmetry requirement for separation features such as bearings and/or rotating elements), balancing forces exerted on plates by sharing elements of separation assemblies 208 between the rotor and/or stator plates, and/or simplifying manufacturing processes, reducing part counts, and/or simplifying assembly, for example by keeping each rotor plate 110 consistent and similar, and/or by keeping each stator plate 202 consistent and similar.

Figure 2:
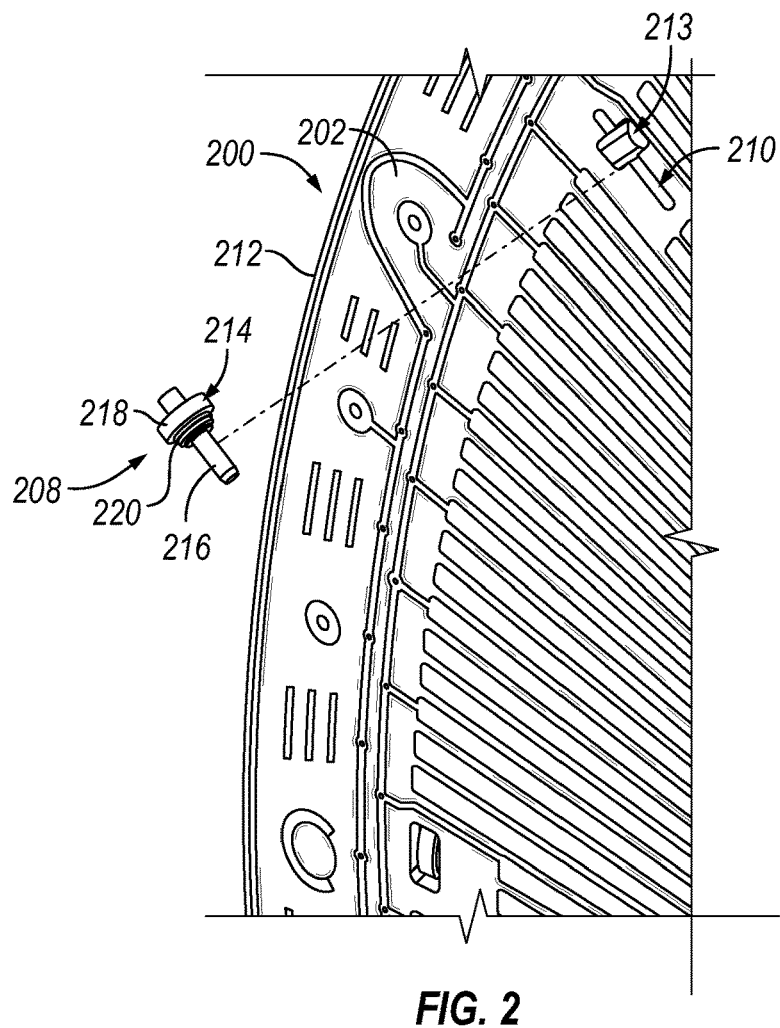
FIG. 2 is a schematic depiction of a system for an electrostatic motor.

Referencing FIG. 2, an exploded view of a portion of an example stator plate assembly 200 is depicted. The stator plate 202 defines a plurality of recessed areas 210 sized to at least partially receive a respective one of the separation assemblies 208 therein. The plurality of recessed areas 210 are disposed on distributed sides of the stator plate 202 (in the example) along an azimuthal direction, such that the separation assemblies 208 maintain the separation between the stator plate 202 and the rotor plate 110 on the rotor facing surfaces 206 of the stator plate 202 (see also FIG. 1).

Figure 3:
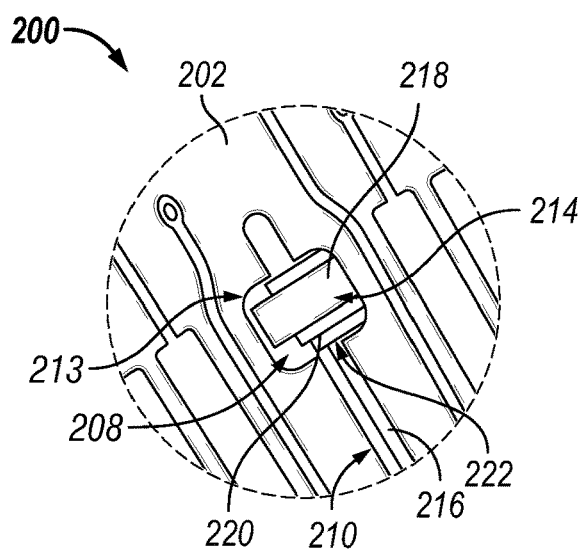
FIG. 3 is a schematic depiction of a system for an electrostatic motor.

Referencing FIG. 3, the example recessed areas 210 are disposed proximate to an outer perimeter 212 of the stator plate 202, at a location near an unsupported outer end of the stator plate 202 (adjacent an outer radial end of the stator electrodes 204 along the stator plate 202, etc.), but within a matching outer perimeter of an adjacent rotor plate 110, allowing the separation assembly 208 to engage the rotor plate 110 at a selected feature (e.g., along a track configured to engage a rolling element 214 of the separation assembly 208). In other embodiments, the separation assemblies 208 may be disposed at other radial locations along the stator plate 202 (e.g., near an inner perimeter of the stator plate 202 and/or between the inner perimeter and the outer perimeter). Example separation assemblies 208 are spaced at approximately equal intervals along the circumference of the stator plate 202. The radial positioning and/or azimuthal distribution of separator assemblies are provided according to expected axial forces experienced by the rotor plate 110 and/or stator plate 202, and the lever arm of the plates relative to secured locations (e.g., at the shaft 104 or inner perimeter for rotor plates 110, and housing 102 or outer perimeter for stator plates 202).

In the example of FIG. 3, each of the recessed areas 210 is shaped as an elongated groove that extends in a substantially radial direction. In other embodiments, the shape and/or direction of each of the recessed areas 210 may be different. The stator plate 202 additionally defines a plurality of passages 213 extending through the stator plate 202. Each of the passages 213 passes through a respective one of the recessed areas 210 in between opposing ends of the recessed area 210. The passages 213 allow fluid to pass through the stator plate 202 and at least a portion of the separation assembly 208, which, advantageously, provides cooling to the separation assembly 208 during operation. Additionally or alternatively, the passages 213 allow a single separation assembly 208 to perform separating operations for both adjacent plates—for example, a single separation assembly 208 may be capable to engage (at least during certain operating conditions) either rotor plate 110 on each side of a stator plate 202, and/or engage either stator plate 202 (at least during certain operating conditions) on each side of a rotor plate 110. In certain embodiments, for example where a single separation assembly 208 is configured to engage both adjacent plates, additional features such as two separate rolling elements included in the single separation assembly 208 (e.g., one for each side, to ensure proper rotational engagement with each of the adjacent plates), and/or distinct engagement configurations (e.g., the rolling element is configured to rotationally engage an adjacent plate on a first side, and to slidingly engage an adjacent plate on the second side (e.g., using a race having a low friction material surface, such as polytetrafluoroethylene).

In certain embodiments, a separation assembly 208 is positioned on a single side of a plate, and engages a single adjacent plate on that side of the plate having the separation assembly 208 mounted thereon. Example considerations for determining how the separation assemblies 208 are sized, mounted, and/or positioned include: sizing and/or positioning of separator assembly elements (e.g., rolling elements, retaining elements, and/or engaging elements on an adjacent rotor and/or stator plate); rotational speed ranges and/or duty cycle of the rotor plate(s) 110; assembly considerations for the ESM (e.g., whether all corresponding plates are identical, whether plate orientation is a consideration, and/or whether terminating plates are distinct in configuration, separation mechanisms, etc.); an enforced separation distance between adjacent plates; axial forces exerted on the plate, including a radial and/or azimuthal profile of such forces, and a dynamic (e.g., time progression of forces, and/or a frequency component of such forces) and/or static description of these; and/or a thickness of the stator plate assembly 200 and/or rotor plate assembly 106.

In other embodiments, the shape, number, and arrangement of the recessed areas 210 and the passages 213 may be different. While the embodiment of FIG. 3 includes passages 213 for each of the recessed areas 210, it will be appreciated that the present disclosure also contemplates embodiments in which the recessed areas 210 do not include passages 213.

In the example of FIGS. 2-3, the separation assembly 208 includes a bearing assembly 214 and a retainer 216. The bearing assembly 214 may be similar to a typical ball/roller bearing. For example, the bearing assembly 214 may be a deep-groove ball bearing, a spherical roller bearing, a cylindrical roller bearing, a needle roller bearing, or another ball/roller bearing type. An example bearing assembly 214 includes a simple bearing, for example a roller engaging a bushing. An example separation assembly includes a mechanical extension, stub, or pad, a bumper, and/or a thrust bearing associated with, coupled to, and/or integral with, one of a rotor plate and/or a stator plate, and configured to engage an adjacent plate to enforce a minimum separation distance between electrodes of the rotor plate and/or stator plate, and the adjacent plate. In certain embodiments, the mechanical extension, stub, or pad, is configured to slidably engage and adjacent plate, for example at a race, track, and/or landing of the adjacent plate.

As shown in FIG. 2, the bearing assembly 214 includes a plurality of cylindrical races including an outer race 218 (e.g., raceway, ring, etc.) and an inner race 220 disposed substantially within the outer race 218 in a substantially concentric arrangement with respect to the outer race 218. The bearing assembly 214 also includes a plurality of rolling elements (not shown) supported by the outer race 218 and the inner race 220 within a radial gap formed between the outer race 218 and the inner race 220 (e.g., along an outer surface of the inner race 220 and an inner surface of the outer race 218, etc.).

In some embodiments, at least one of the outer race 218 or the inner race 220 (e.g., one or a combination of the outer race 218 and the inner race 220) defines a groove that forms a pathway to guide movement of the rolling elements. The rolling elements separate the outer race 218 from the inner race 220 and permit the outer race 218 to move relative to the inner race 220. In some embodiments, the bearing assembly further includes a cage (e.g., retainer) that separates the rolling elements and supports the rolling elements in position along the outer race 218 and the inner race 220 (e.g., that prevents the rolling elements from becoming dislodged from the outer race 218 and the inner race 220). In other embodiments, the bearing assembly may additionally include seals and/or shields to protect the rolling elements and races from particulate contamination and improve bearing service life. In yet other embodiments, the bearing assembly may include devices such as bushings, simple bearings, magnetics (e.g. permanent magnets, electromagnets and/or back-iron) or electrostatics (e.g. electrets and/or capacitor plates) to attract and remove particulate contaminants. The magnetics/magnetic devices may also be separate from the bearing assembly and may also pull metal particles out of the dielectric liquid, which may be beneficial to extend the service life of the dielectric liquid and minimize wear on other components of the assembly.

An example electrostatic machine includes one or more of the seals having a material selected to be compatible with a dielectric fluid of the electrostatic motor. In certain embodiments, the seal material is selected to be compatible with the dielectric fluid at an operating temperature of the electrostatic machine. An example seal includes a first material encapsulated in a second material, where the second material is compatible with the dielectric fluid, thereby allowing for the encapsulated material to be selected for a first set of properties, and the encapsulating material to be selected for compatibility with the dielectric fluid. An example seal includes a fluorinated ethylene propylene. Another example seal includes a virgin polytetrafluoroethylene (e.g. formulated from a pure PTFE resin without recycled material). An example seal includes a PTFE/PEI combination (polytetrafluoroethylene/polyetherimide). An example seal includes a high density terpolymer (e.g., Viton™, manufactured by Chemours™) including ethylene, tetrafluoroethylene, and perfluoromethyl vinyl ether monomers. An example seal includes a perfluoroelastomer. An example electrostatic machine includes a second seal associated with an electrical coupling between an exciter fluidly isolated from the dielectric fluid and at least one of the stator plates or the rotor plates, and where the second seal includes a material compatible with the dielectric fluid. An example second seal includes a cured potting material (e.g., reference FIG. 16 and the related description). An example seal includes a liquid seal, for example a ferrofluid seal.

Figure 17:
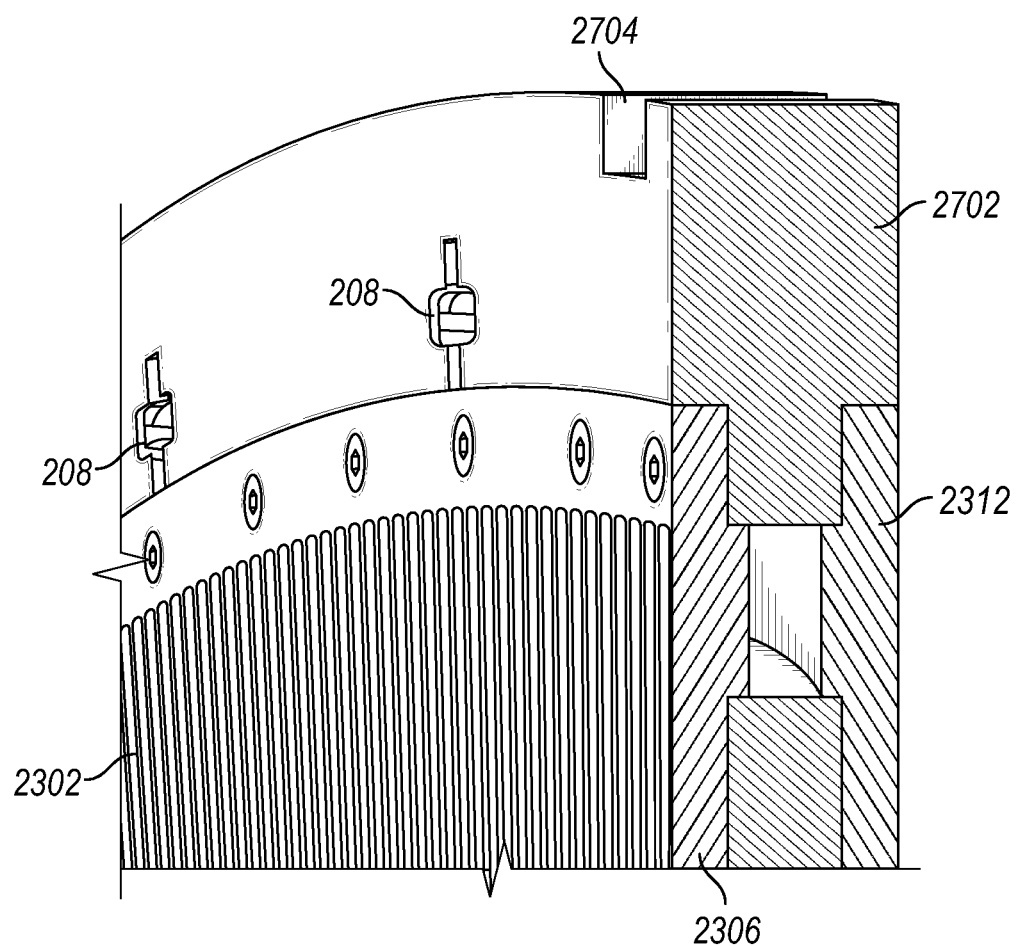
FIG. 17 is a schematic depiction of a system for an electrostatic motor.

An example separation assembly includes a rotor magnetic element disposed within the rotor plate (e.g., forming all or a portion of a spacer within the plate, and/or a securing substrate 2702—reference FIG. 17) and/or otherwise positioned between opposing surfaces of the respective rotor plate, and a stator magnetic element disposed within the stator plate. The magnetic elements are arranged such that poles of the rotor magnetic element and stator magnetic element are positioned in a repelling arrangement (e.g., N-N or S-S). It can be seen that, in certain embodiments, magnetic elements of each rotor plate may be aligned in a same direction (e.g., all N poles facing a first end plate of the ESM), and magnetic elements of each stator plate may be aligned in a same (opposite to the rotor alignment) direction (e.g., all S poles facing the first end plate of the ESM). Accordingly, in certain embodiments, and depending upon the size, strength, and positioning of the magnetic elements (including, e.g., where magnetic elements are provided as permanent magnets), and the conductive environment of the ESM (including the local environment of the plate, for example plate substrate, surface, and/or PCB materials), a single magnetic element within each plate may serve to provide gap enforcement operations for both sides of a given plate. Additionally or alternatively, utilization of common magnetic elements (e.g., within each respective one of the rotor stack and/or stator stack) can facilitate utilization of common parts (e.g., rotor plates having common elements of a configuration, and/or an identical configuration). In certain embodiments, for example depending upon a rating of the ESM, a field strength and/or excitation parameters for the capacitive stack 702, etc., magnetic elements for the capacitive stack 702 of a first ESM may vary from magnetic elements for the capacitive stack 702 of a second ESM, but maintain certain common aspects such as a physical size of the magnetic elements, an arrangement (e.g., orientation, position, etc.), and/or an assembly element (e.g., securing features, installation and/or replacement procedures, etc.). In certain embodiments, the rotor plate and/or stator plate include a conductive material between the magnetic element and the dielectric fluid (and/or gap between the rotor plate and/or the stator plate), for example facilitating magnetic coupling between adjacent plates (where, in the example, magnetic coupling indicates availability of repulsive magnetic action). In certain embodiments, one or more magnetic elements may be an electromagnet, for example powered from the excitation circuit, and/or a separate circuit, which may facilitate adjusting the enforced gap during operations, adjusting the repulsion forces available (e.g., allowing for a change in ESM rating, gap configuration, etc. through a control update, rather than, or in addition to a hardware update). For example, the utilization of an electromagnet magnetic element, potentially combined with a permanent magnet, allows for adjustment within a range (e.g., during operations and/or to accommodate a different rating for the ESM). In certain embodiments, a magnetic separation assembly includes a distinct configuration for a terminating plate (whether a stator plate or a rotor plate), including for example utilizing a smaller magnetic element, a magnetic field attenuator on a side of the terminating plate that faces away from the rest of the capacitive stack, and/or utilization of a non-magnetic housing (which may be already provided apart from consideration for a magnetic separation assembly), the magnetic separation assembly may be omitted for one or more terminating plates (e.g., where the terminating plate utilizes a different gap enforcement such as a bearing, mechanical extension, and/or bumper, and/or where the terminating plate does not utilize gap enforcement, for example where a fixed axial position of the terminating plate is sufficient for operations without separate gap enforcement), and/or a spacer, insulator, or other feature may be positioned between the terminating plate and the housing, and/or included on the housing (e.g., on an inner surface of the housing).

As shown in FIG. 3, the inner race 220 defines a central opening 222 configured to receive the retainer 216 therein such that the bearing assembly is disposed between opposing ends of the retainer 216. As shown in FIG. 3, the retainer 216 is a cylindrical pin (e.g., rod, shaft, etc.). In other embodiments, the retainer 216 may be another suitable support structure configured to engage with the recessed areas 210. The inner race 220 is engaged with the retainer 216 in a friction fit arrangement, which substantially prevents movement of the inner race 220 with respect to the retainer 216.

The retainer 216 supports the bearing assembly 214 within a respective one of the recessed areas 210 in the stator plate 202 such that the bearing assembly 214 at least partially protrudes beyond (e.g., extends beyond, extends outwardly from, etc.)) the surface of the stator plate 202. As shown in FIG. 3, the recessed area 210 is sized to receive the retainer 216 therein in a press-fit and/or friction-fit arrangement. In some embodiments, the recessed area 210 is larger than the retainer 216 such that the entire retainer 216 is disposed below the surface of the stator plate 202. In other embodiments, a portion of the retainer 216 protrudes from the surface of the stator plate 202. As shown in FIG. 2, the retainer 216 supports the bearing assembly 214 in a direction that is substantially parallel to the rotational direction of the rotor plate 110 and shaft 104 (see also FIG. 1)(e.g., along a reference line tangent to the circumferential direction).

In the embodiment of FIGS. 2-3, the outer race 218 of the bearing assembly 214 protrudes from the surface (e.g., a rotor facing surface) of the stator plate 202 past (e.g., beyond) the stator electrodes 204. A height of the bearing assembly 214 above the surface of the stator plate 202 is determined, at least in part, by the design of the retainer 216 and the depth of recessed area 210. In various illustrative embodiments, the height of the bearing assembly 214 above the surface of the stator plate 202 is approximately equal to the size of the gap (e.g., a separation distance between the stator plate 202 and the rotor plate 110 as shown in FIG. 1), and/or a size of a minimum gap to be enforced as the various plates move and/or flex in the axial direction.

In various illustrative embodiments, the height of the bearing assembly 214 above the surface of the stator plate 202 is adjustable. For example, the bearing assembly 214 may additionally include at least one shim that is "sandwiched" or otherwise disposed between the retainer 216 and the recessed area 210. In other embodiments, the bearing assembly includes an adjustment mechanism (e.g., a screw, etc.) that engages with the stator plate 202 (e.g., the recessed area 210, etc.) to set the height of the bearing assembly 214 above the surface of the stator plate 202. The adjustment mechanism may be coupled to the retainer 216 and/or the stator plate 202 (e.g., through a hole that extends through a portion of the recessed area 210). Among other benefits, incorporating an adjustment mechanism into the bearing assembly allows the same bearing assembly to be used in motors having different gap sizes between the rotor plates 110 and the stator plates 202, and/or allows for adjustments responsive to various tolerances to components of the capacitor stack of the ESM.

Figure 4:
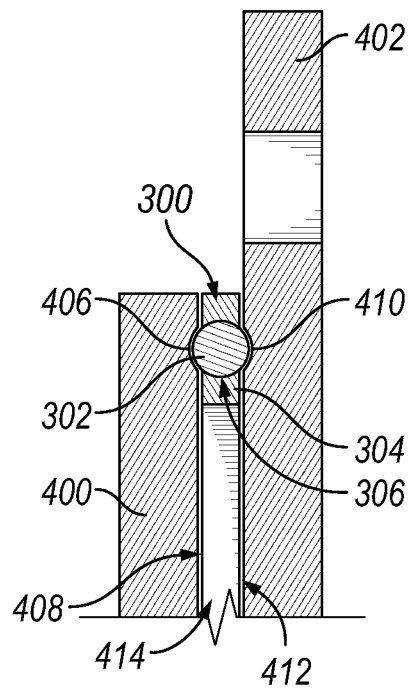
FIG. 4 is a schematic depiction of a system for an electrostatic motor.
Figure 5:
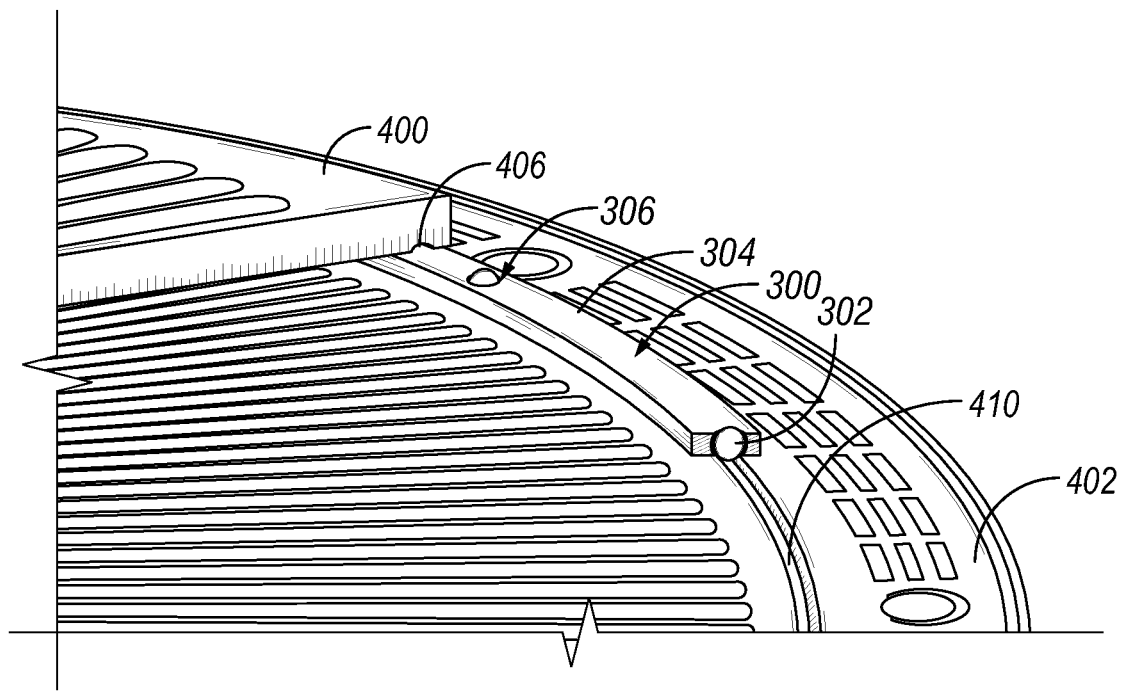
FIG. 5 is a schematic depiction of a system for an electrostatic motor.

The design of the separation assembly 208 described with reference to FIGS. 1-3 should not be considered limiting. Various alternatives and combinations are possible without departing from the inventive concepts disclosed herein. For example, FIGS. 4-5 are cross-sectional views of a separation assembly 300 of an electrostatic motor in which the rotor plate 400 and stator plate 402 form part of the separation assembly 300. In particular, the rotor plate 400 and the stator plate 402 function as an upper and lower bearing race for the separation assembly 300. The rotor plate 400 defines a rotor groove 406 (e.g., a "U" shaped channel, a "V" shaped channel, etc.) disposed in a stator facing surface 408 of the rotor plate 400 and extending in a circumferential direction along an outer perimeter of the rotor plate 400. The stator plate 402 defines a stator groove 410 in a rotor facing surface 412 of the stator plate 402 that mirrors the rotor groove 406 (e.g., that has a similar shape as the rotor groove 406).

As shown in FIG. 4-5, the separation assembly 300 is "sandwiched" or otherwise disposed between the rotor plate 400 and the stator plate 402, within a gap 414 formed between the rotor plate 400 and the stator plate 402. As with the separation assembly 208 of FIGS. 1-3, the separation assembly 300 of FIGS. 4-5 is positioned near an outer perimeter of the rotor plate 400 and the stator plate 402. The separation assembly 300 includes a plurality of rolling elements 302 and a retainer 304. The rolling elements 302 are spherical balls with a smooth outer surface. In other embodiments, the rolling elements 302 may be cylindrical, conical, tapered, or another suitable shape. The rolling elements 302 may be made from stainless steel, ceramic, a high strength thermoplastic, an acetal thermoplastic (e.g., Delrin®, available from DuPont), and/or another heat and chemical resistant material (e.g., materials compatible with the dielectric fluid used in the electrostatic machine).

The retainer 304 is slidably engaged with the rolling elements 302 and supports the rolling elements 302 in position along the rotor groove 406 and the stator groove 410. The retainer 304 also separates the rolling elements 302 in approximately equal intervals along the length of the rotor groove 406 and the stator groove 410. As shown in FIGS. 4-5, the retainer 304 is a curved plate (e.g., an annular plate, a ring-shaped plate, a cylindrical plate, etc.) having an axial thickness that is less than a size of the gap 414 (e.g., a width of the gap 414 along a direction parallel to a rotational axis of the rotor plate 400). The retainer 304 defines a plurality of curved (e.g., circular) openings 306 configured to receive the rolling elements 302 therein.

The size, shape, and arrangement of the retainer 304 and the rolling elements 302 may differ in various illustrative embodiments. In some embodiments, the separation assembly may include a thrust bearing of a construction that is different from that shown in FIGS. 4-5. In other embodiments, the separation assembly may include a different type of mechanical separator. For example, the separation assembly may include a thrust washer (e.g., rotary thrust washers, etc.) that is made from a material with a low friction coefficient such as steel, bronze, plastic, or another suitable material. The thickness of the thrust washer may be less than a nominal size of the gap to prevent contact between the moving surfaces during normal operation (e.g., in the absence of a large attractive force between the rotor plate 400 and the stator plate 402). The thrust washer may be affixed directly to the surface of one of the stator plate 402 and the rotor plate 400. In other embodiments, the thrust washer may be replaced with at least one bumper (e.g., a small protrusion mounted on the surface of the rotor plate 400 or stator plate 402), a thrust plate, or another mechanical spacer.

In yet other embodiments, the separation assembly is configured to apply a magnetic force to counteract the attractive force between the rotor plates and the stator plates. For example, the separation assembly may include at least one rotor magnet (e.g., a piece of neodymium iron boron (NdFeB), samarium cobalt (SmCo), alnico, ceramic, ferrite, or another permanently magnetic material) fixed to the rotor plate and a corresponding stator magnet fixed to the stator plate in alignment with the rotor magnet (e.g., located at substantially the same radial position as the rotor magnet, etc.). In other embodiments, the rotor plate and/or stator plate includes at least one electromagnet. In yet other embodiments, the separation assembly may include a magnetic circuit which provides magnetic coupling between at least one stator plate and at least one rotor plate with at least one permanent magnet and/or at least one electromagnet, such that a magnetic force counteracts the attractive force between the rotor plates and stator plates, without requiring close relative radial positioning of the magnets or electromagnets themselves.

Figure 6:
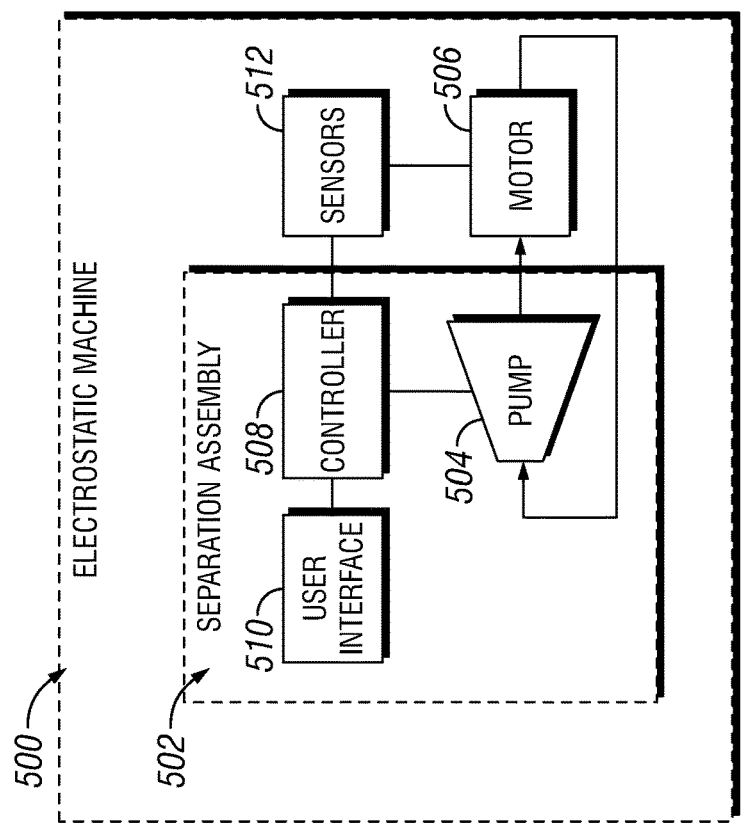
FIG. 6 is a schematic depiction of a system for an electrostatic motor.

FIG. 6 is a block diagram of an electrostatic machine 500 that includes a fluid-driven separation assembly 502. The separation assembly 502 includes a pump 504 or other fluid driver that is fluidly coupled to an electrostatic motor 506. The pump 504 is configured to circulate dielectric fluid through the motor 506. In certain embodiments, circulation of the dielectric fluid promotes separation of the plates, for example by circulating through gaps (e.g., spaces) formed between the stator plates (e.g., stator plate 202 of FIG. 1) and rotor plates (e.g., rotor plate 110 of FIG. 1) of the motor 506. Additionally or alternatively, circulation of the dielectric fluid promotes heat transfer to (e.g., from electrodes, and/or from the shaft) and/or from (e.g., to the housing) the dielectric fluid. Additionally or alternatively, circulation of the dielectric fluid promotes uniformity of composition of the dielectric fluid, for example promoting dispersal of additives, entrained or dissolved gases, or the like, which may support performance of the dielectric fluid, such as ensuring the composition in gaps is within designed values. Additionally or alternatively, circulation of the dielectric fluid promotes selected fluid flow regimes (e.g., laminar, turbulent, and/or an intermediate regime) within the ESM, for example to promote fluid characteristics (e.g., heat transfer, mixing, mass transfer), and/or friction loss characteristics.

Circulation of the dielectric fluid may be promoted by a flow feature within the ESM, for example a baffle of a housing and/or on a stator plate, a fin or other active flow feature provided on a rotor plate, and/or flow channels provided within rotor plates, stator plates, the shaft, and/or the housing. In certain embodiments, flow features within the ESM coordinate with a pump 504 to provide selected flow characteristics. In certain embodiments, flow features provide selected flow characteristics, responsive to general fluid circulation within the housing as provided by the movement of the rotor plates and the shaft.

Figure 7:
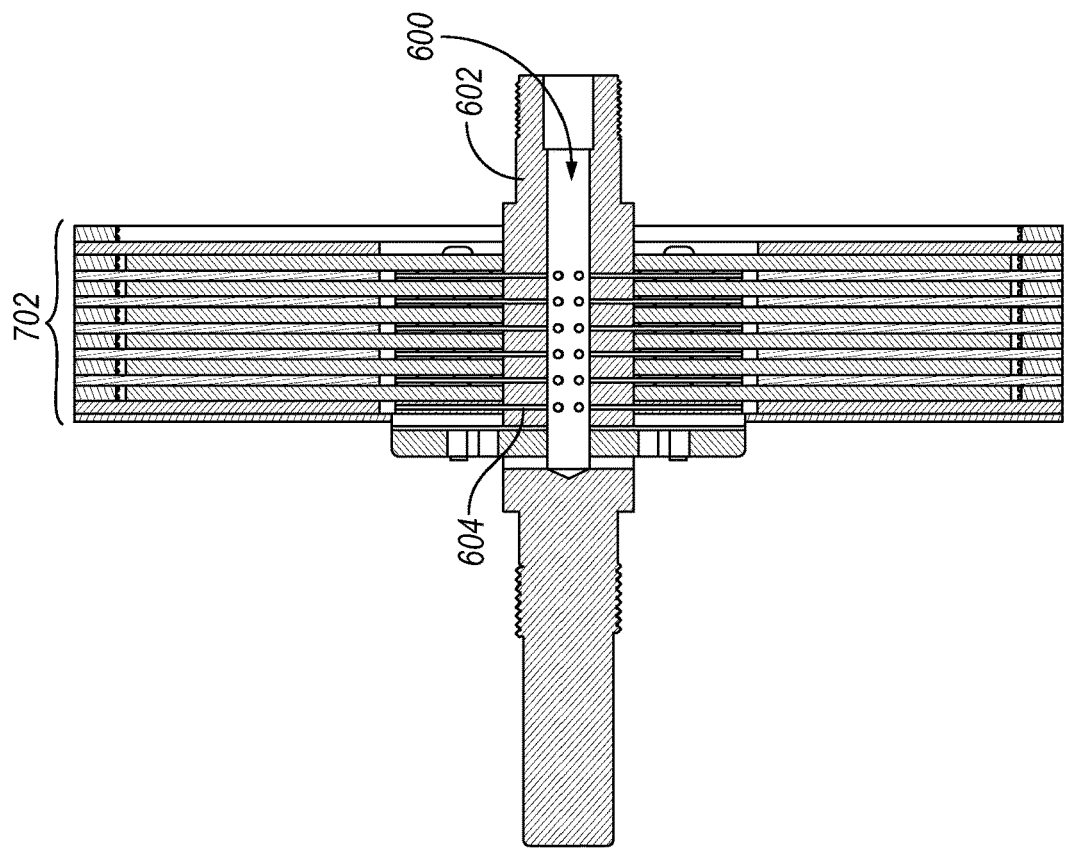
FIG. 7 is a schematic block diagram of a separation assembly controller for an electrostatic motor.

Referring to FIG. 7, the pump 504 may be fluidly coupled to flow channels (e.g., passages, etc.) 600 defined by a shaft 602 (e.g., similar to the shaft 104 of FIG. 1) of the motor 506. As shown in FIG. 7, the flow channels 600 extend along the length of the shaft 602, in a direction that is substantially parallel to an axis of the shaft 602. Fluid received in the channels 600 is routed through the channels 600 along an axis of the shaft 602 and out through openings 604 disposed along the length of the shaft 602. Fluid leaving through the openings 604 is forced through the gaps between the stator and rotor plates in a substantially radial direction.

Figure 8:
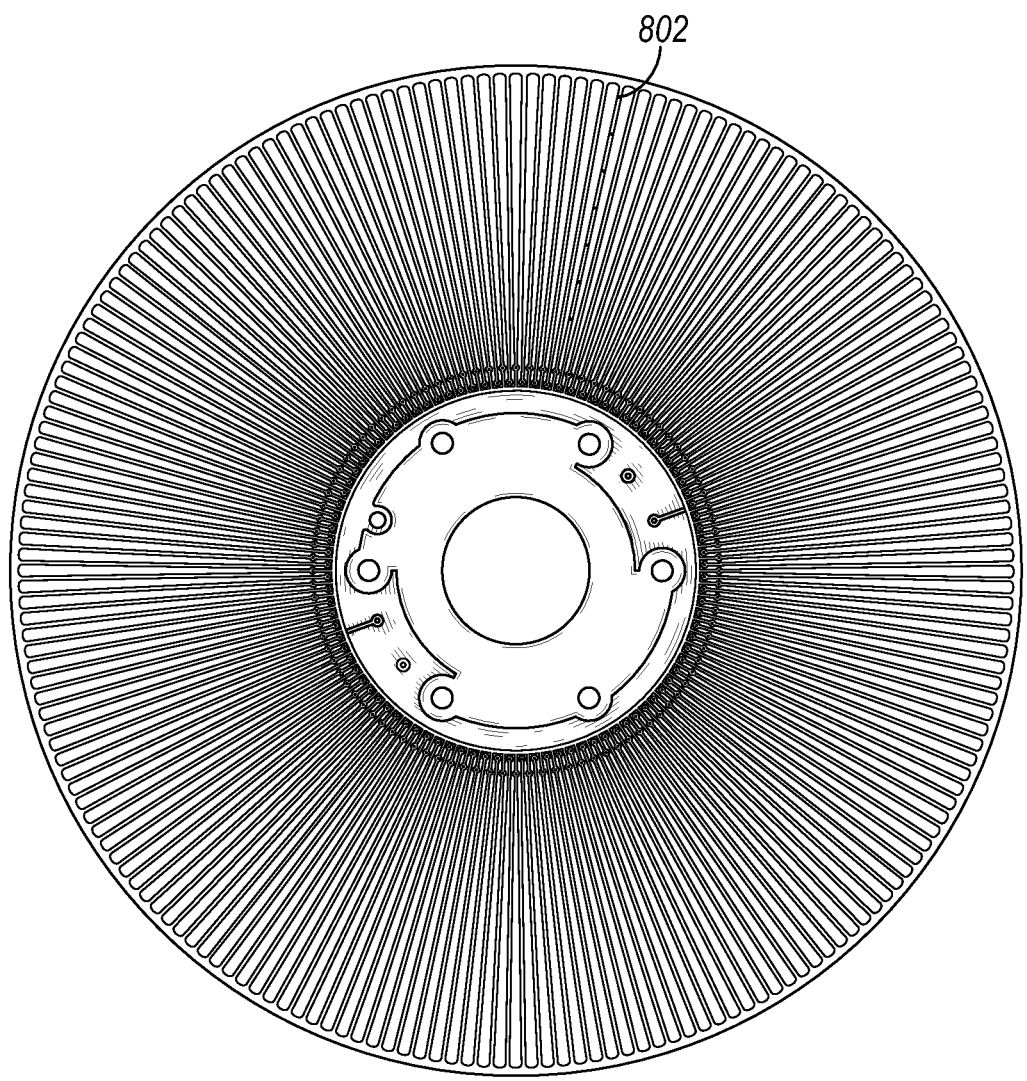
FIG. 8 is a schematic depiction of a system for an electrostatic motor.
Figure 9:
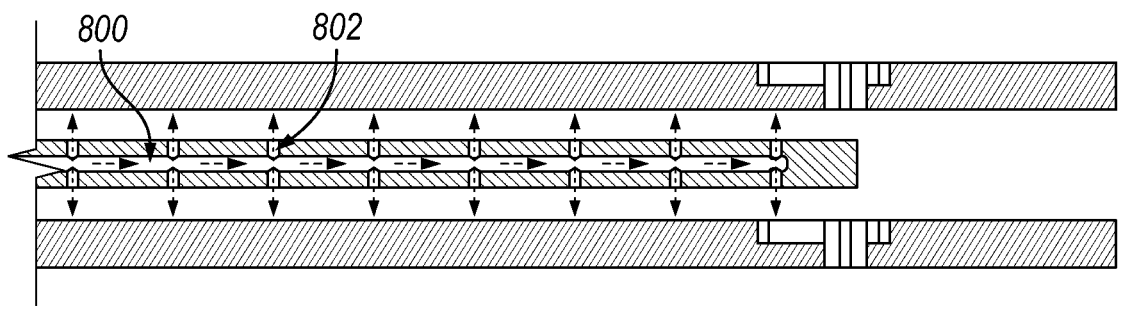
FIG. 9 is a schematic depiction of a system for an electrostatic motor.
Figure 10:
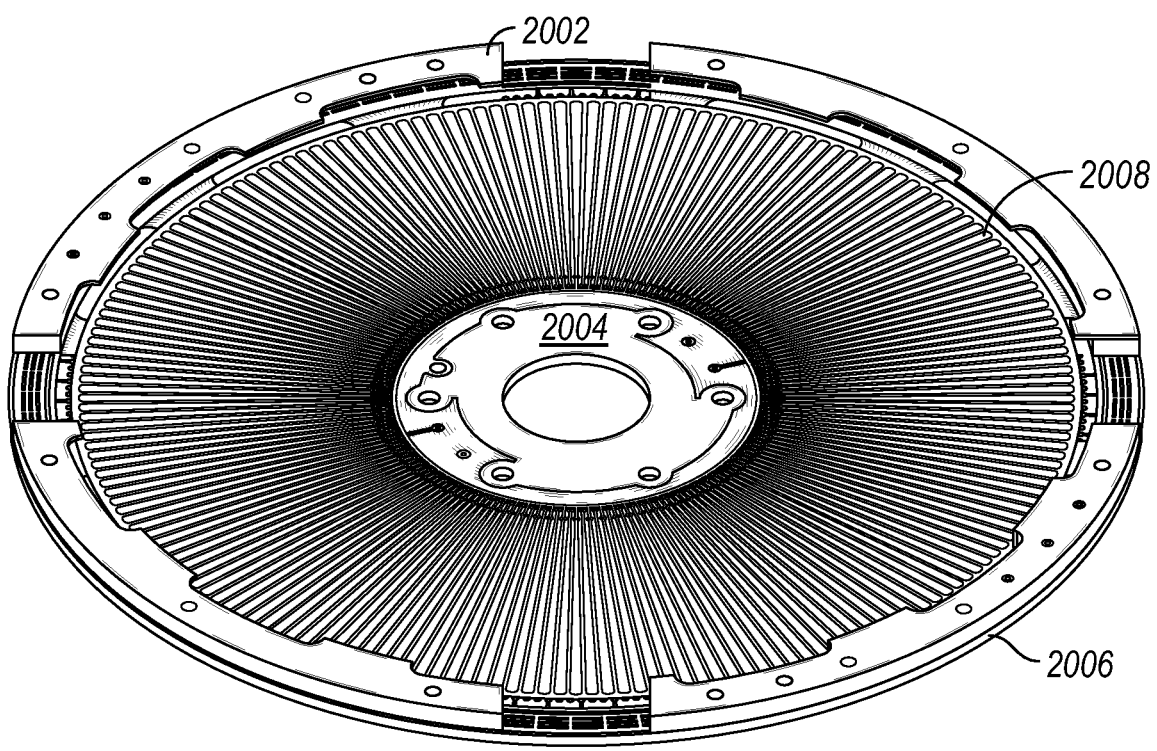
FIG. 10 is a schematic depiction of a system for an electrostatic motor.

In other embodiments, the pump 504 may be fluidly coupled to flow lines positioned within the motor housing (e.g., housing 102 of FIG. 1) and configured to direct the flow of dielectric fluid into the gaps between the rotor plates and the stator plates. In yet other embodiments, as shown in FIGS. 8-9, the pump 504 may be fluidly coupled (via the shaft and/or the housing) to channels 700 or voids formed into the rotor and/or stator plates. As shown in FIG. 9, the flow is directed through channels 700 formed into the rotor plate (and/or the stator plate) that extend in a radial direction from the shaft (or from the housing, e.g., where channels are formed in stator plates) toward an outer perimeter of the rotor plate. As shown in FIGS. 8-10, the channels 700 are fluidly coupled to openings 702 (e.g., holes, perforations, etc.) that extend through the surface of the rotor plate. The openings 702 are configured to distribute flow into the gaps between the rotor and stator plates. The number, size, and arrangement of openings 702 may differ in various illustrative embodiments.

The flow of fluid between the rotor and stator plates forms a hydrostatic bearing that substantially prevents the plates from moving toward one another. The flow rate of fluid through the gap is a function of the size of the gap and the characteristics of the pump 504. As the size (e.g., width) of the gap decreases (e.g., due to the attractive force between the rotor electrodes and the stator electrodes), the fluid pressure between the rotor and stator plates increases. The increase in fluid pressure counteracts the attractive force between the rotor and stator plates.

As shown in FIG. 6, an example separation assembly 502 additionally includes a controller 508 and a user interface 510. The controller 508 is communicably coupled to the pump 504 and is configured to control the pump 504 to achieve a desired flow rate of dielectric fluid through the motor 506. In some embodiments, the controller 508 is a variable frequency drive (e.g., AC drive, inverter drive, etc.) configured to control the speed of the pump 504 by varying motor input frequency and voltage. In other embodiments, the controller 508 is another motor speed controller. In some embodiments, the controller 508 is communicably coupled to at least one sensor 512 and configured to control the pump 504 (e.g., the flow rate of fluid) based on information received from the sensor 512. The information may be a voltage across the stator electrodes and the rotor electrodes of the electrostatic motor 506. Voltage determinations herein may be performed using a differential voltage determination, and/or a single ended voltage determination. In other embodiments, the sensor data may be a dielectric fluid temperature, a fluid pressure, a current, torque, acceleration, velocity, position, or other sensor data indicative of the operational performance of the motor 506 and/or pump 504. In some embodiments, the controller 508 further includes a power source (e.g., an alternating power source such as available line voltage, a transformer, rectifier, etc. configured to convert electrical power into power useable by the one or more elements of the controller 508, a battery, etc.). In yet other embodiments, the pump 504 is separately driven by an external motor or other device (e.g., via a power take-off (PTO), accessory belt, pulley, etc.).

As shown in FIG. 6, the controller 508 is communicably coupled to the user interface 510. The controller 508 is configured to receive and interpret user data, information, and/or instructions from the user interface 510 to control the pump 504. The user interface 510 may include a monitor (e.g., indicator, etc.) configured to display information from the sensors 512 and/or operational data from the pump 504 (e.g., operating speed, voltage, etc.). The user interface 510 may also include a control panel (e.g., keyboard, touch-screen, etc.) configured to receive user inputs. For example, the user interface 510 may enable a user to designate, select, or otherwise define the desired operating speed of the pump 504 to vary the fluid pressure applied to separate the rotor and stator plates.

Some embodiments of a hybrid electric drive machine may include actuators including those for rotary and linear motion. For example, in one embodiment, a first gearbox shaft may connect to an electromagnetic actuator, a second gearbox shaft may connect to an electrostatic machine, and a third gearbox shaft may connect to a mechanical load. In another embodiment, a first gearbox shaft may connect to a pneumatic actuator, a second gearbox shaft may connect to an electrostatic machine, and a third gearbox shaft may connect to an electromagnetic machine. In another embodiment, a first gearbox shaft may connect to a piezoelectric actuator, a second gearbox shaft may connect to an electrostatic machine, and a third gearbox shaft may connect to mechanical load.

Some embodiments of a hybrid electric drive machine may include the electrostatic machine having a direct mechanical connection to a mechanical load. In one embodiment, the shaft of an electromechanical system such as an electromagnetic machine may be directly connected or shared with the shaft of the electrostatic machine, which is connected to a first gearbox shaft, and a second gearbox shaft is connected to a mechanical load.

Some embodiments of a hybrid electric drive machine may include at least one mechanical energy storage device, which can be rotary and/or linear, attached to a shaft or integrated inside the hybrid electric drive machine. Some types of energy storage devices include methods of converting between kinetic and potential energy across domains including but not limited to fluid, mechanical, electrical, and thermal. Some illustrative examples of energy storage devices may include flywheels, pneumatic pumps with pneumatic accumulators, hydraulic pumps with hydraulic accumulators, and springs. In one embodiment, a first gearbox shaft may be connected to an electrostatic machine, a second gearbox shaft may be connected to an electromagnetic machine, a third gearbox shaft may be connected to a mechanical load, and a fourth gearbox shaft may be connected to a high energy torsion spring. In another embodiment, a first gearbox shaft may be simultaneously connected to both an electrostatic machine and a high energy torsion spring, a second gearbox shaft may be connected to an electromagnetic machine, and a third gearbox shaft may be connected to a mechanical load.

Some embodiments of a hybrid electric drive machine may include an electrical energy storage device which utilizes at least one electromechanical device for converting mechanical energy in the hybrid electric drive machine into electrical energy for storage.

Examples of suitable electromechanical devices include but are not limited to electrostatic, electromagnetic, and piezoelectric machines. Such devices typically utilize a power converter to convert electrical energy into a form usable by the device. Illustrative examples of electrical energy storage devices include capacitors, inductors, batteries, supercapacitors, ultracapacitors and electromechanical flywheels. Illustrative examples of power converters include Voltage Source Inverters (VSIs), Current Source Inverters (CSIs), Z-Source Inverters (ZSIs), and Multilevel Power Converters (MPCs). Energy storage devices may be connected to the power converters or contained within the power converters.

In one embodiment of the hybrid electric drive machine, a first gearbox shaft may be connected to an electrostatic machine, a second gearbox shaft may be connected to an internal combustion engine, a third gearbox shaft may be connected to a mechanical load, and a CSI containing an energy storage inductor may be connected to the electrostatic machine. The hybrid electric drive machine may then store ("sink" and "source") the pulsating power from the internal combustion in the inductor within the CSI, using the electrostatic machine.

In another embodiment of the hybrid electric drive machine, a first gearbox shaft may be connected to an electrostatic machine, a second gearbox shaft may be connected to an electromagnetic machine, a third gearbox may be connected to a mechanical load, and a battery may be used for electrical energy storage. In this system, a CSI may be electrically connected between the electrostatic machine and the battery, and a VSI may be connected between the same battery and the electromagnetic machine.

Various machines and methods for producing positive or negative torque include electromagnetic machines, electrostatic machines, internal combustion engines, piezoelectric machines, water wheels, hydraulic motors, friction brakes, pneumatic machines, and dashpots. Such machines and methods may also include rotary adaptations of linear (i.e., translational) machines, including but not limited to torque arms connected to cylinders (e.g., pneumatic or hydraulic) and reciprocating systems such as crank rods, pistons, and crank shafts. Each machine and method has its own benefits and drawbacks, therefore in some cases it may be beneficial to combine two or more machines or methods to achieve the desired torque, loss, and other performance goals of the overall machine or system. In some cases, multiple machines and methods of producing torque may be combined by selectively engaging and/or disengaging the machines and methods from a larger system. This act of engaging and disengaging may be achieved using additional devices, including but not limited to clutches and fluid coupling, which also have benefits and drawbacks. Common drawbacks include additional cost, maintenance, and points of failure.

A salient benefit of electrostatic machines is their ability to produce torque with very low loss. Electrostatic machines generally have high terminal impedance resulting from their capacitive characteristics and high resistance. Power loss from use of electric field torque is $$P_{loss}=V^2/R$$

where the resistance R is very high, such as in the megaohms or greater, leading to high torque with very low loss. In some cases, these electrostatic torque related losses can be so low as to be negligible.

In comparison, electromagnetic machines cannot produce torque without also producing losses. One source of torque-related losses is the coil resistance, leading to loss following $$P_{loss}=I^2R$$

where the resistance R is determined by the volume and choice of coil material. The materials of choice are generally copper or aluminum due to cost and manufacturing constraints.

In some cases, high-torque operation of an electromagnetic machine may be advantageous at zero speed, leading to high losses within the machine. Therefore, the electromagnetic machine may be combined with other torque-producing machines and methods including brakes and/or clutches to selectively engage or disengage the electromagnetic machine while limiting power loss. Disadvantages of this approach include added expense and complexity.

Electromagnetic machine coil materials may include superconductors for extraordinarily low losses. Primary drawbacks of superconducting electromagnetic machines include high cost and added volume, mass, and complexity of the cooling system to achieve the low temperatures necessary for achieving superconducting behavior of the coils. A further drawback of superconducting coils is their high ac (alternating current) resistance, which can prevent their use in the armature coils of electromagnetic machines. Electromagnetic machines may exist in a wide variety of forms and topologies and may be brushed or brushless, and may or may not include slots for the coils. Some examples of electromagnetic machines include ac induction, wound field synchronous, dc shunt, dc series (also known as a universal motor), synchronous reluctance, switched reluctance, interior permanent magnet, surface permanent magnet, flux switching, Vernier, and transverse flux. In many cases, at least one of the coils within electromagnetic machines must conduct alternating current (ac) in order to function.

Superconductors generally have very low dc resistance at zero or near-zero frequencies (Hz); however, the resistance of superconductors at integer (or greater) frequencies (Hz) is considerably higher. This behavior severely limits the use of superconductors for the coils of electromagnetic machines. For these reasons, electromagnetic machines remain extremely challenging to design for high torque and low loss.

Salient benefits of piezoelectric machines include an ability to deliver shaft torque with high precision, rapid movement and with low loss. Drawbacks of piezoelectric machines include complex control methodologies and a possibility of wear, which limits their useful lifetime. Piezoelectric machines may be used in rotary and linear (e.g. translational) manners.

Mechanically driven shafts often include performance drawbacks according to their prime mover. Examples of prime movers include: internal combustion engines; diesel engines; turbines including gas, wind, and tidal; ocean wave energy converters; vehicle wheels; propellers; hydraulic systems; and any other general source of mechanical power. Prime movers may or may not be controllable. Prime movers may be capable of sourcing or sinking large quantities of mechanical power. Prime movers may produce torque or power at multiple frequencies, at least some of which may not be desirable by the system in which the prime mover is used.

Fluid powered systems, including pneumatics and hydraulics, may produce torque or force over a range of frequencies, including zero (dc). This is accomplished using fluids, including gases and liquids, at a pressure different from their surroundings. Typically the fluid powered systems utilize higher pressures than atmospheric. Due to the pressure difference, such systems must be sealed to prevent the pressurized fluids from leaking, which causes power loss, and may cause additional undesirable behavior including but not limited to environmental hazards, acoustic noise, or health hazards. Maintaining perfect seals to prevent these or other undesirable behavior is extraordinarily difficult, especially for surfaces which move, including dynamic shaft seals.

Some systems may produce high levels of force or torque which is purely loss and not recoverable. Examples of such systems are friction brakes, hysteresis brakes, and dashpots. The system's force or torque production capability may occur at a variety of frequencies, including low frequencies and zero (e.g., d current) frequency.

To overcome the undesirable behaviors of a single system, a hybrid electric drive machine may be used to combine the desirable behaviors of one or multiple systems with the desirable behaviors of electrostatic machines. The hybrid electric drive machine may exist in a wide variety of embodiments, a small number of which are given here as illustrative examples.

An illustrative embodiment relates to the combination of an electrostatic machine, a separately driven rotating mechanical shaft, and an output shaft, using a gearbox. In one mode of operation, the electrostatic machine shaft may be locked in place at zero speed using its electrostatic torque, causing the separately driven mechanical shaft to drive the output shaft at non-zero speed through the gearbox gear ratio. This mode of operation eliminates the need for a separate clutch or brake on the electrostatic motor shaft when not in use.

In one embodiment of a hybrid electric drive machine, a 3-shaft gearbox (e.g., a power summation device, etc.) is used, where an electrostatic machine is connected to a first shaft, an electromagnetic machine is connected to a second shaft, and a mechanical load such as an axle for a vehicle is connected to a third shaft. The gear ratios between the shafts may be different or equal. The hybrid electric drive machine may have multiple modes of operation. In one mode, the electromagnetic machine may provide a certain quantity of mechanical power to the axle through the gearbox, and the electrostatic machine may provide sufficient torque to maintain the second shaft in a fixed position, thereby providing zero mechanical power while incurring very low or negligible losses without the use of a brake or clutch. In another mode of operation, the electromagnetic machine may provide a certain quantity of mechanical power to the axle through the gearbox, and the electrostatic machine may provide a certain quantity of mechanical torque and power to the load through the gearbox. Alternative modes of operation may provide for one or both machines operating as a generator. Still further modes of operation may provide for torque and/or power being provided by each machine over specific frequency ranges. By combining the electrostatic and electromagnetic machines with a 3-shaft gearbox, the electromagnetic machine may be designed with a reduced torque rating, the electrostatic machine may be designed with a reduced speed rating, and the total volume, mass and losses of the hybrid electric drive system may be reduced compared to either an electromagnetic or electrostatic machine by itself The total power rating of the hybrid electric drive system may also be increased compared to each machine individually.

Referencing FIG. 10, example aspects of a stator plate and/or a rotor plate are depicted. The example plate includes an inner mechanical pad 2004 and an outer mechanical pad 2002 (or "bumper) configured to enforce a minimum separation distance between electrodes of the plate (e.g., a stator plate or a rotor plate) and electrodes of an adjacent plate (e.g., a rotor plate or a stator plate). The mechanical pads 2002, 2004 are configured of a material compatible with the dielectric fluid at operating temperatures of the ESM, and have a material and configuration allowing the plates to rotationally slip while enforcing axial distancing, when in contact with adjacent plates. Without limitation to any other aspect of the present disclosure, materials described herein for bearings, rolling elements, and/or printed circuit board substrates, are generally appropriate for the mechanical pads 2002, 2004, subject to the mechanical force profiles expected to be experienced by the mechanical pads 2002, 2004 during operations of the ESM.

The mechanical pads 2002, 2004 may be provided in place of a separation assembly 208 and/or in addition to another separation assembly 208. The mechanical pads 2002, 2004 are coupled to, and/or formed integrally with, a substrate 2006 of the plate, where electrodes 2008 are affixed thereon. The substrate 2006 of the plate may be a printed circuit board defining electrical paths between electrodes, and/or the substrate 2006 may be a structural material having electrical paths coupled thereto. The substrate 2006 includes holes ("vias") therethrough, allowing for electrical coupling between electrodes on a second side (not shown) of the rotor and/or stator plate, which may be affixed to the substrate 2006 or affixed to another substrate that is coupled to the substrate 2006, with intermediate circuitry therebetween to couple the electrodes of each side of the plate (e.g., reference FIG. 13 and the related description). Coupling between plates occurs, depending upon the specific arrangement, from stator plate to stator plate at a circumference beyond an outer circumference of the rotor plates, and from rotor plate to rotor plate at a circumference inside an inner circumference of the stator plates.

Figure 11:
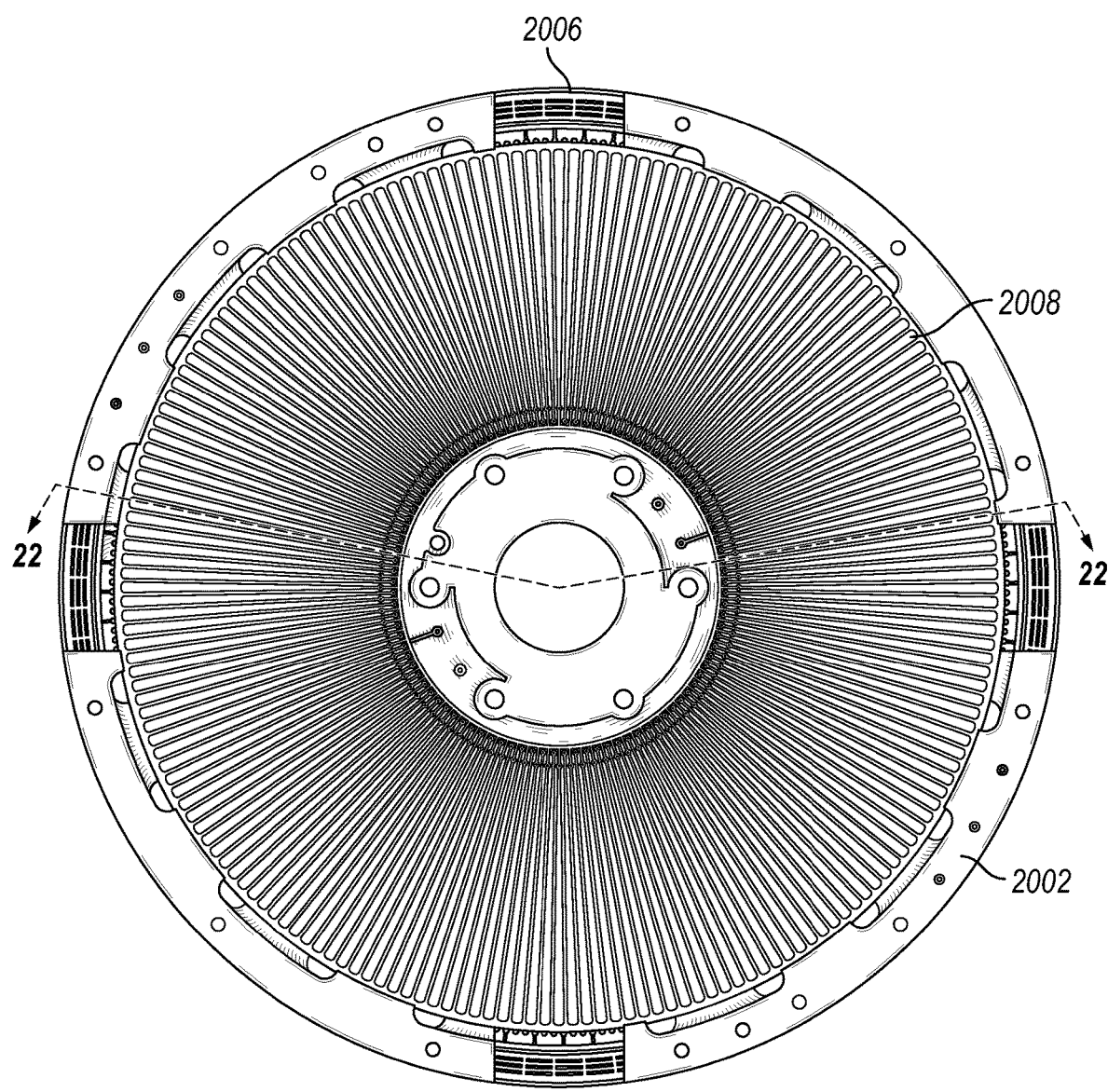
FIG. 11 is a schematic depiction of a system for an electrostatic motor.
Figure 12:
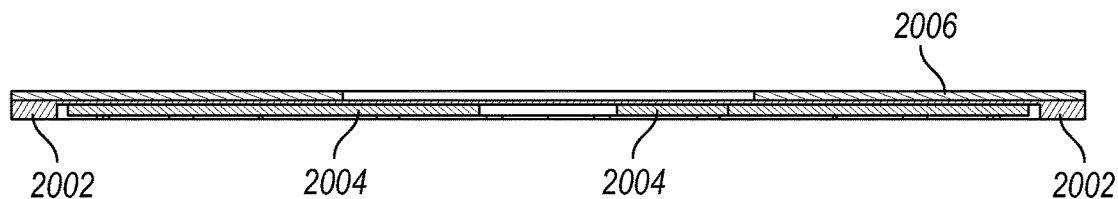
FIG. 12 is a schematic depiction of a system for an electrostatic motor.

Referencing FIG. 11, another view of the example stator plate and/or rotor plate is depicted. Referencing FIG. 12, a cutaway view of the example stator plate and/or rotor plate is depicted, consistent with the A-A cutaway marking of FIG. 11. In the example of FIG. 12, it can be seen that the mechanical pads 2002, 2004 are configured to contact an adjacent plate before contact by the electrodes 2008, allowing for enforcement of a minimum separation distance of the electrodes forming a capacitive element. In certain embodiments, mechanical pads 2002, 2004 may be affixed to both sides of a selected type of plate (e.g., stator plates or rotor plates). In certain embodiments, mechanical pads 2002, 2004 may be affixed to only a single side of the plates, with separation for the second side provided by mechanical pads on the adjacent plates (e.g., both rotor and stator plates include mechanical pads on a selected side of the plates) and/or by a different separation assembly (e.g., a rolling element 208) provided on the other side of the plate. In certain embodiments, adjacent plates may include receiving elements, such as a landing track, configured to slidably engage the mechanical pads 2002, 2004 during contact with the mechanical pads 2002, 2004.

Figure 13:
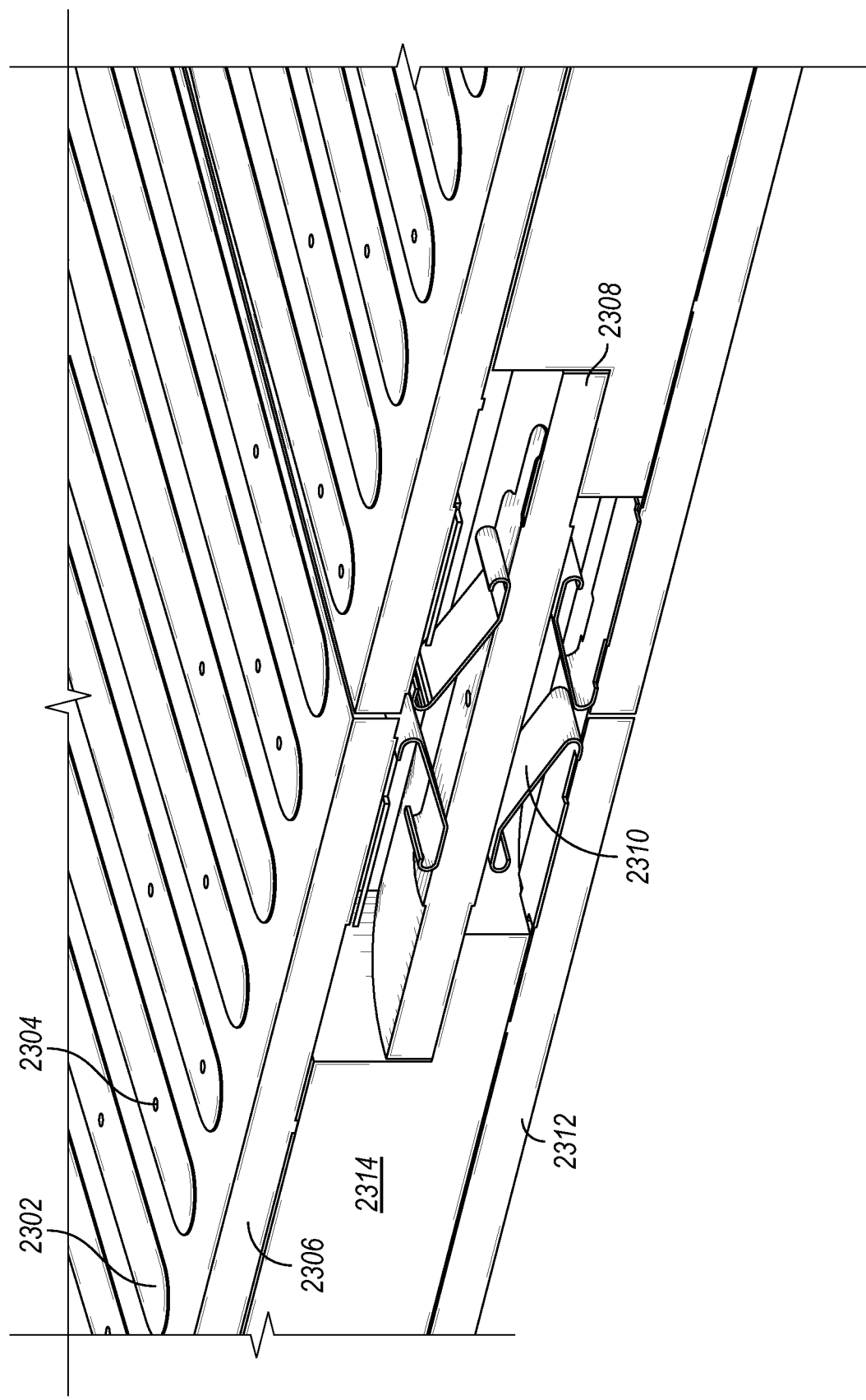
FIG. 13 is a schematic depiction of a system for an electrostatic motor.
Figure 19:
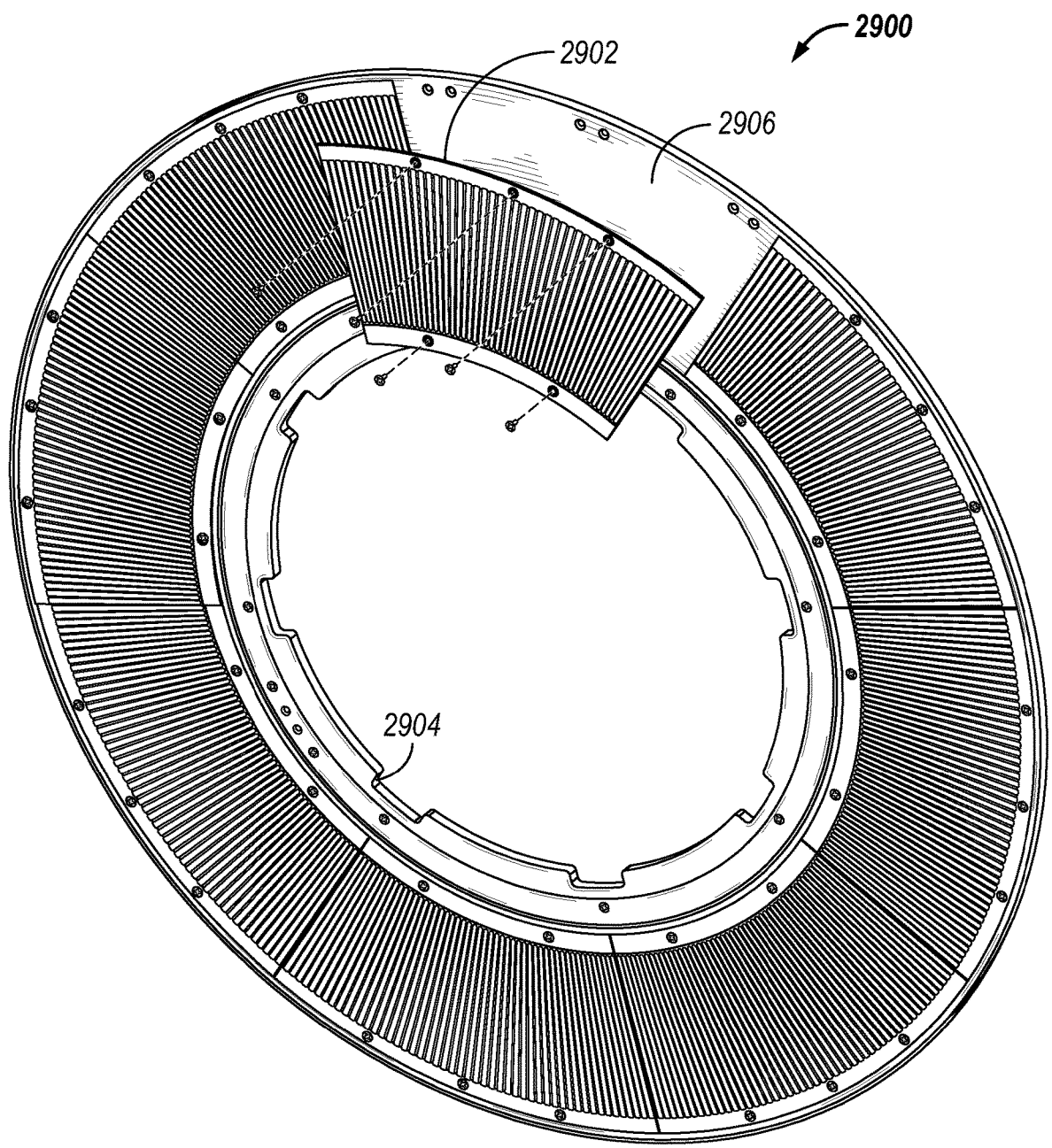
FIG. 19 is a schematic depiction of a system for an electrostatic motor.

Referencing FIG. 13, an example interconnect circuit between sides of a plate (e.g., a stator plate or rotor plate) is depicted. The example of FIG. 13 depicts a first substrate 2306 having electrodes 2302 coupled thereto, and vias 2304 through the substrate that electrically couple electrodes 2302 to the other side of the substrate. The interconnect circuit includes compliant electrical couplings 2310 (conductive springs, in the example of FIG. 13) that each couple to an intermediate substrate 2308, thereby coupling electrodes from the first side (e.g., associated with substrate 2306) to electrodes from the second side (e.g., associated with substrate 2312). the intermediate substrate 2308 may be a printed circuit board, and/or a structural substrate having circuits coupled thereto. An intermediate structural substrate 2314 is depicted, with substrates 2306, 2312 attached thereto. The intermediate structural substrate 2314 may be provided as a material allowing some axial flexibility of the stator plate and/or rotor plate, allowing compliance for axial forces experienced by the plate. In the example of FIG. 13, the substrates 2306, 2312 are depicted in azimuthally divided sections (e.g., reference FIG. 19 and the related descriptions). The electrodes 2302 may be provided on a single substrate encompassing all of the electrodes 2302 for a given side of the rotor plate and/or the stator plate, and/or may be sectioned as depicted in FIGS. 13, 19.

Figure 14:
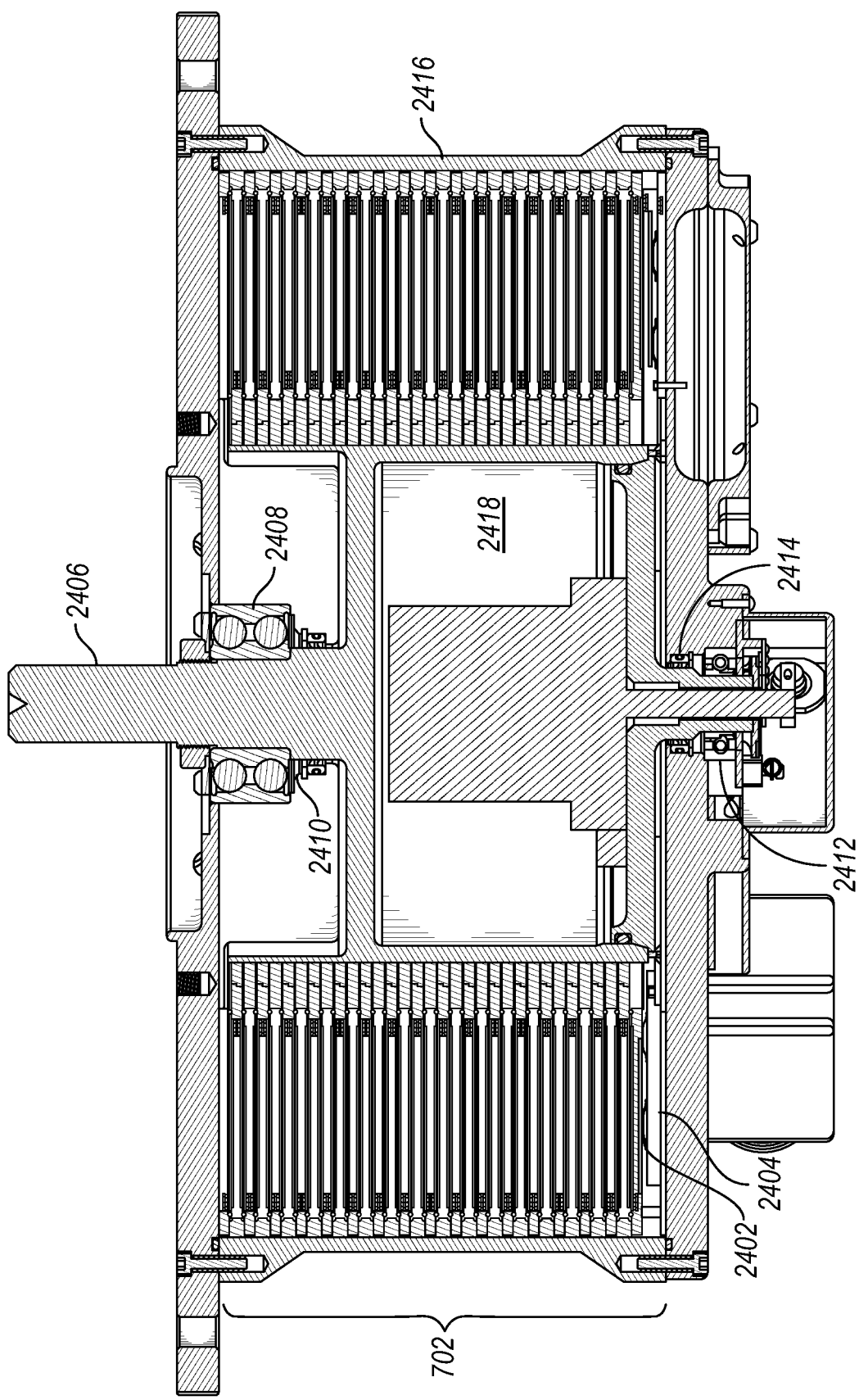
FIG. 14 is a schematic depiction of a system for an electrostatic motor.

Referencing FIG. 14, an example ESM is depicted in cutaway view, illustrating certain aspects of illustrative embodiments. The example ESM includes a shaft 2406 extending through a housing 2416 of the ESM, where the shaft 2406 engages a mechanical load at a first end, and accepts electrical coupling to an electrical source (e.g., a CSI, VSI, electrical storage device, and/or combinations of these) at either a second end or at the first end. In the example of FIG. 14, a hub area 2418 of the shaft is provided, providing room for power electronics (e.g., providing power to rotor plates) and/or providing an electrical coupling location for rotor plates. An example ESM provides electrical coupling to the rotor plates by electrical coupling that passes through the shaft 2406 and engages the rotor stack at a selected end of the capacitive stack 702, for example at a power distribution board for the rotor stack. An example ESM provides electrical coupling to the stator plates from an end plate of the housing, for example at a power distribution board for the stator stack. The coupling to the rotor stack and the stator stack may occur at a same end of the stack 702, or at opposite ends of the stack 702. In certain embodiments, the hub area 2418 includes a splined outer surface, allowing fixed rotational coupling of the rotor plates with a degree of freedom for axial movement of the rotor plates. In certain embodiments, the housing 2416 includes fins, tabs, a splined surface, or other coupling features for the stator plates. In certain embodiments, the housing 2416 provides for a degree of freedom for axial movement of the stator plates. Accordingly, the entire capacitive stack 702, and the individual elements thereof, can move axially during installation and operations of the ESM, allowing elements of the capacitive stack 702 to "settle" into a desired configuration during operations, which has been found to provide improved operations and controllability of the ESM.

The example ESM includes a biasing member 2402 that pre-loads the stack 702 with an axial force, and a wave spring 2404 that maintains a general axial position of the stack 702, with some movement of the stack 702 and of individual plates of the stack 702, during operations of the ESM. The order, positioning, and presence of the biasing members 2402 and wave springs 2404 is non-limiting.

The example ESM includes bearings 2408, 2412 for the shaft 2406, and seals 2410, 2414 associated with the bearings 2408, 2412. The seals retain the dielectric fluid in the housing, and are exposed to the dielectric fluid. Accordingly, seal materials are selected that are compatible with the dielectric fluid at operating temperatures of the ESM.

Figure 15:
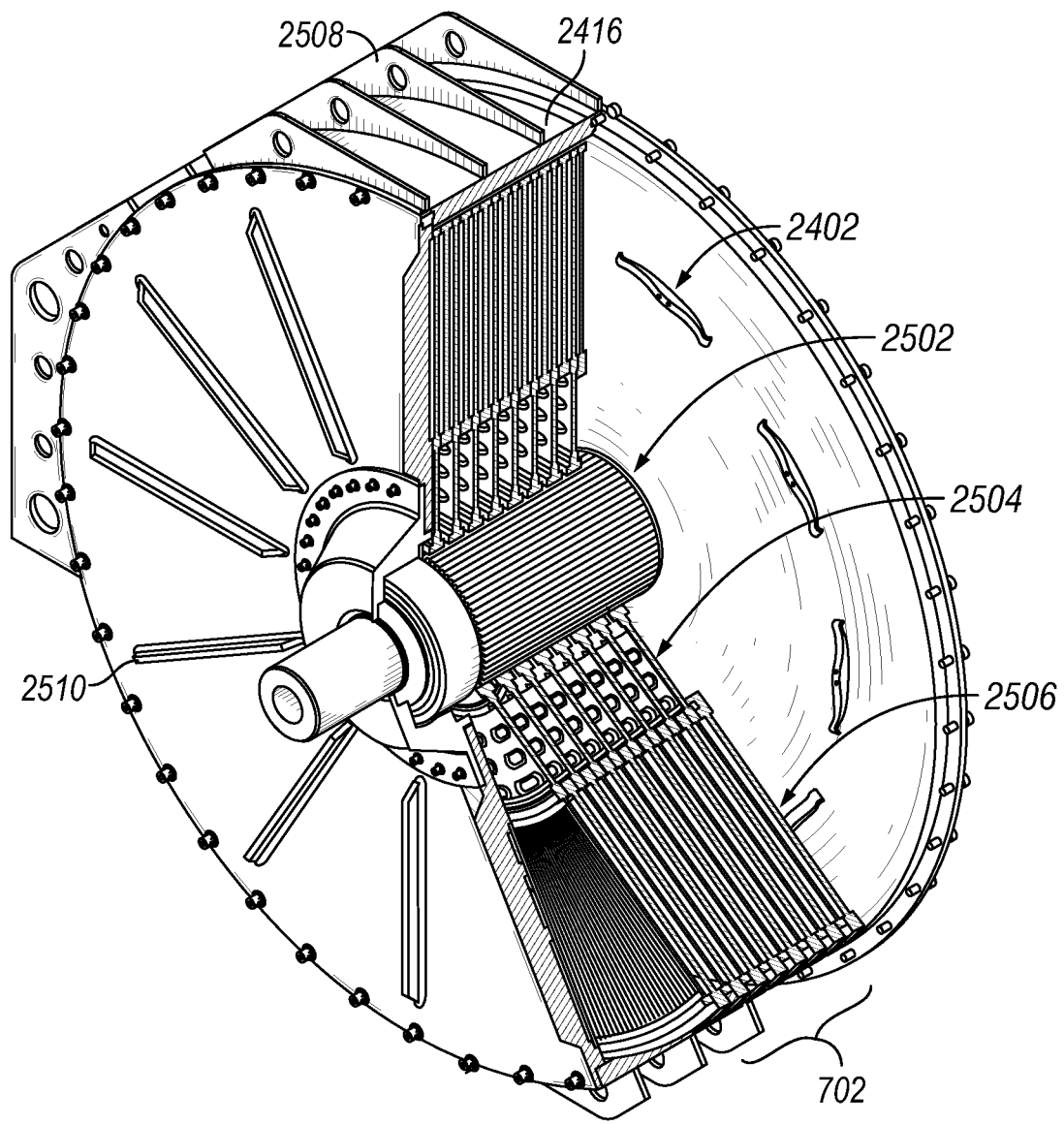
FIG. 15 is a schematic depiction of a system for an electrostatic motor.

Referencing FIG. 15, a cutaway perspective view of an example ESM is depicted, having a capacitive stack 702 positioned therein. The example ESM depicts the pre-load springs 2402, and a spline 2502 on the shaft for rotationally coupling the rotors 2504. The stators 2506 are coupled to the housing 2416. The housing 2416 in the example includes support ribs 2508 that may be included for structural integrity and/or desired heat transfer characteristics of the ESM. The example housing 2416 further includes end plate ribs 2510 that may be provided for stiffness, heat transfer adjustment, and/or to provide room within the housing for electrical coupling between electrical source(s) and/or plates of the capacitive stack 702. The depicted housing elements are a non-limiting example, and housing elements may be provided for structural support against axial, radial, or azimuthal forces, for desired heat transfer characteristics, and/or for desired fluid flow and/or mixing characteristics.

Figure 16:
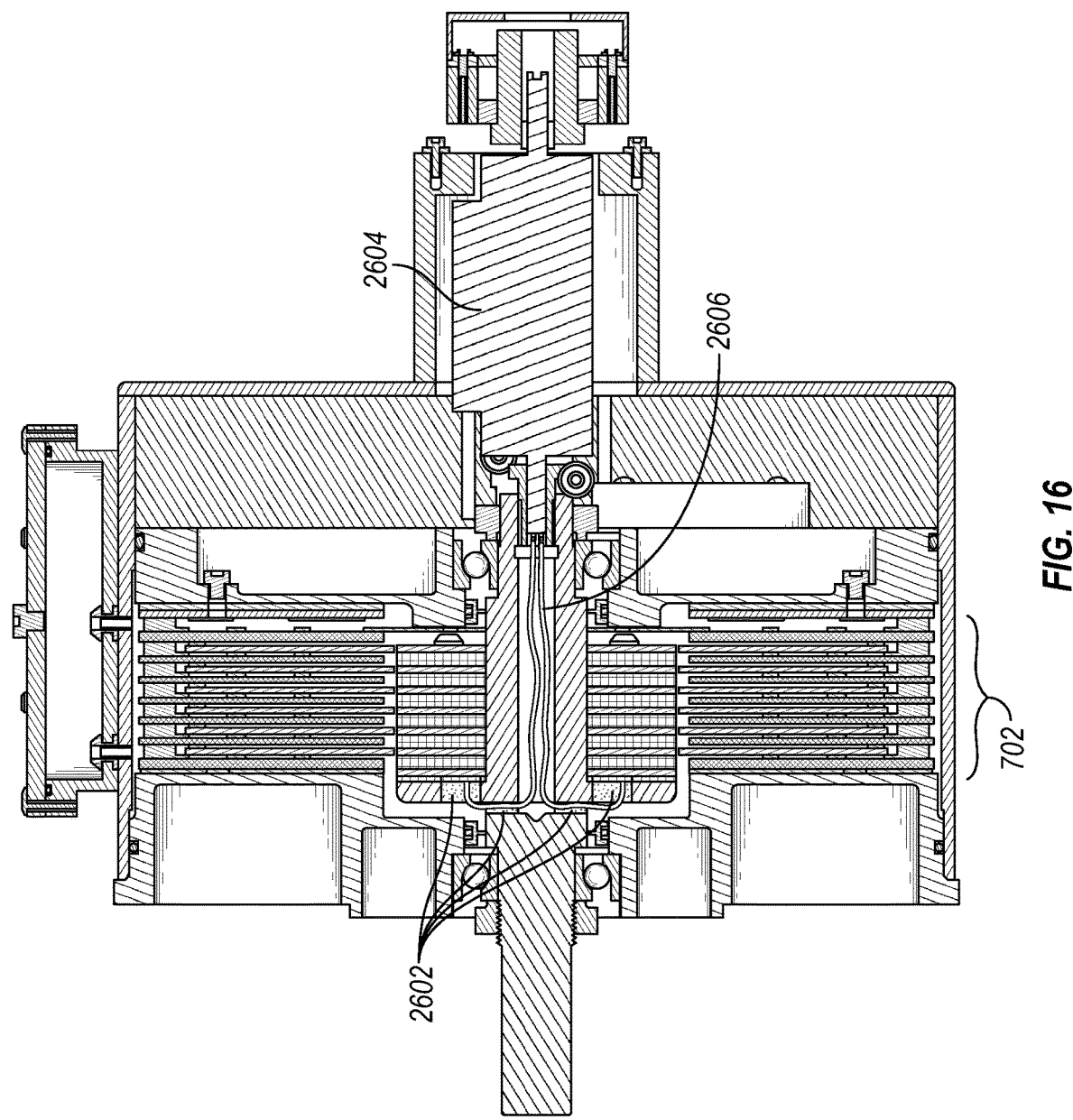
FIG. 16 is a schematic depiction of a system for an electrostatic motor.

Referencing FIG. 16, an example ESM is depicted in a side cutaway view. The example ESM includes high voltage excitation wires 2606 coupling a power source 2606 (e.g., a slip ring or non-contact power transfer component that passes excitation voltage from a non-rotating component to the rotating high voltage excitation wires 2606 powering the rotor electrodes). In the example of FIG. 16, power transfer from within the shaft to the rotor plates is protected by a potted connection 2602, where the potting includes a material (e.g., an epoxy) that is compatible with the dielectric fluid. In the example of FIG. 16, the power transfer is to a power distribution board for the rotor plates, which then distributes power sequentially down the rotor stack. The utilization of through-shaft power transfer 2606 allows for a reduction in the hub area 2418 around the shaft, thereby increasing an active area of the capacitive stack 702 (e.g., an active area where rotor electrodes and facing stator electrodes can add to the capacitive area of the stack 702), and increasing a power density and/or torque density of the ESM (e.g., available torque or power divided by the volume of the ESM).

Referencing FIG. 17, an example cutaway view of a stator plate (and/or a rotor plate) is schematically depicted. The example plate includes opposing substrates 2306, 2312 having electrodes 2302 positioned thereon, forming a part of the capacitive stack 702. The example plate includes an outer securing substrate 2702 having separation elements 208 positioned thereon. The example plate includes a securing notch 2704, for example to rotationally secure a stator plate to the housing. The securing notch 2704 may not be present on a rotor plate, and/or a stator plate may utilize a different securing mechanism. In certain embodiments, a notch 2704 may be present, but for another reason such as mechanical support, providing desired fluid flow characteristics, providing passage for electrical connections, or the like.

Figure 18:
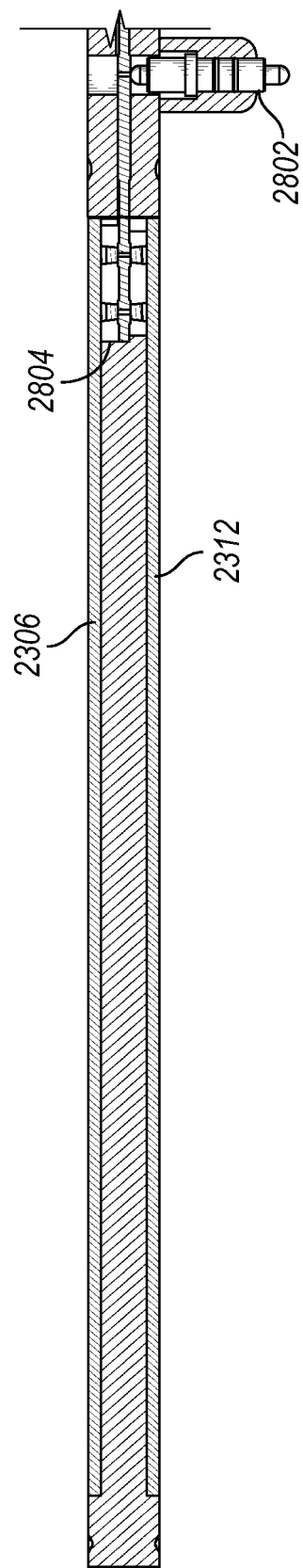
FIG. 18 is a schematic depiction of a system for an electrostatic motor.

Referencing FIG. 18, a schematic side cutaway view of a stator plate or a rotor plate is depicted. The example plate includes a compliant electrical connection 2802 that couples a power distribution board and/or an adjacent plate from the same stack (e.g., a first rotor plate to a second rotor plate, or a first stator plate to a second stator plate) to electrodes of the depicted plate. The compliant electrical connection 2802 is depicted as a pogo pin, but may be a compliant connection of any type. The example of FIG. 18 depicts a compliant connection 2804 within the plate, coupling the inlet power (e.g., through connection 2802) to the electrodes, and coupling the electrodes of each side to each other. The compliant connection 2804 may be provided with pogo pins, spring connections (e.g., reference FIG. 13), a wire ribbon, and/or any other compliant electrical connection.

Referencing FIG. 19, an example plate 2900 is depicted, that may be a rotor plate or a stator plate. The example of FIG. 19 depicts shaft engagement tabs 2904 on an interior circumference, which are consistent with embodiments of a rotor plate. The plate 2900 is divided into a number of azimuthal sections 2902 having electrodes thereon, allowing for the plate to be assembled by attaching selected sections 2902 to the plate substrate. The individual section 2902 are powered by vias through the board, for example to a power bus on a reverse side of the section 2902 and/or to a power bus on the plate substrate 2906, and/or combinations of these (e.g., certain sections 2902 powered through-plate, and other sections 2902 powered by section-section power busses or couplings). Accordingly, electrodes of the ESM can be replaced individually with a section, assembly of ESMs with varying capability can be created by changing a configuration of the sections, and/or sections 2902 of a given plate can have some individual axial compliance relative to each other, improving the operation and controllability of the ESM.

Figure 20:
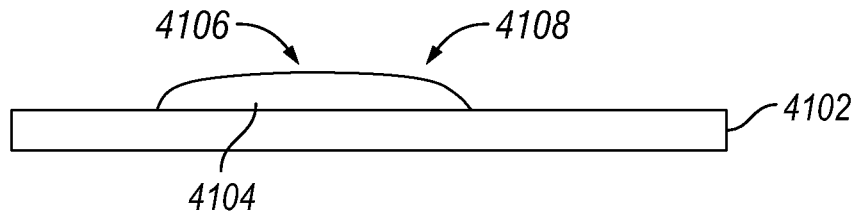
FIG. 20 is a schematic depiction of a system for an electrostatic motor.

Referencing FIG. 20, an example electrode 4104 coupled to a substrate 4102 is depicted schematically. The example electrode 4104 may be an electrode for a rotor plate or a stator plate, and is depicted schematically from a side view to illustrate certain aspects of the present disclosure. The electrode 4104 includes a face 4106 that faces an opposing electrode (not shown), forming a capacitive gap as described herein. In certain embodiments, the gap is filled with a high permittivity fluid, such as a dielectric fluid, promoting the ability to form a high voltage electric field with a small gap distance, thereby providing for a high capacitive energy storage for the ESM. The example face is a polished face, providing for a smooth surface of the facing electrodes. It has been found that a high surface smoothness of the electrodes reduces the tendency of the fluid to experience a localized breakdown, for example due to local charge collection on an electrode, and/or due to variability in the gap distance due to extending imperfections of the electrode surface. In certain embodiments, polishing is performed on a closest facing surface of the electrode, and/or on an entire exposed surface of the electrode.

In certain embodiments, polishing is performed on a surface of the substrate 4102, and/or on a portion of the surface of the substrate 4102 in proximity to the electrode. In certain embodiments, polishing is performed on an inner surface of a housing of the ESM. In certain embodiments, polishing of selected surfaces may be performed to provide a roughness of less than Ra=10 microns. In certain embodiments, polishing of selected surfaces may be performed to a selected ISO roughness grade number, such as N10 or N9. In certain embodiments, polishing of an electrode surface facing the gap (e.g., face 4106) is performed to one roughness standard, and polishing of related surfaces such as other surfaces of the electrode and/or substrate surface near the electrode is performed to another (typically a lower smoothness, or higher roughness) standard. An example polished surface includes a roughness not exceeding an ISO N10 roughness grade, not exceeding an ISO N9 roughness grade, and/or a roughness of less than Ra=30 microns. An example polished surface includes a roughness of less than Ra=1 micron. An example polished surface includes a roughness not exceeding an ISO N11 roughness grade, not exceeding an ISO N6 roughness grade, a roughness grade between an ISO N1 to an ISO N6 roughness grade (inclusive), and/or a roughness grade between an ISO N7 to an ISO N11 roughness grade.

The example electrode 4104 includes a surface progression 4108 between the face 4106 and the electrode 4104 portion engaging the substrate 4102. It has been found that sharp corners of the electrode 4104 promote breakdown of the fluid in the gap, by providing for a charge collection zone, and/or a sharp surface feature to initiate a gap breakdown. In certain embodiments, a curvature of the surface progression 4108 is kept above a threshold value (e.g., a minimum radius of curvature is enforced, or the curvature is not allowed to get too "sharp"), providing for increased resistance to gap breakdown. In certain embodiments, a surface progression 4108 that is rounded and avoids a sharp geometric break between surfaces (e.g., the face 4106 and a side of the electrode) is sufficient to avoid gap breakdown during varying operating conditions. In certain embodiments, a curvature of the surface progression 4108 is limited to be maintained above a threshold curvature value (e.g., a 10 μm radius minimum curvature, and/or a minimum curvature having a radius between 10 μm and 100 μm). In certain embodiments, the curvature of the surface progression 4108 is limited closer to the face 4106, and is allowed to become sharper closer to the substrate 4102 (e.g., as the progression is further displaced from an opposing electrode). In certain embodiments, curvature of an end of the electrodes (e.g., a radially inward most and/or radially outward most extend of the electrode) is similarity limited, for example to prevent gap breakdown in those regions. For example, reference FIG. 11 depicting electrodes having a rounded end geometry at an outer radial extent when viewed axially.

Figure 21:
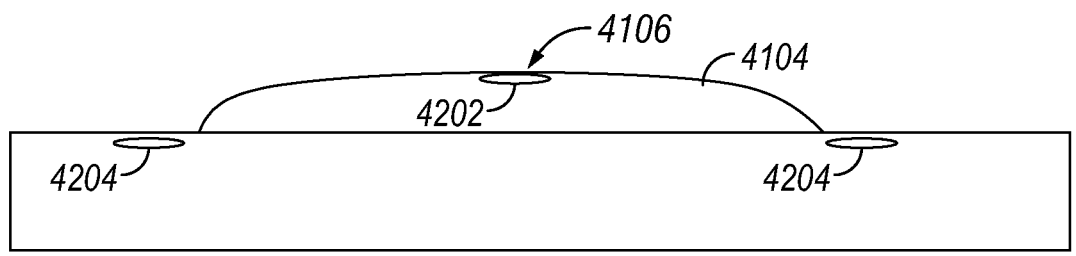
FIG. 21 is a schematic depiction of a system for an electrostatic motor.

Referencing FIG. 21, an example electrode 4104 coupled to a substrate 4102 is depicted schematically. The example electrode may include surface progression 4108 as depicted in FIG. 20, and/or may be a separate device having features as described, without the surface progression 4108 of FIG. 20. In the example of FIG. 21, conductive particles are included on a surface of the electrode (e.g., treated region 4106). A surface treatment may be provided, additionally or alternatively, on other surfaces such as an inner surface of a housing, on material (e.g., a packed bed) in a side flow, eddy region, and/or other designed flow area. The inclusion of a surface treatment, such as conductive particles, may promote a more even distribution of charge across the electrode, and/or adjust (e.g., reduce) a field strength in the vicinity of the electrode, increasing the electric field of the gap that can be applied before a gap breakdown occurs. A surface treatment, and/or a coating, may support the physical integrity of the surface (e.g., protecting from thermal and/or electrochemical breakdown, and/or preserving a smoothness of the surface), inhibiting the injection of charge carriers into the dielectric fluid. A surface treatment, and/or a coating, may preserve a designed field trajectory (which may additionally or alternatively be understood to be an adjustment of the field trajectory) in the presence of injected charge carriers, and/or may beneficially utilize injected charge carriers to promote a designed field trajectory.

The treated region 4106 may include a conductive material and/or a field adjusting material deposited on the electrode (or other surface), and/or formed integrally with the electrode, and may include a material such as Cu, Ag, Au, Rh, Ni, Pt, Pd, Os, W, Pb, Ti, Al, stainless steel, alloys of any of the foregoing, or a semi-conducting polymer. In certain embodiments, any material that is more conductive than a substrate material of the electrode (e.g., fiberglass, plastic, glass, etc.) may be utilized for the treated region 4106, and/or any material that maintains a higher conductivity during use—for example, a material that does not oxidize or degrade as quickly as the substrate material. The amount of treating material, and the arrangement of the treating material, may be selected to prevent charge concentrations on the surface of the electrode, and may include a closest facing portion of the electrode and/or surrounding regions.

In certain embodiments, a substrate 4102 where the electrode 4104 is fixed may additionally or alternatively include a treated region 4204, which may utilize the same or a distinct treating material. For example, a treated region 4202 may utilize a material that is more conductive than the electrode 4104, and treated region 4204 may utilize a material that is more conductive than the substrate 4102, and/or more conductive than the electrode 4104. The utilization of one or more treated regions, alone or combined with a selected surface progression 4108, promotes a higher charge capability for the ESM, increasing torque density and/or power density of the ESM.

A surface treatment, as utilized herein, may be provided by any operations understood in the art, including, for example, depositing material on the selected surface and/or embedding material into an upper layer of the treated surface (e.g., electroplating, vapor phase deposition, diffusion, etc.). An example surface treatment may be provided by configuring constituents of an outer layer of the target surface, for example by overmolding with a material having a selected composition, providing a treated surface as a laminate, composite layer, or the like. In certain embodiments, a surface treatment and a coating may be similar, and/or both may be provided in a given region, where, according to the nomenclature utilized and without limitation to the present disclosure, a surface treatment may be an under layer, and a coating may be provided over the surface treatment. In certain embodiments, a coating is provided utilizing similar operations as recited for providing a surface treatment.

Figure 22:
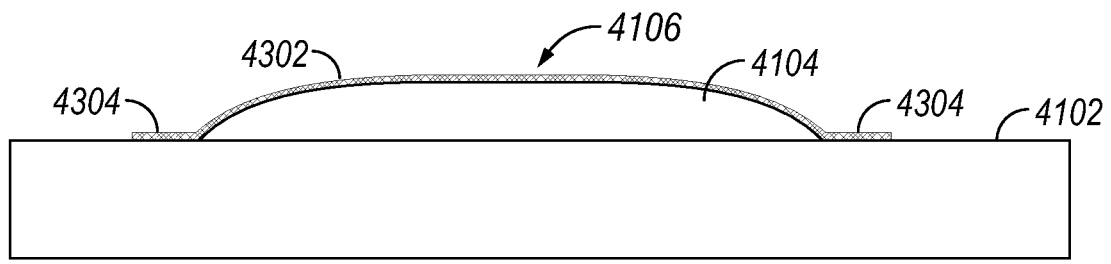
FIG. 22 is a schematic depiction of a system for an electrostatic motor.

Referencing FIG. 22, an example an example electrode 4104 coupled to a substrate 4102 is depicted schematically. The example electrode 4104 includes a surface coating 4302, which may be positioned over the entire electrode, over the face 4106 of the electrode, and/or over specified regions of the electrode (e.g., curved portions, corners, and/or charge collection or gap breakdown risk regions). An example surface coating 4302 includes a dielectric material having both a lower dielectric constant and a lower resistivity than the dielectric fluid. An example surface coating 4302 minimizes or reduces electrochemical reactions, reducing electrical conduction within the dielectric fluid, while attenuating the electric field in the gap. In certain embodiments, the surface coating 4302 may be a field management coating. The utilization of the surface coating 4302, and/or the surface coating 4302 combined with other features (e.g., a treated region 4204, selected surface progression 4108, and/or dielectric material positioned between electrodes on the rotor and/or stator plate) allows for an increase of electrostatic pressure across the gap, thereby increasing the available torque, power density, and/or energy efficiency of the ESM. The surface coating 4302 may be combined with the treated region 4204 and/or the selected surface progression 4108, and/or may be provided alone. An example surface coating, which may be provided as a field management coating, includes a conductive polymer. An example surface treatment and/or coating includes a treatment and/or coating configured to reduce a friction within the housing (e.g., reducing fluid viscosity losses, torsional stresses, wear on electrodes and/or surfaces, etc. for the ESM and/or capacitive stack 702).

The example of FIG. 22 further includes a second surface coating 4304 provided on the substrate 4102 in the region of the electrode 4104. The second surface coating 4304 may be the same material, or a distinct material, from the surface coating 4302. The utilization of the surface progression 4108, the treated region 4204, and/or the surface coating 4106 promote a uniform charge distribution on the electrode 4104, and an increase in the field strength that can be applied before a gap breakdown occurs.

In certain embodiments, the second surface coating 4304 and/or an additional surface coating (not shown) includes a dielectric material and/or an insulating material positioned between electrodes of the rotor and/or stator. The provision of a dielectric material (and/or insulating material) between the electrodes pulls charge away from the corners of the associated electrodes, allowing for an increase in the overall voltage while reducing a likelihood of breakdown (e.g., discharge across the gap). Without limitation, the dielectric material (and/or insulating material) may be provided between specific electrodes, for example electrodes from independently excitable groups of electrodes, and/or electrodes having distinct excitation characteristics (e.g., differing charge signs, phase values, voltages, etc.).

In certain embodiments, the surface coating 4302, treated region(s) 4204, and/or second surface coating(s) 4304 may be selected according to a type of charge and distribution on the electrode. For example, in certain embodiments, certain rotor electrodes may be configured to operate with a negative DC voltage under selected operating conditions, or during all operating conditions, and other rotor electrodes may be configured to operate with a positive DC voltage under selected operating conditions, or during all operating conditions. Accordingly, breakdown management features such as the coatings 4302, 4304, treated regions 4204, and/or surface progression 4108 may be configured specifically for the type of breakdown, space charge injection, electrochemical effects, or the like that are most likely to occur based on the specific type of charge and distribution for those electrodes. Without limitation to any other aspect of the present disclosure, the coatings 4302, 4304, treated regions 4204, and/or surface progression 4108 may vary between electrodes, whether responsive to the type of charge and distribution on those electrodes, or other considerations related to the electrodes (e.g., the physical environment of the rotor and/or stator plate, including operating temperature, fluid shear, rotational forces, etc.; manufacturing considerations for the electrode and/or associated rotor and/or stator plate; gap variance profile for the electrode and/or associated rotor and/or stator plate; and the like).

An example surface coating 4302, 4304, and/or treated region 4204 (e.g., including the treated substrate such as electrode and/or electrode substrate surface, in combination with the surface treatment) is prepared in accordance with a first design equation $(\varepsilon_1 * x_2)/(\varepsilon_2 * x_1) >= 1$, where $\varepsilon_1$ is the complex permittivity of the coating (and/or effective complex permittivity of the treated surface), $\varepsilon_2$ is the complex permittivity of the dielectric liquid, $x_1$ is the coating thickness (and/or treated surface effective thickness), and $x_2$ is the liquid gap distance. Under a DC boundary condition, the first design equation reduces to $(\sigma_1 * x_2)/(\sigma_2 * x_1)$, where $\sigma_1$ is the conductivity of the coating (and/or effective conductivity of the treated surface), $\sigma_2$ is the conductivity of the dielectric liquid, $x_2$ is the coating thickness (and/or treated surface effective thickness), and $x_1$ is the liquid gap distance. Under an AC boundary condition, the first design equation reduces to $(\varepsilon_{r1}*x_2)/(\varepsilon_{r2}*x_1) \geq 1$, where $\varepsilon_{r1}$ is the relative permittivity of the coating (and/or effective relative permittivity of the treated surface), and $\varepsilon_{r2}$ is the relative permittivity of the dielectric liquid. The utilization of the coatings 4302, 4304, treated regions 4204, and/or surface progression 4108 can be utilized to provide up to about 4× the specific torque (e.g., per unit area of the capacitive stack) of previously known configurations.

An example field management coating is configured such that β1>β2, where β1 is a permittivity (e.g., a complex permittivity) of the dielectric material divided by a thickness of the coating ($\varepsilon_1/x_1$), and where β2 is a permittivity of the dielectric fluid divided by a distance of the gap ($\varepsilon_2/x_2$). In certain embodiments, an ESM includes an excitation circuit that provides AC excitation energy to a stator electrode (and/or another AC excited electrode), and where the field management coating is configured such that β1>β2, where β1 is a relative permittivity of the dielectric material divided by a thickness of the coating ($\varepsilon_{r1}/x_1$)/and where β2 is a relative permittivity of the dielectric fluid divided by a distance of the gap ($\varepsilon_{r2}/x_2$). An example ESM includes an excitation circuit that provides DC excitation energy to a rotor electrode (and/or another DC excited electrode), and where the field management coating is configured such that β1>β2, where β1 is a relative conductivity of the dielectric material divided by a thickness of the coating ($\sigma_1/x_1$) and where β2 is a relative permittivity of the dielectric fluid divided by a distance of the gap ($\sigma_2/x_2$). An example field management coating includes the dielectric material having either a higher or lower dielectric constant than the dielectric fluid, and/or a higher or lower conductivity than the dielectric fluid. It can be seen that a favorable or unfavorable permittivity/conductivity profile of the dielectric material can be managed by adjusting a thickness of the field management coating. As with surface coatings generally throughout the present disclosure, the field management coating may vary between electrodes, whether responsive to the type of charge and distribution on those electrodes, or other considerations related to the electrodes (e.g., the physical environment of the rotor and/or stator plate, including operating temperature, fluid shear, rotational forces, etc.; manufacturing considerations for the electrode and/or associated rotor and/or stator plate; gap variance profile for the electrode and/or associated rotor and/or stator plate; and the like). In certain embodiments, the field management coating and/or surface treatment is provided in a non-uniform configuration, including by design (e.g., heterogenous distribution of a treatment or coating for different electrodes, across the surface of a given electrode, areally distributed and/or having a varying depth of penetration for a surface of the electrode and/or substrate in the vicinity of the electrode). Accordingly, in certain embodiments, the parameters for the permittivity ($\varepsilon$), conductivity ($\sigma$), relative permittivity ($\varepsilon_r$), and/or length (x, e.g., a distance of the gap and/or thickness of the coating or treated area) may be determined as bulk parameters, for example averaging values over a selected region, etc.

An example field management coating includes a dialytic coating structured to capture at least one ion contaminant. The dialytic coating may be configured to capture and/or precipitate (e.g., whereby the precipitate is settled, captured, etc.) an ion of interest, and/or a group of ions of interest, for example an ion generated by electrochemical interactions between the dielectric fluid, a constituent of the ESM (e.g., a plate substrate, electrode material, coating material, surface treatment material, bearing material, seal material, potting material (e.g., reference FIG. 16), housing material, etc.) In certain embodiments, a dialytic coating may include a combination of ion capture materials, for example to capture a profile of ions likely to present in the dielectric fluid during the operating life of the ESM. In certain embodiments, the dialytic coating may capture ions through any mechanism, including at least adsorption, electrodialysis, chelation, and/or any other mechanism. In certain embodiments, the dialytic coating may be provided on an electrode and/or in the vicinity of an electrode. In certain embodiments, a dialytic coating may be provided elsewhere in the ESM, for example in a separate flow chamber or path (e.g., an eddy portion of the housing), for example with fluid circulation therethrough (e.g. similar to a packed bed and pumping operation, such as described in the description referencing FIG. 24) and in at least selective fluid communication with a main dielectric fluid chamber including the capacitive stack 702. Utilization of a separate flow chamber, path, or eddy may facilitate removal of consumed dialytic material, precipitates, and the like, away from the main chamber where they may be reintroduced into the dielectric fluid. In certain embodiments, the dialytic coating is provided on the electrodes and/or plates, for example where consumption of dialytic material and/or generation of precipitates has a low enough rate for the dialytic coating to last the life cycle of the ESM, and/or to be reasonably serviced as a maintenance and/or serviceable component of the ESM. Additionally or alternatively, the dialytic coating may treat generated ions that do not accumulate over the operating life of the ESM, for example initially produced constituents that are generated during an early portion of the ESM life cycle (e.g., during a break-in period).

An example surface treatment and/or coating includes a space charge injection manager. Control of space charge injection may be performed by any operations described herein, including promoting a more even distribution of charge across the electrode, adjusting (e.g., reducing) a field strength in the vicinity of the electrode, supporting the physical integrity of the surface (e.g., protecting from thermal and/or electrochemical breakdown, and/or preserving a smoothness of the surface), thereby inhibiting the injection of charge carriers into the dielectric fluid. An example space charge injection manager preserves a designed field trajectory (which may additionally or alternatively be understood to be an adjustment of the field trajectory) in the presence of injected charge carriers, and/or may beneficially utilize injected charge carriers to promote a designed field trajectory. An example space charge injection manager promotes the elimination and/or deactivation of a charge carrier that has been injected into the dielectric fluid. An example space charge injection manager includes boron nitride, for example provided as a surface treatment and/or a coating as described herein. An example space charge injection manager includes one or more materials such as: Cu, Ag, Au, Rh, Ni, Pt, Pd, Os, W, Pb, Ti, Al, stainless steel, alloys of any of the foregoing, or a semi-conducting polymer. An example space charge injection manager includes a first surface treatment (and/or coating) provided on at least a portion of an exposed surface of a first electrode (e.g., a rotor electrode), and a second surface treatment (and/or coating) provided on at least a portion of an exposed surface of a second rotor electrode, where the first rotor electrode is a positive electrode, and where the second rotor electrode is a negative electrode, and the first space charge injection manager is distinct from the second space charge injection manager (e.g., a distinct geometry, thickness, concentration, material, etc.). In certain embodiments, the first space charge injection manager is configured for the characteristics (e.g., electrical environment, electrochemical reactions, failure and/or wear modes, etc.) associated with the positive electrode, and the second space charge injection manager is configured for the characteristics associated with the negative electrode. Similarly, surface treatments, coatings, and/or space charge injection managers provided throughout the capacitive stack may be configured for the environment (e.g., electrical environment, fluid flow, temperature, vibration profile, etc.) specific to plates and/or electrodes throughout the capacitive stack.

Figure 23:
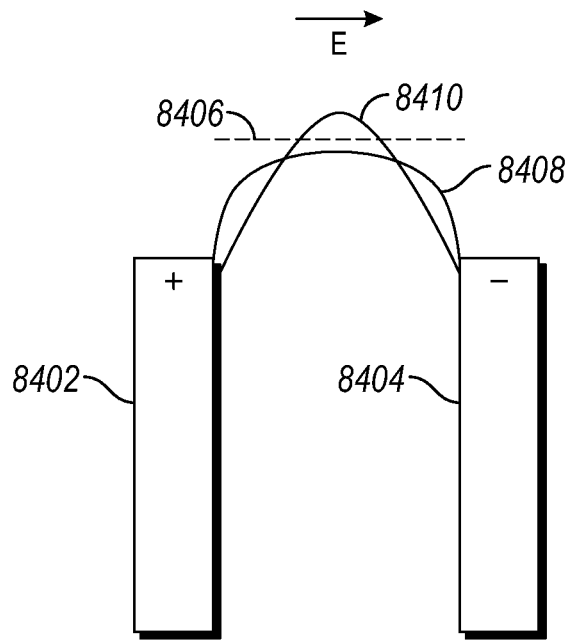
FIG. 23 is a schematic depiction of an electrical field distribution for an electrostatic motor.

Referencing FIG. 23, two example field strength trajectories 8408, 8410 in a gap between electrodes 8402, 8404 are schematically depicted. In the example of FIG. 23, an example breakdown field strength 8406 threshold is depicted. The breakdown field strength 8406 is depicted as a single value, but may depend upon the dynamic situation in the gap, for example depending upon charge concentrations on the electrodes 8402, 8404, physical structure of the surface of the electrodes 8402, 8404; and/or the compositions of the dielectric fluid in the gap (e.g., entrained gases; additives; and/or a space charge effect constituents such as from ions, migrating particulates, free electrons, etc.). The breakdown field strength 8406 depends generally upon the dielectric strength of the dielectric fluid and the geometric arrangement (e.g., distance between electrodes 8402, 8404) of the gap. Without limitation to any other aspect of the present disclosure, or a particular theory of operation, numerous aspects of the present disclosure contribute to increasing an area under an electric field-distance curve (e.g., an area under a curve 8408 between the electrodes 8402, 8404). The area under the electric field-distance curve is related to the stored energy in the capacitive stack, and therefore related to the torque and/or power that can be generated by the ESM 1002. Numerous aspects of the present disclosure cooperate to increase the breakdown field strength 8406, and/or adjust (e.g., flatten) the field strength trajectory such as: the permittivity of the dielectric fluid; a selection of fluid constituents to maintain a permittivity profile related to operating temperatures; protection of the dielectric fluid from impurities, presence of water, and/or presence of gases; providing a surface smoothness of the electrodes 8402, 8404 (or portions thereof), related surfaces, and/or a housing inner surface; rinsing/removal of particles and/or impurities (e.g., from manufacturing residue, etc.); provision of a surface treatment on at least a portion of an electrode, and/or on a surface adjacent to the electrode, including varying surface treatments for different electrodes; provision of a coating on at least a portion of an electrode and/or on a surface adjacent to the electrode, including varying the coating for different electrodes; provision of a surface treatment and/or coating on a component at least selectively contacting the dielectric fluid (e.g., a housing inner surface, a packed bed, a side chamber, flow path, and/or eddy region); protection of composition integrity of the dielectric fluid (e.g., managing materials of bearings, seals, plates, etc. to avoid material breakdown and/or introduction of degradation constituents that negatively affect the performance of the dielectric fluid); introduction of a field disrupting additive into the dielectric fluid (e.g., a coated metal oxide, a nano-particle, and/or a conductive particle having a conductor that isolate the conductive particle from physical contact with the dielectric fluid); introduction of an ion scavenging additive into the dielectric fluid (e.g., BHT, antioxidants, etc.); management of gap distance (e.g., using bearings, magnetic separation, a separation assembly, etc.); and/or selected field weakening at certain operating conditions. The utilization of various field management aspects of the present disclosure allows for an increased average field strength in the gap, while maintaining a peak field strength below a breakdown threshold 8406, thereby increasing capacitive energy storage and consequent performance of the ESM 1002.

In certain embodiments, one or more aspects of the present disclosure, such as: the utilization of polished surfaces; smooth surfaces (e.g., a glass surfaced rotor plate and/or stator plate); a coating at least partially on and/or associated with an electrode and/or plate surface near the electrode; provision of an insulating and/or dielectric material between electrodes (e.g., on a same plate); a surface treatment of at least a portion of an electrode and/or plate surface near the electrode; additives for the dielectric fluid; excitation parameter management for the capacitive stack and/or portions thereof; fluid conditioning; fluid dewatering; fluid gas management; enforcement of a minimum separation distance; provision for axial freedom of movement for at least a portion of the capacitive stack; reduction, mitigation, and/or utilization of charge carriers in the dielectric fluid (e.g., fluid treatment and/or filling operations, removal and/or mitigation of contaminants, hardening and/or surface treatment of exposed surfaces within the ESM, and/or management of compatibility of exposed surfaces with the fluid); and/or temperature management of the dielectric fluid, provide for a field strength trajectory in the gap that enhances the torque density and/or power density of the ESM. In certain embodiments, aspects of the present disclosure reduce the field strength near the electrodes, and enhance the field strength in the gap away from the electrodes, allowing for an overall increase in the field strength without causing a breakdown of the dielectric fluid. Additionally or alternatively, the field consistency introduced by various embodiments (e.g., surface smoothing, coatings, uniform charge distribution, and/or dielectric fluid management) allows for a design to be operated closer to design limitations (e.g., the breakdown field strength 8406) while maintaining reliability of the ESM 1002 and confidence that a breakdown will not occur during operations.

Figure 37:
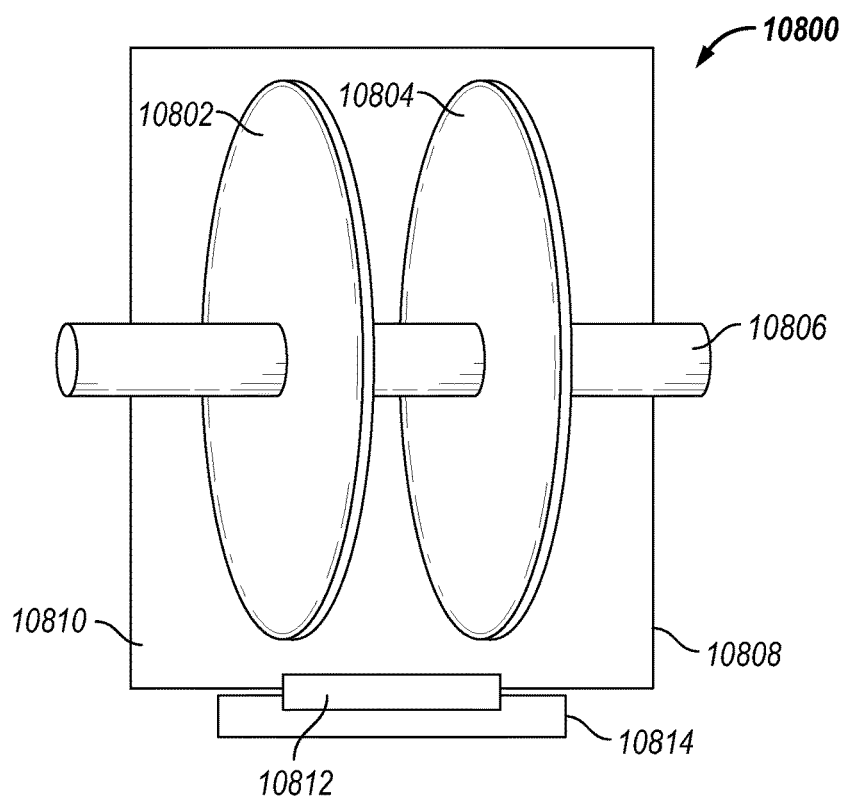
FIG. 37 is a schematic depiction of a housing support system for an electrostatic motor.

With reference to FIG. 37, the electrostatic motor 10800 may include a rotor plate 10802 rotationally coupled to a shaft 10806 extending through a housing 10808 of the electrostatic motor 10800, a stator plate 10804 rotationally fixed relative the housing 10808 of the electrostatic motor, and the housing 10808 defining the rotor plate 10802 and the stator plate 10804. An example housing 10808 is constructed to impart stiffness to oppose at least one powering force of the electrostatic motor, such as an axial force, radial force, and/or a torsional force (e.g., azimuthal). Example structures include a stiffness support configured to oppose at least one powering force (e.g., a rotational force, an axial force, and the like) of the electrostatic motor 10800, for example utilizing ribbing, fins, or other structures on the housing (e.g., reference FIG. 38 and the related description). In embodiments, a fluid 10810 may be dispersed within the housing 10808 and in contact with the rotor plate 10802, the stator plate 10804, and an inner surface of the housing 10808. The fluid 10810 in contact with the rotor plate 10802, the stator plate 10804, and the inner surface of the housing 10808 may provide for a thermal management pathway between the stator plate 10804 and the rotor plate 10802, and an environment outside the electrostatic motor 10800. An example housing 10808 includes a thermal heat transfer feature 10812 (e.g., a fin) to increase thermal transfer between the stator plate 10804, the rotor plate 10802, and the environment outside the electrostatic motor 10800. An example fin to increase thermal transfer may be positioned inside the housing 10808, outside the housing 10808, or both. Further example and non-limiting thermal heat transfer features 10812 include one or more of: a pump circulating the fluid (e.g., reference FIG. 6 and the related description), a thermally conductive coating and/or feature inside the housing (e.g., adjusting conductive or convective heat transfer inside the housing), a thermally conductive coating and/or feature outside the housing (e.g., adjusting conductive, convective, and/or radiative heat transfer outside the housing), a thermally conductive path through the housing 10808 (e.g., a thermally conductive material passing through a less thermally conductive housing, such as metal feature passing through a plastic housing, and/or formed at least partially within the housing such as utilizing an overmolded housing, an additively manufactured housing, a laminated housing, etc.), and/or a thermal jacket and/or heat exchanger component (e.g., to interface with an active thermal management system 10814).

An example system includes an active thermal management system 10814 (e.g., a thermal fluid jacket, for example allowing circulation of an active thermal carrier (e.g., water, propylene glycol, oil, etc.) through the housing and in thermal contact with the fluid, or in thermal contact with the fluid through the housing. The active thermal management system 10814 may be utilized to reject heat during operations of the ESM, to warm up the fluid before or during operations of the ESM, and/or to cool down the fluid before or during operations of the ESM. Example operations to warm up the fluid include circulating an active thermal carrier through the thermal fluid jacket to cause a phase change in the fluid (e.g., where the fluid may be a solid and/or a wax at ambient temperature conditions), and/or to warm up the fluid to a desired operating temperature, and/or a minimum operating temperature, prior to operations of the ESM (e.g., to provide the fluid having selected properties at temperature, and/or a selected viscosity during operations), and/or during selected operations of the ESM (e.g., during a warm-up period, to adjust properties of the fluid during operations, etc.). Example operations to cool down the fluid include circulating an active thermal carrier through the thermal fluid jacket to bring the fluid down to a desired operating temperature, such as when the fluid is heated from a high ambient temperature, a heat soak (e.g., after a shutdown operation, from the ESM and/or another component of a system including the ESM), and/or to adjust the temperature during operations (e.g., during an initial operating period, to adjust the fluid temperature before a shutdown, to adjust properties of the fluid during operations, etc.). In certain embodiments, the active thermal carrier may be utilized to reduce a warm-up time, for example where the ESM is operated before the desired operating temperature is reached.

An example active thermal management system 10814 includes a heat exchanger (e.g., 10812) positioned in thermal contact with the fluid, which may be a jacket (e.g., positioned within the housing, integral with the housing, and/or outside the housing with conductive thermal contact to the interior of the housing). An example active thermal management system 10814 may pass the active thermal carrier to the heat exchanger through the housing wall (e.g., with ports or openings provided in the housing). An example active thermal management system 10814 may include fluid passages for the active thermal carrier formed within the housing—for example as a part of the housing design. In a further example, the fluid passages formed within the housing may be lined (e.g., with an insert positioned within the fluid passages such that the active thermal carrier contacts the insert material rather than the housing material), coated (e.g., with a coating material deposited on the fluid passages within the housing), and/or the housing material may directly form at least a portion of the contact surface the fluid passages (e.g., where the active thermal carrier directly contacts a portion of the housing). Fluid passages formed within the housing may be provided for pass-through of the thermal carrier fluid, and/or forming at least a part of a thermal jacket within the housing and/or integral with the housing. Fluid passages formed within the housing may be provided by any operations, including at least: casting of the housing to provide fluid passages as voids in the casting; casting of the housing to provide fluid passages defined by a removable material, which is removed after the casting operation; creation of at least a portion of the fluid passages with a machining operation; creation of at least a portion of the fluid passages by overmolding the housing (or a portion of the housing) onto formed passage members, which may remain in place as a part of the fluid passages for the active thermal carrier, or which may be removed after the housing is formed; manufacture of the housing, or relevant portions thereof, utilizing an additive manufacturing operation; and/or combinations of these.

Figure 24:
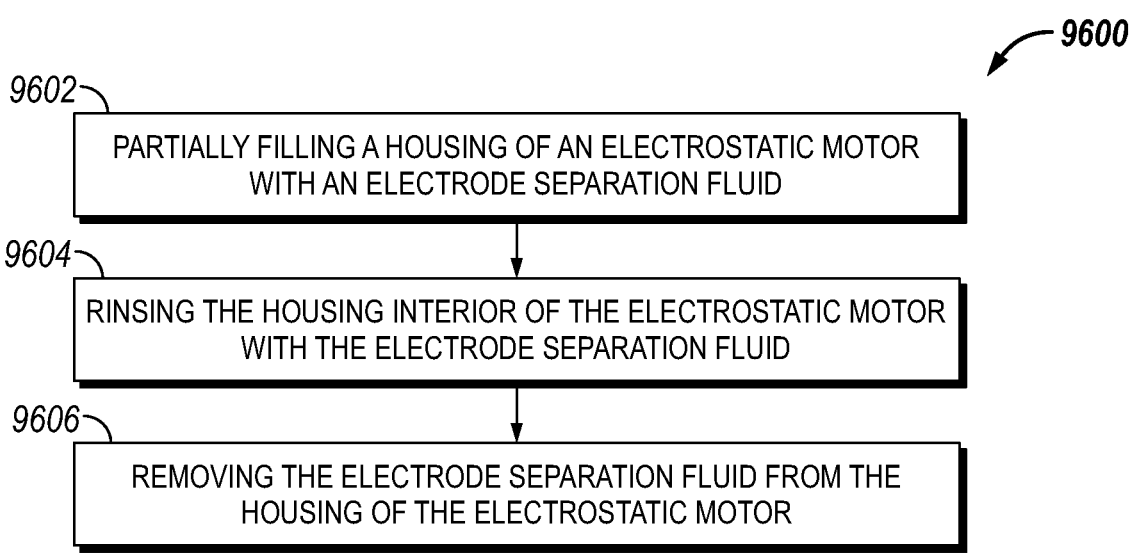
FIG. 24 is a schematic flow diagram of a procedure for removing electrode separation fluid for an electrostatic motor.

Referencing FIG. 24, an example procedure 9600 to perform a rinse of an ESM is schematically depicted. The example procedure 9600 includes an operation 9602 to at least partially fill a housing of an ESM with an electrode separation fluid. The example electrode separation fluid may be a high permittivity fluid, and/or a dielectric fluid, providing for a high capacitive energy storage in gaps between electrodes of the ESM. In certain embodiments, the electrode separation fluid is an operating fluid for the ESM (e.g., a fluid utilized during run-time operations of the ESM), and/or the electrode separation fluid is compatible with an operating fluid for the ESM (e.g., where residual amounts of the electrode separation fluid after operations 9600, and during run-time operations of the ESM, will not materially affect the performance of the ESM). An example electrode separation fluid includes a base fluid composition, for example a fluid composition consistent with an operating fluid, and/or compatible with the operating fluid, but potentially lacking one or more additives that might normally be included in the operating fluid.

Example and non-limiting base fluid compositions include one or more of: a ketone, an ester, a carbonate, a malonate, a lactone, a propylene carbonate-based fluid composition; an oxalate; an amide; an imide; and/or a lactam. An example base fluid composition includes one or more of: isoamyl isovalerate, hexyl isobutyrate, diethyl ethyl malonate, and/or delta-nonalactone.

In certain embodiments, the electrode separation fluid includes one or more additives. Without limitation to any other aspect of the present disclosure, an additive herein may be provided in an amount between 1 ppm and 1%, by weight. In certain embodiments, additives of the electrode separation fluid are at least partially consistent with additives of an operating fluid—for example due to convenience and/or availability of the operating fluid for rinsing operations 9600. In certain embodiments, additives of the electrode separation fluid are provided for a benefit to the rinsing process, which additives may be similar to, the same as, or distinct from one or more additives to be utilized in the operating fluid. In certain embodiments, an additive may be provided within the base fluid, and/or may be provided in contact with the base fluid, for example a water scavenger provided in contact with the operating fluid before inclusion into the ESM and/or utilization during operations such as rinsing operation, and/or provided in contact with the operating fluid during operations of the ESM (e.g., the additive provided in a pill, container fluidly exposed to the operating fluid, in a contact arrangement such as a packed bed, where operating fluid is pumped and/or circulated through the additive component, etc.). An additive may be included during any operations such as fluid preparation, rinsing, fluid recovery, fluid recycle operations, and/or during operations of the ESM. In certain embodiments, the additives package may vary in constituents and/or concentrations according to the operations being performed. In certain embodiments, an additive may be included in fluid contact with the operating fluid, and positioned in a region of the ESM (e.g., within the housing, accumulator, or the like) having a selected environment, such as a temperature, fluid flow regime, and/or electric field environment (e.g., a position within the ESM positioned away from a strong electric field, positioned outside of a conductive sleeve at least partially defining the capacitive stack, etc.).

Example and non-limiting additives include a free radical scavenger, a contamination scavenger, and/or a water scavenger. Example free radical scavengers include, without limitation, butylated hydroxytoluene, butylated hydroxyanisole, tertiary-butylhydroquinone, gallate, and/or a phenolic antioxidant. The type and amount of free radical scavenger present may be determined according to expected contaminants, side reactions, degradation constituents, or the like from components of the ESM (e.g., rotor and/or stator plates or electrodes, bearings, seals, surfaces, etc.), and/or further according to an expected life span, service life, operating life, etc. of the ESM. Example and non-limiting contamination scavengers include one or more of an organo-metallic compound, trimethyl (phenyl) tin, and/or or a bismuth organo-metallic. Example and non-limiting water scavengers include one or more of $CaCl$, $CaSO_4$, Copper (II) Sulfate, $LiAH_4$, $MgSO_4$, an oxazolidine, a monomeric isocyanate, and an alkoxysilane. In certain embodiments, the water scavenger includes an oxazolidine provided at a low concentration (e.g., 0.1 ppm to 100 ppm), and/or provided at a location positioned away from the capacitive stack and/or in a position having a reduced, attenuated, and/or mitigated electric field present. In certain embodiments, an example and non-limiting water scavenger includes one or more of $CaCl$, $CaSO_4$, Copper (II) Sulfate, $LiAlH_4$, $MgSO_4$, phosphorous pentoxide, potassium carbonate, a silica gel, a monomeric isocyanate, and/or an alkoxysilane. An example additive includes barium titanate, which may be provided as a coated particle, and/or as a nano-particle. In certain embodiments, barium titanate, and/or other coated conductive particles, including particles sized as a nano-particle, favorably adjust the electric field, and boost a relative permittivity of the operating fluid. An example additive includes a coated metal oxide, which may be provided as a nanoparticle. An example water scavenger includes a molecular sieve, including a molecular sieve provided in fluid contact with the operating fluid.

An example ESM includes a rotor rotationally coupled to a shaft, one or more seals related to the shaft (e.g., at an entrance and/or egress location of the shaft to the housing), bearings (e.g., separation assembly bearings, such as between rotor and stator plates, and/or bearings coupling the stator to the shaft, etc.), an accumulator (e.g., reference FIGS. 28, 29), and/or one or more baffles (e.g., to configure fluid flow in the ESM during operations) and/or fins (e.g., supporting heat transfer, and/or providing structural support). The recited features, without limitation to any other aspect of the present disclosure, provide for an environment within the ESM that can trap residue and debris (e.g., manufacturing residue, casting residue, machining residue, polishing residue, residue deposited during storage, residue from coating and/or deposition operations, residue from removal of casting formed features, residue from additive manufacturing operations, etc.), and further can damage moving parts (e.g., bearings, accumulator, engagement points between the rotor plates and other components of the ESM) during operation if the residue is not removed, and/or re-located to a more neutral position (e.g., at the bottom of the housing). Additionally, some parts can jam (e.g., an accumulator, a bearing), fail to function properly (e.g., the accumulator, a bearing, and/or a seal), and/or suffer a catastrophic failure if debris is not removed, and if lubrication is not provided before operations of the ESM.

The example procedure 9600 further includes an operation 9604 to rinse the housing interior of the ESM with the electrode separation fluid. Rinsing operations may include filling to a selected level, and/or with a selected amount of the electrode separation fluid, agitating or otherwise moving the ESM through a selected trajectory (e.g., to ensure exposure of all selected parts within the ESM), and/or may further include leaving the rinsing fluid within the ESM for a selected residence time. The example procedure 9600 further includes an operation 9606 to remove the electrode separation fluid from the housing of the ESM.

Figure 25:
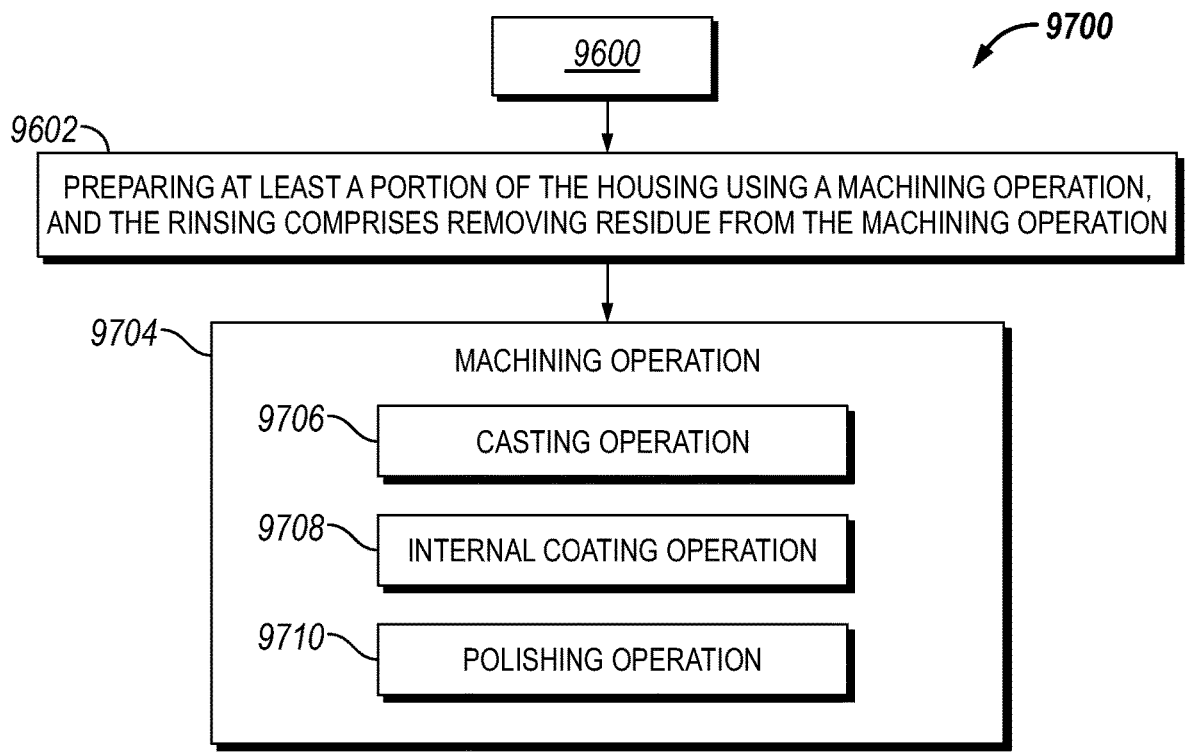
FIG. 25 is a schematic flow diagram of a procedure for rinsing a housing assembly for an electrostatic motor.

Referencing FIG. 25, an example procedure 9700 for preparing an ESM with a rinse is schematically depicted. The example procedure 9700 includes performing one or more operations on the ESM, such as a machining operation 9704, a casting operation 9706, an internal coating operation 9708, and/or a polishing operation 9710. The example procedure 9700 includes operation 9702 to prepare the housing using the machining or other assembly operations (not limited to the examples depicted in FIG. 25), and operation 9600 to perform a rinse of the ESM.

Figure 26:
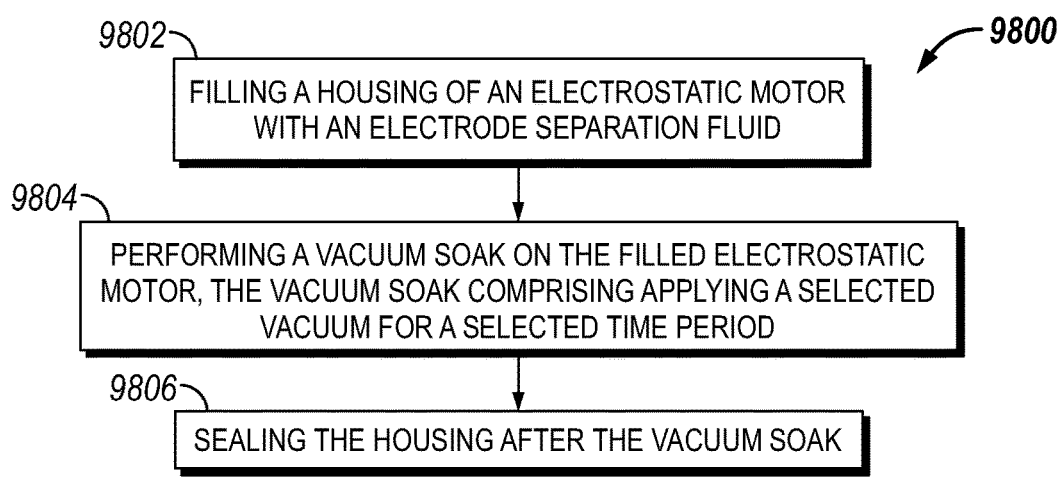
FIG. 26 is a schematic flow diagram of a procedure for sealing a housing for an electrostatic motor.

Referencing FIG. 26, an example procedure 9800 to fill an ESM with an operating fluid is schematically depicted. The example procedure 9800 includes an operation 9802 to fill a housing of an ESM with an electrode separation fluid. In certain embodiments, the electrode separation fluid may be a fully formed operating fluid, for example a dielectric fluid with selected additives. Any example base fluid and/or additives as set forth in the description referencing FIG. 24 are contemplated herein. The example procedure 9800 includes an operation 9804 to perform a vacuum soak on the filled ESM, and/or to perform the vacuum soak on the operating fluid before operation 9802 to fill the ESM. Example operations 9804 include one or more of: positioning the filled ESM into a vacuum chamber, applying a vacuum directly to the housing of the ESM (e.g., sealing against a fill opening of the ESM, and applying the vacuum to the housing), and/or positioning the operating fluid in a vacuum chamber (and/or otherwise in pressure coupling with a vacuum device). The example operation 9804 may be performed at a selected applied vacuum for a selected time. The time to execute the vacuum soak operation 9804 may depend upon one or more of: the volume of the operating fluid and/or the ESM; an opening area of the ESM (e.g., exposed area of the filled fluid to the vacuum chamber and/or housing applied vacuum); a temperature of the fluid (e.g., generally a higher temperature will drive gases and/or undesirable volatile constituents out of the fluid more quickly); the strength of vacuum applied; ancillary operations applied to enhance constituent removal (e.g., agitation, application of ultrasound, application of freeze-pump-thaw operations, etc.); and/or the applied atmosphere in contact with the operating fluid (e.g., maintaining an inert gas environment, removal of released constituents as they evolve, etc.). The example procedure 9800 includes an operation 9806 to seal the housing after the vacuum soak. In certain embodiments, the vacuum soak operation 9804 may be repeated, and/or the filling operation 9802 may be repeated (e.g., incrementally filling the ESM, replacing the operating fluid after the vacuum soak, etc.).

Figure 27:
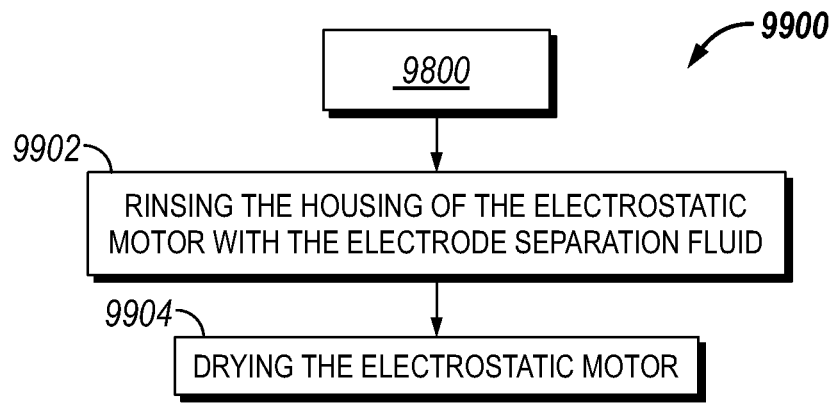
FIG. 27 is a schematic flow diagram of a procedure for drying an electrostatic motor.

Referencing FIG. 27, an example procedure 9900 for preparing an ESM for operation is schematically depicted. The example procedure 9900 may be performed additionally to procedure 9800 as depicted in FIG. 27. The example procedure 9900 includes an operation 9902 to rinse the housing of the ESM with an electrode separation fluid (e.g., reference FIG. 24 and the related description), and an operation 9904 to dry the ESM. The operation 9904 to dry the ESM may be omitted, and procedure 9800 to fill the ESM may be performed additionally or alternatively to drying operation 9904. In the example of FIG. 27, operation 9800 to fill the ESM may be performed previously (e.g., where operation 9900 is removing the operating fluid from an active ESM, for example as a service event), and/or may be performed after one or more operations 9902, 9904 (e.g., performing an initial fill of the ESM, completing a service event, etc.).

Without limitation to any other aspect of the present disclosure, operations to fill the ESM, and/or partially fill the ESM, include pre-filling the ESM to cover one or more features or components of the ESM (e.g., an accumulator, electrode, bearing, seal, etc.). In certain embodiments, a pre-filling operation includes filling the housing to an approximately full state (e.g., allowing room for gas release and/or agitation without causing a spill, etc.), and/or filling the housing to a nominally full state. In certain embodiments, a filling procedure includes performing a final filling operation of the housing prior to sealing the housing—for example topping off the operating fluid due to air release, a space left to accommodate gas release and/or agitation, etc. In certain embodiments, the final filling operation is performed with a treated operating fluid, for example fluid that resided in a vacuum chamber with the ESM during a vacuum soak operation, and/or fluid that is otherwise treated and ready for inclusion in the ESM. Example final filling operations provide make-up operating fluid due to de-gassing, and/or air pocket release during vacuum soak and/or rinse operations. Example operating fluids, dielectric fluids, and/or electrode separation fluids, as used herein, include any base fluid compositions and/or additives described throughout the present disclosure, including at least those set forth in the description referencing FIG. 24.

An example time period for a vacuum soak operation includes a time period encompassing a filling operation of the ESM (e.g., the vacuum is applied during filling of the ESM to avoid diffusion and/or entrainment of undesired gasses into the fluid). In the example, the vacuum may be relieved after the filling operation(s), and/or a preferential gas environment and/or inert gas environment may be provided after the filling and/or during the filling. Example and non-limiting time periods for a vacuum soak operation include any one or more of: a time sufficient to provide a selected de-gassing level for the operating fluid; between 2 and 24 hours (inclusive); a time between 12 hours and 1 week; and/or a time between 24 hours and 10 days. Example and non-limiting vacuum levels applied during vacuum soak operations include one or more of: a range of 1-10 psig (e.g., between 1 psi and 10 psi below an ambient and/or atmospheric pressure); a range of between 2 and 14.7 psig; and/or a range of between 7 and 14.7 psig. In certain embodiments, selected vacuum levels are considered based on one or more of: vacuum facilities available (e.g., a service location and a manufacturing facility may have different capabilities); the application of vacuum in a chamber or directly to the housing (e.g., directly applied vacuum may tend to operate more quickly); a system limitation to the vacuum level that can be applied (e.g., directly applied vacuum may be limited by seals of the ESM); and/or a size of the ESM, a filling hole of the ESM, and/or a volume of operating fluid in the ESM. In certain embodiments, a seal cap (not shown) is provided on one or more seals, allowing for a directly applied vacuum to be performed at a higher level of vacuum, including a vacuum level otherwise exceeding a pressure differential rating (and/or capability) of seals of the ESM.

Figure 28:
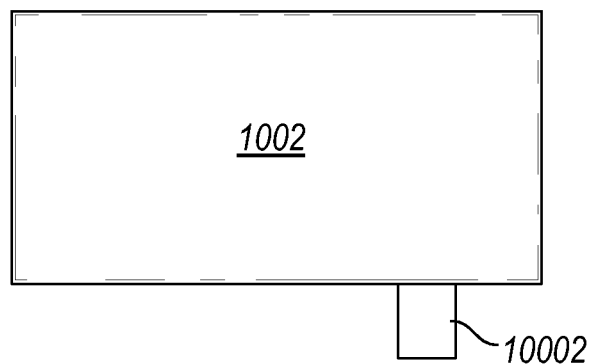
FIG. 28 is a schematic depiction of a system for an electrostatic motor.
Figure 29:
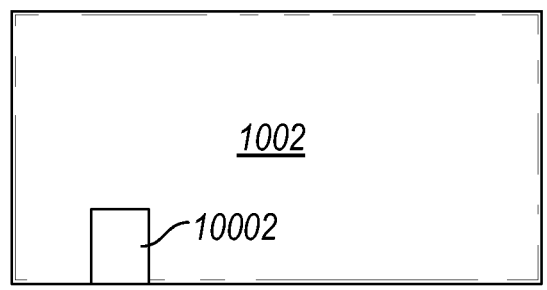
FIG. 29 is a schematic depiction of a system for an electrostatic motor.

Referencing FIG. 28, an example ESM 1002 is depicted that is consistent with certain embodiments of the present disclosure. The example ESM 1002 may be utilized with any system described herein. The example ESM 1002 includes an accumulator 10002, for example to provide allowance for volume variations of a dielectric fluid of the ESM 10002. The example accumulator 10002 is positioned outside the housing of the ESM 10002, for example fluidly coupled to the housing area retaining the dielectric fluid. The accumulator may be of any time, including at least a diaphragm based accumulator and/or a piston based accumulator. The accumulator 10002 may be a passive device, for example maintaining a selected fluid pressure (which will generally equate to a given fluid level) in the housing of the ESM 10002. In certain embodiments, fluid volume variations due to volatile component losses, temperature variations, electric field variations (e.g., imposing an electrostriction density change to a dielectric fluid), an electromechanical volume change of the fluid (e.g., a piezoelectric volumetric change), phase changes, effective volumetric changes during operation (e.g., through fluid travel, adhesion, and/or movement within the ESM 1002), to accommodate imperfect filling levels during manufacture and/or service, and/or for any other reason that fluid volume may vary. The accumulator 10002 may be an active device, for example responsive to a controller 6200, for example to control a fluid level and/or adjust a fluid level during operations of the ESM 1002. Referencing FIG. 29, another example accumulator 10002 is depicted, positioned within the housing in the example of FIG. 29. The inclusion of the accumulator 10002 within the housing reduces the footprint of the ESM 1002, and reduces striking surfaces, for example during transport of the ESM 1002 and/or operations performed in the vicinity of the ESM 1002. The coupling of the accumulator 10002 to the outside of the housing, for example as depicted in FIG. 28, allows for full utilization of the volume within the housing (e.g., providing room for the capacitive stack, the shaft, connecting electrical circuits, etc.). An accumulator 10002, where present, may be included in any manner.

Figure 30:
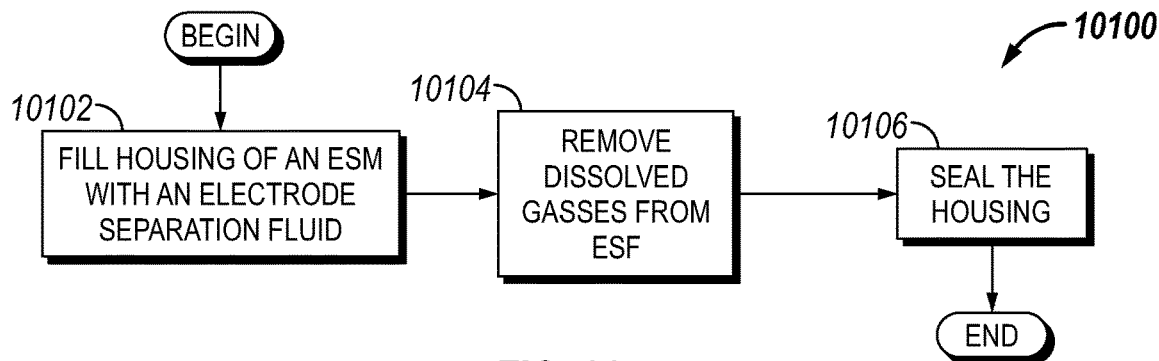
FIG. 30 is a schematic flow diagram of a procedure for sealing a housing for an electrostatic motor.

Referencing FIG. 30, an example procedure 10100 for removing dissolved gases from an ESM is schematically depicted. The example procedure 10100 may be performed at a time of initial manufacture, as a service event, responsive to a service event (e.g., when replacing fluid to the ESM after another service event), and/or as a diagnostic operation (e.g., to eliminate dissolved gases as a potential failure mode for an ESM). The example procedure 10100 includes an operation 10102 to fill a housing of an ESM with an electrode separation fluid. The example procedure further includes an operation 10104 to remove dissolved gases from the electrode separation fluid.

Figure 31:
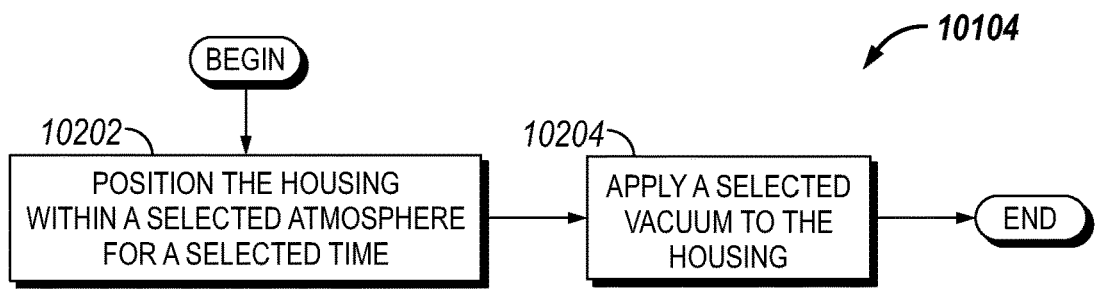
FIG. 31 is a schematic flow diagram of a procedure for applying a vacuum to a housing for an electrostatic motor.

Referencing FIG. 31, an example procedure 10104 to remove dissolved gases from the electrode separation fluid is schematically depicted. The example procedure 10104 includes an operation to position the housing within a selected atmosphere for a selected time. The selected atmosphere may include a vacuum atmosphere (e.g., reference operation 10204), and/or may include a selected gas, such as nitrogen, argon, $SF_6$, a halocarbon, a perfluorinated ketone, a fluoronitrile, $CO_2$, $H_2$, dodecafluoro-2-methylpentan-3-one (e.g., Novec™ produced by 3M'), a halomethane, and/or $CF_3I$. The example selected atmospheres are non-limiting and illustrative. In certain embodiments, the selected atmosphere includes an inert gas. In certain embodiments, the selected atmosphere includes any gas (e.g., air), with a selected humidity level (generally, very low humidity, dry air, or another dry gas). The example procedure 10104 further includes an operation 10204 to apply a selected vacuum to the housing. Operations 10202, 10204 may, additionally or alternatively, be performed on the electrode separation fluid separate from the ESM (e.g., with the electrode separation fluid removed, and/or not yet positioned within the ESM; and/or with a portion of the electrode separation fluid treated separately, for example as a final filling fluid. The selected time may be selected based on the amount of gas to be purged, the amount of gas that is to remain in the electrode separation fluid, the application of other degassing aspects of the procedure 10104 (e.g., applied heat, vacuum, application of ultrasonic energy to the electrode separation fluid, application of one or more freeze-pump-thaw cycles, etc.). The selected amount of time may be any value, including at least: 1-6 hours; 4-24 hours; 12 hours to 1 week; up to a month; and/or indefinitely (e.g., when storing the ESM, storing electrode separation fluid, and/or preparing a batch of electrode separation fluid to be utilized in future rinsing and/or filling operations).

Without limitation to any other aspect of the present disclosure, operation 10204 to apply a selected vacuum may be performed utilizing any aspects discussed throughout, including at least aspects described in relation to FIG. 27.

Figure 32:
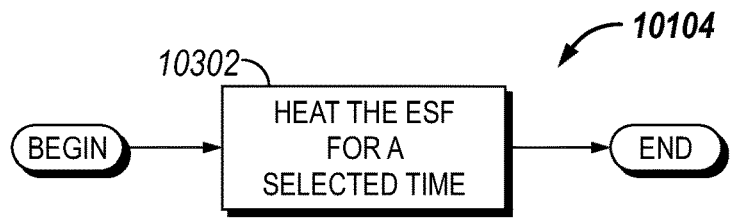
FIG. 32 is a schematic flow diagram of a procedure for heating an assembly in an electrostatic motor.

Referencing FIG. 32, another example procedure 10104 to remove dissolved gases from the electrode separation fluid is depicted. The example procedure 10104 includes an operation 10302 to heat the electrode separation fluid for a selected time. Operations to heat the fluid generally result in an increased rate of gas evolution from the electrode separation fluid. Heating operations may be performed at any selected temperature, where the temperature may be selected according to any one or more of: the volatility of the electrode separation fluid (including the base fluid composition(s) and/or additives); temperature constraints of any component of the ESM (e.g., seals, housing materials, bearing materials, etc.); the volatility and/or solubility of any gases to be removed from the electrode separation fluid; side reactions that may occur within the ESM and/or electrode separation fluid, including with any component of the ESM in contact with the electrode separation fluid; the vapor pressure and/or flammability of any component of the electrode separation fluid; and/or the vacuum applied to the ESM and/or electrode separation fluid, including effects of the applied vacuum to any of the foregoing. Example and non-limiting temperature values for heating include 50° C., 100° C., 150° C., and/or 200° C. In certain embodiments, temperatures higher than 200° C. may be utilized. Certain seal components and/or side reactions, such as coking of components of the electrode separation fluid, may limit the temperature to be utilized. Limiting parameters for the heating temperature will be understood to the person of skill in the art, having the benefit of the present disclosure, and information ordinarily available when contemplating a particular system.

In certain embodiments, other operations 10104 to remove dissolved gases may be perform, in addition to or alternatively to those set forth in relation to FIGS. 102, 103. An example operation 10104 to remove dissolved gasses includes performing a freeze-pump-thaw operation on the electrode separation fluid. The example freeze-pump-thaw operation may be performed under a vacuum for more rapid convergence to a degassed electrode separation fluid. Additionally or alternatively, depending upon the characteristics of the electrode separation fluid and the ESM, including for example the availability of a thermal fluid jacket on the ESM, the volumetric response of the electrode separation fluid to freezing and thawing, and the advisability of mixing the electrode separation fluid after thawing (including whether the ESM includes a circulating pump for the electrode separation fluid) the freeze-pump-thaw cycle may be performed in situ within the ESM, and/or in combination with a separate freeze-pump-thaw cycle performed on a portion of the electrode separation fluid apart from the ESM. An example operation 10104 to remove dissolved gases from the electrode separation fluid includes performing an ultrasonic degassing operation on the electrode separation fluid. The ultrasonic degassing operation may be performed on the electrode separation fluid separately, on the electrode separation fluid in-situ within the ESM, and/or a combination of these. The ultrasonic degassing operation may be combined with any other degassing operations, including at least positioning the electrode separation fluid and/or ESM in a select gaseous atmosphere, performing the ultrasonic degassing operation under a vacuum, and/or heating the electrode separation fluid and/or ESM. An example operation 10104 to remove dissolved gases from the electrode separation fluid includes subjecting the electrode separation fluid and/or ESM to a number of heating/cooling cycles—for example heating the electrode separation fluid and/or ESM to an elevated temperature (e.g., which may additionally include performing a vacuum operation), cooling the electrode separation fluid and/or ESM (to a room temperature, ambient temperature, and/or an actively cooled temperature, and/or which may further include providing a selected gaseous atmosphere and/or performing a vacuum operation), and repeating the heating/cooling cycle a selected number of times (e.g., a total of one time, two times, six times, etc.).

Figure 33:
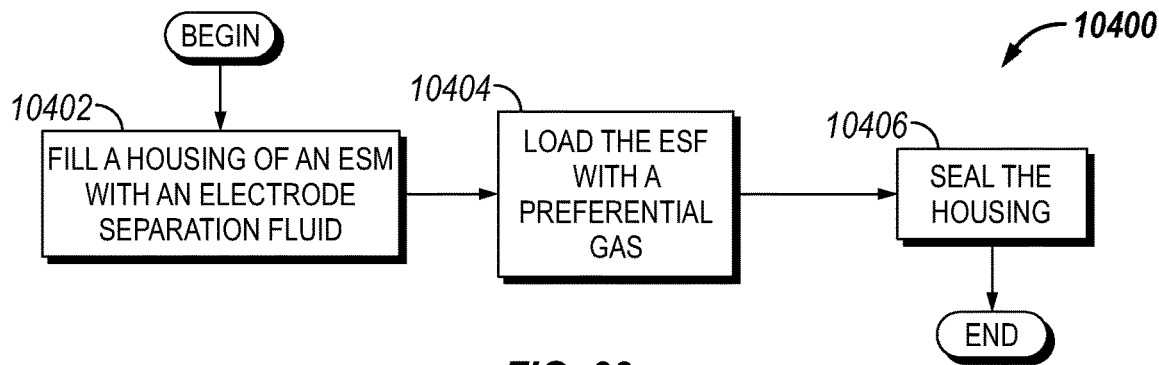
FIG. 33 is a schematic flow diagram of a procedure for sealing a housing for an electrostatic motor.

Referencing FIG. 33, an example procedure 10400 to fill a housing of an ESM is schematically depicted. The example procedure 10400 includes an operation 10402 to fill a housing of the ESM with an electrode separation fluid. In certain embodiments, procedure 10400 may be performed, in whole or part, on an electrode separation fluid apart from the ESM as set forth throughout the present disclosure. The example procedure 10400 further includes an operation 10404 to load the electrode separation fluid with a preferential gas. Without limitation to any other aspect of the present disclosure, a preferential gas includes any gas that is compatible with the electrode separation fluid, compatible with components and/or materials present in the ESM, and/or a gas that has a tendency to displace at least a portion of the gas solubility capacity of the electrode separation fluid, including at least under the operating conditions of the ESM (e.g., where the ESM is sealed during normal operations). Example and non-limiting preferential gasses include one or more of: nitrogen, argon, $SF_6$, a halocarbon, a perfluorinated ketone, a fluoronitrile, $CO_2$, $H_2$, dodecafluoro-2-methylpentan-3-one, a halomethane, and/or $CF_3I$. In certain embodiments, air having a selected humidity level can serve as a preferential gas. Example operations 10404 to load the electrode separation fluid with a preferential gas include one or more operations such as: maintaining an atmosphere of the preferential gas during degassing operations (e.g., heating, performing one or more freeze-pump-thaw cycles, applying a selected vacuum, applying one or more heating/cooling cycles, performing an ultrasonic degassing operation, etc.); bubbling the preferential gas through the electrode separation fluid; and/or maintaining an atmosphere of the preferential gas during a loading operation, for example with favorable solubility conditions such as increased pressure and/or reduced temperature applied to the electrode separation fluid. Operations 10404 to load the electrode separation fluid with a preferential gas may be performed in situ with a fluid positioned in the ESM, on a standalone electrode separation fluid, and/or a combination of these. The example procedure 10400 includes an operation 10406 to seal the housing—for example to prepare the ESM after initial manufacture, and/or to prepare the ESM to return to service after a service event, maintenance event, or the like.

Figure 34:
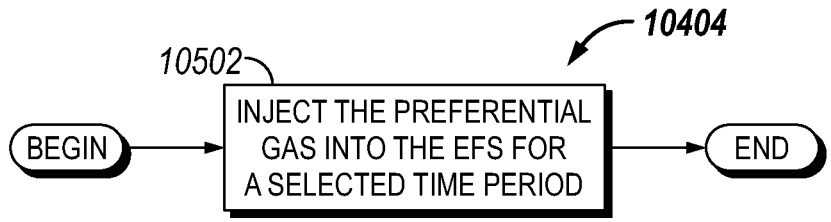
FIG. 34 is a schematic flow diagram of an injecting a gas into a housing for an electrostatic motor.

Referencing FIG. 34, an example operation 10404 to load the electrode separation fluid with a preferential gas includes injecting the preferential gas into the electrode separation fluid for a selected time period (e.g., 5 minutes, 10 minutes, 1 hour, 4 hours, etc.), and/or injecting the preferential gas at a selected rate. In certain embodiments, operation 10404 to inject the preferential gas is performed at selected conditions, for example to create a favorable solubility environment for the preferential gas in the electrode separation fluid (e.g., at an increased pressure and/or reduced temperature).

Figure 35:
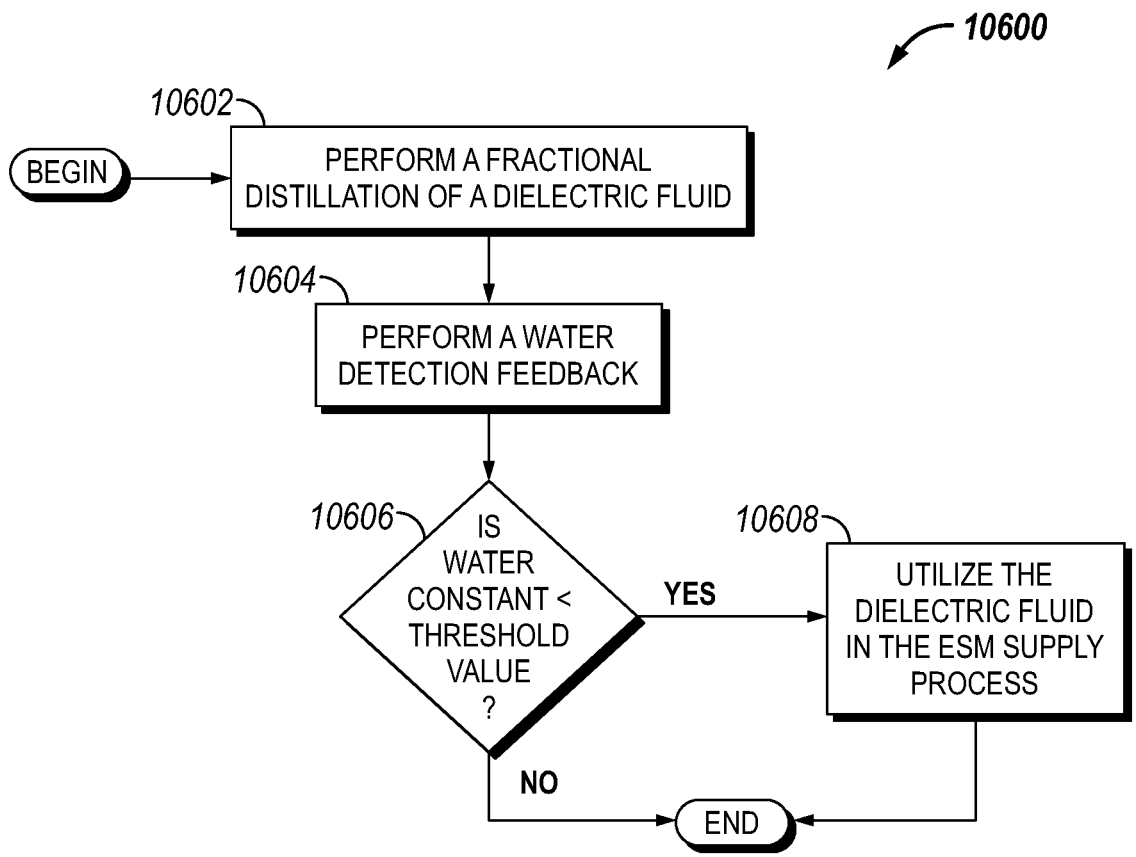
FIG. 35 is a schematic flow diagram of a procedure for performing a distillation operation for an electrostatic motor.

Referencing FIG. 35, an example procedure 10600 to dewater a dielectric fluid is schematically depicted. The example procedure 10600 includes an operation 10602 to perform a water removal operation on the dielectric fluid. The procedure 10600 may be performed on the dielectric fluid apart from the ESM, in situ within the ESM, and/or a combination of these. The example of FIG. 35 depicts performing a fractional distillation of the dielectric fluid as operation 10602. However, any type of water removal operation may be performed, including at least operations such as: treating the dielectric fluid with at least one of a water scavenger or a molecular sieve; treating the dielectric fluid with at least one of a water scavenger or a molecular sieve after the performing the fractional distillation; performing a second fractional distillation of the dielectric fluid; performing a vacuum distillation of the dielectric fluid; performing a pervaporation of the dielectric fluid; performing a molecular sieve water removal on the dielectric fluid; and/or performing a membrane water separation on the dielectric fluid.

The example procedure 10600 includes an operation 10604 to perform a water detection feedback operation on the dielectric fluid to confirm a water content of the dielectric fluid. In certain embodiments, operation 10604 may be performed before operation 10602 to perform the water removal operation. In certain embodiments, a history of the dielectric fluid may be utilized to determine whether to perform the water detection feedback operation 10604 before water removal operations 10602, and/or to select which water removal operation(s) 10602 and/or parameters for such operations (e.g., temperatures, pressures, residence time values, etc.). For example, the history of the dielectric fluid may include utilization parameters (e.g., whether it was used in an ESM, how long, and/or an operating duty cycle for such use), whether the dielectric fluid has been previously treated and/or had a water removal treatment, recent storage conditions for the dielectric fluid, and/or a source of the dielectric fluid. In certain embodiments, one or more water removal operations 10602 may be performed before performing the water detection feedback operation 10604. In certain embodiments, a water content determined in the water detection feedback operation 10604 may be used to determine which water removal feedback operation(s) 10602 to perform, parameters for such operations, and/or how many times a given water removal feedback operation 10602 will be performed before completion of the procedure 10600 and/or a repeat of the water detection feedback operation 10604. The example procedure 10600 includes an operation 10606 to determine whether the water content of the dielectric fluid is below a threshold value. The threshold value may be selected according to the dielectric fluid (e.g., sensitivity and/or affinity to water), the utilization of the dielectric fluid (e.g., storing for later use, going into an ESM for operations, and/or a power rating, electric field strength, gap size, and/or other relevant operational parameters of the target ESM). In response to operation 10606 indicating "YES", the procedure 10600 includes an operation 10608 to utilize the dielectric fluid in an ESM supply process (e.g., utilizing as a rinsing fluid, an operating fluid, storing for later use, which may include dry storage, protected storage, and/or vacuum storage, and/or transporting to a location such as a service location, manufacturing location, etc.). In response to operation 10606 indicating "NO", the procedure 10600 may include repeating a selected operation 10602 for water removal, including potentially adjusting the operation 10602 (e.g., type of removal, number of times for operations to be performed, and/or parameters for the removal operation), re-testing the water content (e.g., at operation 10604), and/or ending the procedure 10600. An example procedure 10600 includes performing an operation 10602 as a fractional distillation of the dielectric fluid before performing the water detection feedback 10604. An example procedure 10600 includes performing an operation 10602 as a fractional distillation of the dielectric fluid before another water removal operation 10602 (e.g., any operation disclosed herein, including at least a second fractional distillation of the dielectric fluid), and before performing the water removal operation 10604. An example dielectric fluid includes a supplied base fluid—for example, a general chemical delivery from a provider of a base fluid composition such as any base fluid composition set forth herein. An example dielectric fluid includes a recycled dielectric fluid—for example from an ESM in-use, from a part of an ESM supply process (e.g., a rinse fluid, a stored fluid, an expired fluid, etc.).

Example and non-limiting operations 10604 to perform a water detection feedback include any water content determination procedures understood in the art. Without limitation to any other aspect of the present disclosure, example operations 10604 include one or more operations such as: performing a nuclear magnetic resonance interrogation of the dielectric fluid; performing an electromagnetic spectrum analysis of the dielectric fluid (e.g., on a liquid sample or vapor sample of the dielectric fluid); performing an infrared spectrum analysis of the dielectric fluid (e.g., on a liquid sample or vapor sample of the dielectric fluid); performing a Karl Fischer titration operation on a sample of the dielectric fluid; performing a high-performance liquid chromatography operation on a sample of the dielectric fluid; performing an electrochemical water detection operation on a sample of the dielectric fluid; performing at least one of a potentiometric titration or a potentiometric detection on a sample of the dielectric fluid; performing a coulometric titration on a sample of the dielectric fluid; and/or performing a gas chromatography-mass spectrometry operation on a sample of the dielectric fluid.

Figure 36:
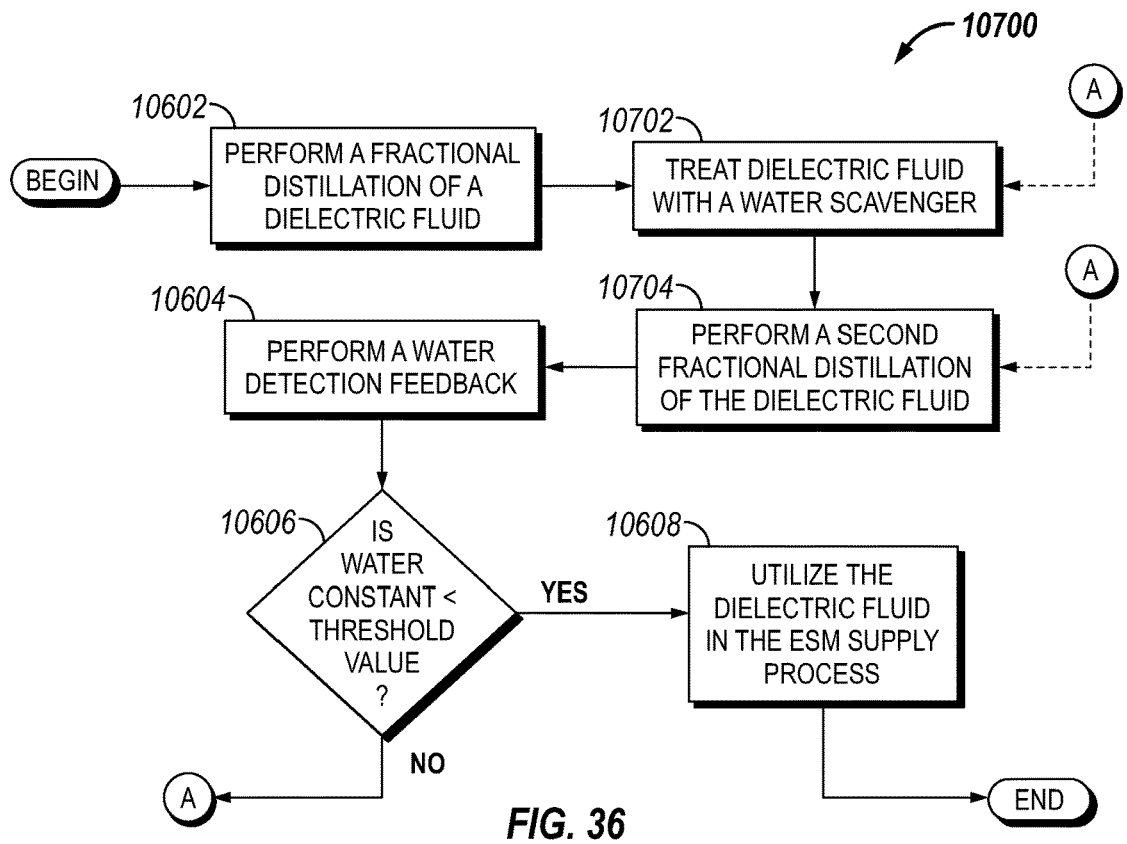
FIG. 36 is a schematic flow diagram of a procedure for performing a distillation operation for an electrostatic motor.

Referencing FIG. 36, an example procedure 10700 to utilize a dielectric fluid in an ESM supply process is schematically depicted. The example procedure 10700 includes an operation 10602 to perform a fractional distillation on a dielectric fluid, an operation 10604 to treat the dielectric fluid with a water scavenger and/or with a molecular sieve, and an operation 10704 to perform a second fractional distillation of the dielectric fluid. The example procedure 10700 includes an operation 10604 to perform a water feedback detection operation on the dielectric fluid, and an operation 10606 to determine whether a water content of the dielectric fluid is below a threshold value. The example procedure 10700 includes, in response to operation 10606 indicating "YES", an operation 10608 to utilize the dielectric fluid in an ESM supply process. The example procedure 10700 includes, in response to operation 10606 indicating "NO", an operation to perform additional water removal operations on the dielectric fluid. The example procedure 10700 includes selectively returning to operation 10702 and/or 10704 in response to operation 10606 indicating "NO". In certain embodiments, in response to operation 10606 indicating "NO", the example procedure 10700 includes returning to operation 10602, performing a different water removal operation (not shown), and/or ending the procedure 10700. In certain embodiments, a decision to return to a selected operation (e.g., 10602, 10702, 10704, and/or a different water removal operation) is performed in response to a water content of the dielectric fluid as determined at operation 10604.

Figure 38:
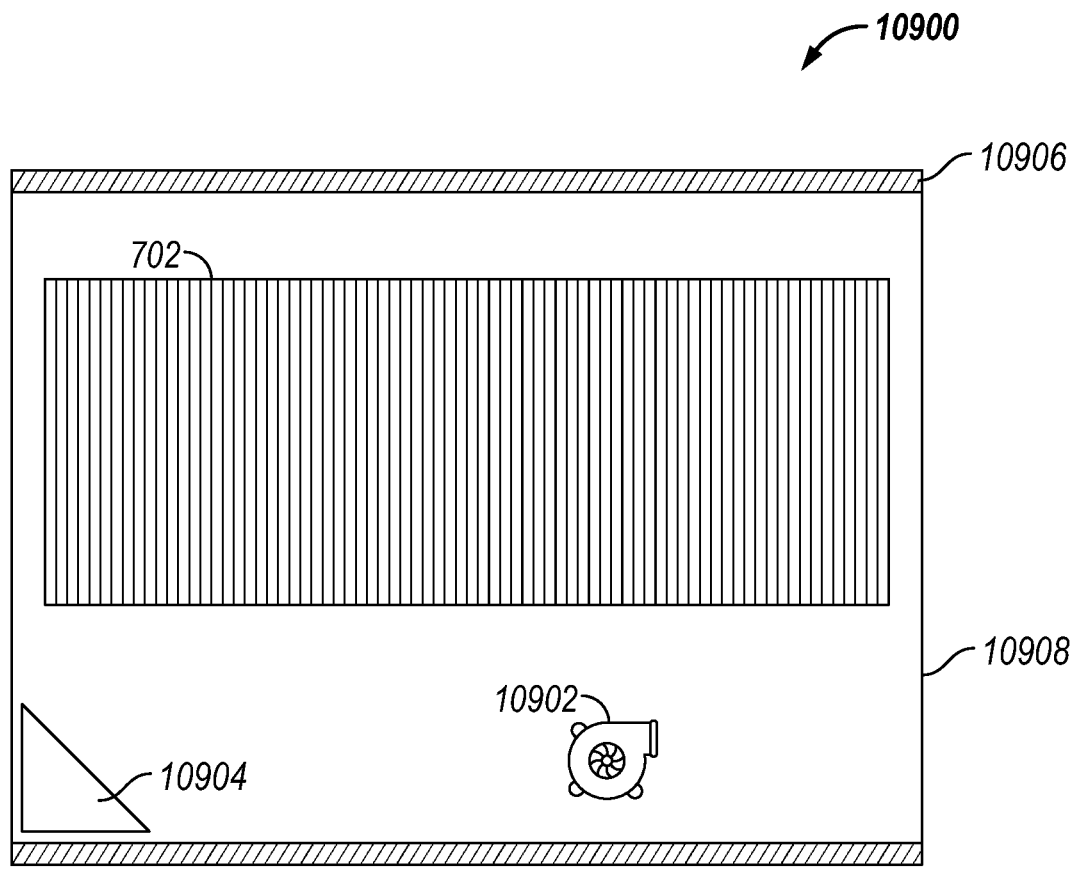
FIG. 38 is a schematic depiction of a system for an electrostatic motor.

Referencing FIG. 38, an example ESM 10900 includes a number of features consistent with aspects of the present disclosure. The ESM 10900 may be utilized with any systems or aspects of the present disclosure. The example ESM 10900 includes a housing 10908 having a coating 10906 thereon. An example coating 10906 includes a conductive coating, for example to provide an EMI reduction for emissions from the capacitive stack 702. Another example coating 10906 includes a thermally conductive coating, for example to promote heat transfer from the fluid to the external environment of the ESM 10900, and/or to promote heat transfer away from the capacitive stack 702, from electrical components positioned within the housing 10908, or the like. An example coating 10906 provides a hardened and/or polished (or otherwise smooth) surface for an interior of the housing—for example to reduce friction of circulating fluid, and/or to inhibit loss of housing material (e.g., including the introduction of ions, particles, and/or contaminants from the housing surface into the dielectric fluid). An example feature, positioned similarly to the coating 10906 in certain embodiments (but not shown), includes a conductive tube and/or a conductive mesh. In certain embodiments, the conductive tube and/or conductive mesh is provided inside the housing, outside the housing, and/or at least partially integrated with the housing 10908. For example, the conductive tube (and/or mesh) may be formed with an overmolded housing 10908 provided as a plastic housing (e.g., The example coating 10906 and/or conductive tube may be provided on the inside of the housing (e.g., to maintain a look of the ESM, to provide a selected outer surface of the ESM 10900, and/or to provide an ESM having a selected footprint). The example coating 10906 and/or conductive tube may be provided on an outside of the housing.

An example feature, positioned similarly in certain embodiments to the coating 10906 (but not shown) include a thermal fluid jacket. The thermal fluid jacket may be provided as a part of a conductive tube and/or mesh at least partially defining the capacitive stack 702 (e.g., with fluid passages, and/or geometric elements, configure to provide a conductive layer at least partially around the capacitive stack 702, and/or a heat transfer interface between an active thermal fluid (not shown) and the dielectric fluid. Example and non-limiting active thermal fluids include water, propylene glycol, and/or oil. In certain embodiments, the thermal fluid jacket, where present, includes an interface (e.g., connector, port, stem, etc.) for coupling the active thermal fluid. In certain embodiments the active thermal fluid couples to a cooling and/or temperature management system for the ESM 10900, for a system including the ESM 10900, and/or for a related application to the ESM 10900. For example, a hybrid vehicle utilizing the ESM 10900 may include a cooling system, where the cooling system of the hybrid vehicle can include the ESM 10900 in the coolant loop for active temperature control.

Again referencing FIG. 38, the ESM 10900 includes a housing support 10904, depicted schematically as a corner support fin, which may promote heat transfer, desired fluid flow of the dielectric fluid during certain operating conditions or regimes, and/or structural support and/or stiffness of the housing 10900. A housing support 10904 may be positioned inside the housing 10908 or outside the housing (or both, if the support forms a part of the housing wall and/or passes through the housing wall). The example ESM 10900 further includes a pump 10902, which may be a passive or automatic device (e.g., always operating during ESM 10900 operations, which may be at a constant speed and/or at a variable speed, such as a speed related to a speed of the ESM 10900), or may be a controlled device (e.g., responsive to commands from a controller 6200). Example operations of the pump 10902 include circulation of the dielectric fluid (e.g., to support fluid bearing operations—e.g., reference FIG. 6 and the related description, to support heat transfer into the dielectric fluid and/or to the housing and/or thermal fluid jacket, and/or to support fluid flow within the ESM 10900, for example to reduce a fluid dynamic force experienced by plate of the capacitive stack 702). In certain embodiments, the pump 10902 may be controlled responsive to one or more of these goals—for example responsive to a temperature of the dielectric fluid and/or a parameter representative of heat generation in the ESM 10900 (e.g., based on power throughput, back mmf loss values, etc.).

Figure 39:
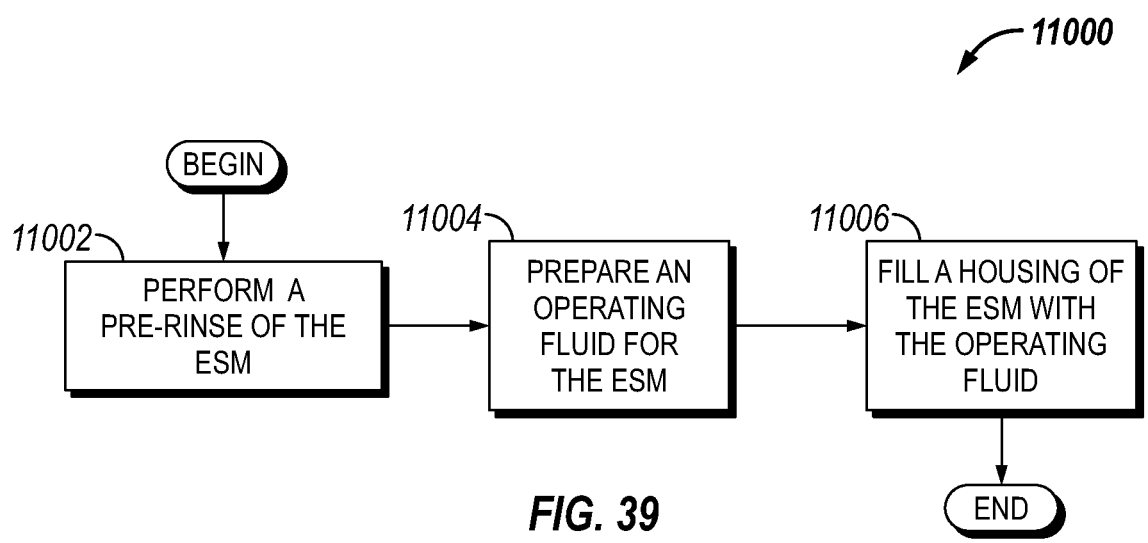
FIG. 39 is a schematic flow diagram of a procedure for filling a housing with operating fluid operation for an electrostatic motor.

Referencing FIG. 39, an example procedure 11000 for filling a housing of an ESM with an operating fluid is schematically depicted. The example procedure 11000 includes an operation 11002 to perform a pre-rinse of an ESM. Without limitation to any other aspect of the present disclosure, example operations 11002 include any operations described in reference to FIGS. 96 and 97. The example procedure 11000 further includes an operation 11004 to prepare an operating fluid for the ESM. Without limitation to any other aspect of the present disclosure, example operations 11004 include any operations described in reference to FIGS. 98, 99, and 101-107. The example procedure 11000 further includes an operation 11006 to fill a housing of the ESM with the operating fluid.

Without limitation to any other aspect of the present disclosure, an example operating fluid includes a combination of fluids (e.g., selected from various base fluid compositions and/or dielectric fluids) selected to provide a permittivity performance corresponding to a temperature range of interest. For example, two fluids having distinct permittivity curves with temperature may be combined to provide a selected permittivity value or range for the combination over a range of operating temperatures. An example operation 11992 includes performing a rinse of the ESM housing with a base fluid, which may be a base fluid compatible with the operating fluid, and/or a base fluid having a same composition, or a shared composition, with a base fluid composition of the operating fluid. In certain embodiments, operation 11002 includes removing the rinse fluid after performing the rinse operation. In certain embodiments, operation 11006 includes performing a final fill of the ESM housing by topping up the fluid with all or a portion of the rinse fluid remaining in the ESM.

Figure 40:
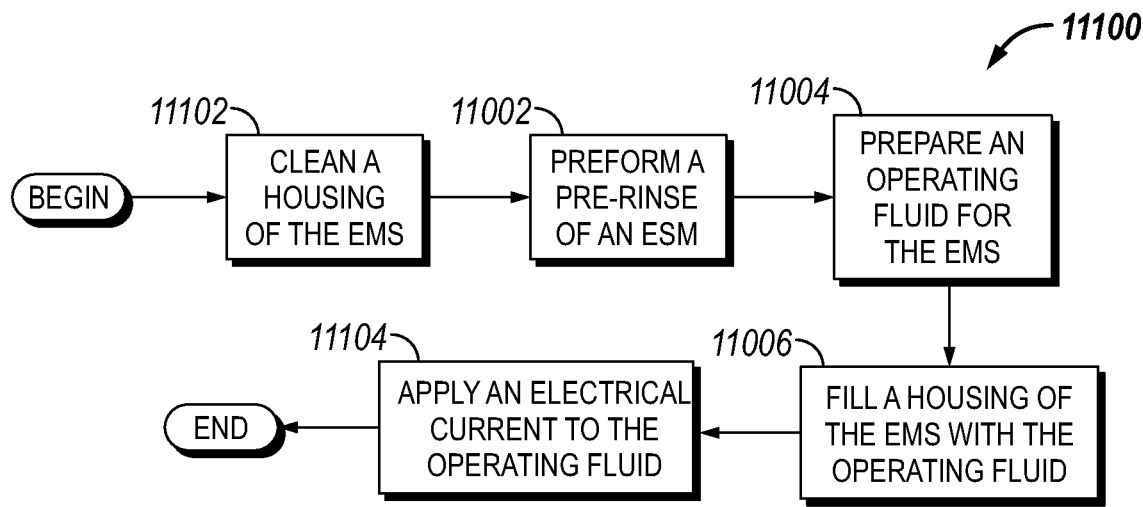
FIG. 40 is a schematic flow diagram of a procedure for filling a housing with operating fluid operation for an electrostatic motor.

Referencing FIG. 40, an example procedure 11100 for preparing a filled ESM for operational service is schematically depicted. The example procedure 11100 may be performed additionally to the procedure 11000 of FIG. 39. The example procedure 11100 includes an operation 11102 to clean a housing of the ESM, which may include physically removing debris, and/or polishing one or more surfaces within the ESM (e.g., electrodes, plate surfaces, and/or an inner housing surface). The example procedure 11100 includes an operation 11104 to apply an electrical current to the operating fluid. The example operation 11104 is described in relation to providing an electrical current to the operating fluid, which may be provided as a constant current, a constant voltage, a constant power, and/or any of these provided within a selected range. In certain embodiments, the operating fluid will exhibit a background or leakage current behavior, where if the applied electrical energy (e.g., current, voltage, and/or power) does not exceed the background or leakage current, the operating fluid will not be conditioned and accordingly the exhibited resistivity of the fluid will not progress. Accordingly, without limitation to any other aspect of the present disclosure, operation 11104 may include one or more operations such as: ensuring that an applied electrical energy exceeds a background or leakage current value; and/or ensuring that the applied electrical energy is sufficient to condition the operating fluid (e.g., observing the conditioning progress of the operating fluid, and increasing the applied electrical energy until a conditioning response is observed).

Example operations 11104 include operating in a constant voltage mode, where the starting current value exceeds the background or leakage current value. The current value will fall as the operating fluid is conditioned, and the operation 11104 is continued until the rated leakage current value is achieved at the rated voltage value. In certain embodiments, in the constant voltage mode, the applied voltage is started at a high voltage value (e.g., close to and/or above a rated voltage value), to ensure the leakage current value is exceeded, and the voltage thereafter modulated as the operating fluid conditions (e.g., increasing toward the rated voltage, and/or reduced below the rated voltage after an initial period, and increased again toward the rated voltage). In certain embodiments, in the constant voltage mode, the applied voltage is provided at a low level (e.g., 5%, 10%, 25% of the rated voltage, etc.) and stepped up in stages (and/or continuously) until the rated leakage current value is achieved at the rated voltage value. In certain embodiments, operations 11104 are responsive to the conditioning response of the operating fluid, and the applied voltage may be increased if the operating fluid does not exhibit a conditioning response (e.g., according to a change in the exhibited resistivity of the operating fluid), including, for example, where the background or leakage current value is unknown or variable.

Example operations 11104 include operating in a constant current mode, where the starting current is selected at a higher value than the rated leakage current value. In the constant current mode, the terminal voltage is observed, and the applied current is maintained until the terminal voltage reaches the full rated voltage. The applied starting current may be selected as a ratio of 1×+ (e.g., approaching the rated leakage current value), 5×, 10×, 50×, 100×, and/or 500× of the rated leakage current value. In certain embodiments, operations 11104 are responsive to the conditioning response of the operating fluid, and the applied current may be increased if the operating fluid does not exhibit a conditioning response (e.g., according to a change in the exhibited resistivity of the operating fluid), including, for example, where the background or leakage current value is unknown or variable.

An example operation 11104 includes applying the current by modulating an applied voltage value to maintain a selected current value through the operating fluid, wherein the selected current value exceeds a specified leakage current (e.g., a rated leakage current value) of the electrostatic machine corresponding to a rated voltage value (e.g., a rated voltage of the ESM, and/or a value at which the specified leakage current is determined). An example operation 11104 includes applying the selected current value until the applied voltage value (e.g., to maintain the selected current value) reaches the rated voltage value at which the specified leakage current of the machine is defined. An example operation 11104 includes applying the electrical current to the operating fluid by monitoring an apparent resistivity of the operating fluid, and applying the electrical current in response to the monitored apparent resistivity of the operating fluid. An example operation includes applying the electrical current until a predetermined monitored apparent resistivity value is present in the operating fluid, An example operation includes applying the electrical current until the monitored apparent resistivity exceeds $10^7$ Ω-m.

In certain embodiments, operation 11104 to apply an electrical current (and/or voltage) to the operating fluid is performed without operating the ESM, for example, an external current supply (and/or voltage supply) may be provided to the operating fluid by direct contact, which improves the initial operational performance of the ESM. Example operations 11104 to apply an electrical current to the operating fluid include operations to pass an electrical current through the operating fluid for a period of time. In certain embodiments, the current is passed through the operating fluid at a selected current value or range—for example 10 mA to 500 mA. The selected current value or range will vary widely according to the composition of the operating fluid (e.g., base fluid, and/or including additives), the size and/or arrangement of the ESM, and the desired time for completion of the operation 11104. A small ESM may utilize a small current—for example, a current in the range of μA (e.g., Amps$^{-6}$) or even pA (e.g., Amps$^{-12}$) may be sufficient. For large ESMs, for example due to the large conducting surface area through a high operating fluid volume, current values may approach and/or exceed an Amp, and may be several Amps for very large systems, especially upon initial application of current. The operating fluid will gain effective resistance over time as the current is applied. Accordingly, in certain embodiments, operation 11104 includes modulating a voltage of the applied current to maintain the applied current within a selected range and/or at a selected value. The example operation 11104 includes applying the current for a specified time period, and/or until the operating fluid exhibits a target effective resistance value (e.g., until the applied modulated voltage to achieve the selected current value or range reaches a specified threshold value). In certain embodiments, operation 11104 includes selecting a target current value based on an indicated and/or rated current value of the ESM. In certain embodiments, the indicated and/or rated current value of the ESM is not an actual current utilized by the ESM during operations, or at least not a current value ordinarily utilized by the ESM during operations. In certain embodiments, the indicated current value is determined from a power throughput and an effective voltage of the ESM—for example where the ESM has a rated power output of 1 kW, and the field voltage within the ESM has an amplitude of 500V, then an indicated and/or rated current value of the ESM may be determined to be about 2A. The actual determination of the field voltage may be based upon a voltage provided by the field voltage supply (e.g., DC voltage supplied to rotor electrodes), a magnitude of the fundamental of the stator voltage (e.g., $V_s$, reference U.S. Pat. No. 9,960,719), or by any other description of the field strength of the ESM. The specific determination of the effective voltage is not crucial, as the operation 11104 provides an electrical stress on the operating fluid that is a fraction, although a potentially significant fraction, of the electrical stress on the operating fluid that will be experienced during powering operations of the ESM. Accordingly, an estimated effective voltage is robust to several different determination methods, a broad range of which will sufficiently achieve the operating fluid conditioning for operation 11104. An example operation 11104 targets a current value, without limitation, in a range such as: at least 1% of a rated current value of the ESM; between 0.1% and 5%, inclusive, of a rated current value of the ESM; at least 5% of a rated current value of the ESM; and/or at least 10% of a rated current value of the ESM. Additionally or alternatively, an example operation 11104 targets the modulated voltage to be applied in a range based on the effective voltage of the ESM, for example at least 1% of the effective voltage, at least 5% of the effective voltage, at least 10% of the effective voltage, at least 15% of the effective voltage, at least 35% of the effective voltage, and/or at least 50% of the effective voltage. In certain embodiments, the targeted modulated voltage is utilized as a limit to the applied voltage. In certain embodiments, the targeted modulated voltage is utilized to set a range for the modulated voltage (e.g., a range including the targeted modulated voltage, centered on the targeted modulated voltage, a range having an averaging description, such as a logarithmic mean and/or geometric mean based on the targeted modulated voltage). One of skill in the art, having the benefit of the present disclosure and information ordinarily available about a particular system, can readily determine parameters for the operation 11104 that will effectively condition the operating fluid. In certain embodiments, for example where consistently configured ESMs are provided over a period of time, sequential operations 11104 on a series of the ESMs can be tuned for appropriate parameters for operation 11104. In certain embodiments, a rated current value of the ESM is determined in response to a peak current value of a current source inverter supplying excitation power to at least one of a rotor stack or a stator stack (typically, the stator stack) of the ESM. In certain embodiments, a rated current value of the ESM is determined in response to one or more of a rated power value, a rated torque value, and/or a rated voltage value of the ESM. In certain embodiments, operation 11104 is applied until the applied voltage is equal to a selected voltage (e.g., a rated voltage) at a selected current (e.g., the background or leakage current). In certain embodiments, operation 11104 is applied until the applied current is equal to a selected current (e.g., the background or leakage current) at a selected voltage (e.g., a rated voltage).

Figure 41:
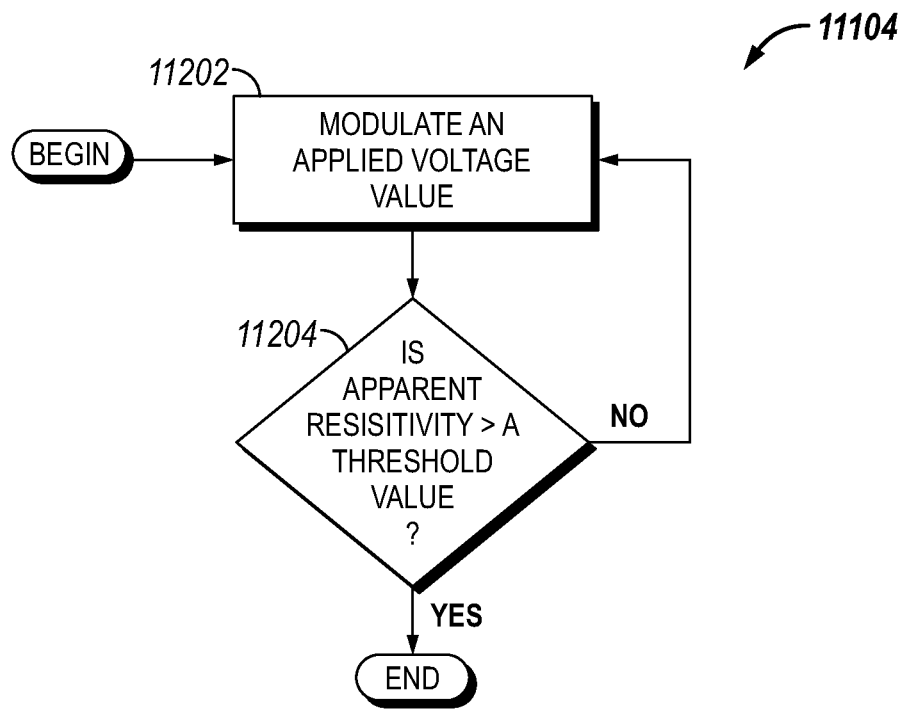
FIG. 41 is a schematic flow diagram of a procedure for modulating an applied voltage for an electrostatic motor.

Referencing FIG. 41, an example procedure 11104 to apply an electrical current to the operating fluid is schematically depicted. The example procedure 11104 includes an operation 11202 to modulate an applied voltage (and/or applied current or applied power), where the applied voltage is provided to an operating fluid positioned in an ESM. The example procedure 11104 includes an operation 11204 to determine whether an apparent resistivity (and/or permittivity) of the operating fluid is greater than a threshold value, where the threshold value is selected such that the operating fluid is conditioned when the threshold value is reached (or before—e.g., to provide some seasoning margin). In response to operation 11204 indicating NO, procedure 11104 continues with operation 11202 to modulate the applied voltage value. In response to operation 11204 indicating YES, procedure 11104 concludes.

In certain embodiments, operation 11004 to prepare an operating fluid for the ESM includes performing a water removal operation on the operating fluid, for example and without limitation, in accordance with any aspects as set forth in relation to FIGS. 106-107. Additionally or alternatively, operation 11004 includes one or more of an operation to remove dissolved gasses in the operating fluid (e.g., reference FIGS. 101-104 and the related description), an operation to load the operating fluid with a preferential gas (e.g., reference FIG. 33 and the related description), and/or an operation to perform a vacuum soak operation on the filled ESM and/or the operating fluid (e.g., reference FIGS. 98-99 and the related description).

In certain embodiments, operations of procedure 11104 may be performed as part of operations to perform a rinse operation (e.g., FIGS. 96-97 and the related description), which may be performed on the electrode separation fluid either before filling the housing (e.g., to condition the fluid) and/or after filling the housing (e.g., to condition exposed portions of the ESM, such as electrodes, plates, seals, bearing, etc., for example where any reacted contaminants are removed with the rinse fluid). In certain embodiments, operations of procedure 11104 may be performed as a service or maintenance event (e.g., to condition the fluid after replacement into the ESM, to refurbish, recover, and/or recycle the fluid), and/or as a part of a fluid upgrade and/or replacement (e.g., treating the new fluid, and/or rinsing with a conditioned fluid before replacing the fluid).

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions, and the like. The processor may be or include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM, and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. An electrostatic machine comprising:
a plurality of stator plates, each comprising a stator electrode, and rotationally fixed to a housing;
a shaft at least partially defined within the housing and configured to rotate about an axis;
a plurality of rotor plates, each comprising a rotor electrode, and rotationally fixed to the shaft;
a dielectric fluid disposed in the housing, and that fills a gap between the plurality of stator plates and the plurality of rotor plates;
at least one seal associated with the shaft; and
wherein the at least one seal comprises a material compatible with the dielectric fluid at an operating temperature of the electrostatic machine.

2. The electrostatic machine of claim 1, wherein the at least one seal comprises a first material encapsulated in a second material, wherein the second material is compatible with the dielectric fluid.

3. The electrostatic machine of claim 1, wherein the at least one seal comprises a fluorinated ethylene propylene.

4. The electrostatic machine of claim 1, wherein the at least one seal comprises a virgin polytetrafluoroethylene.

5. The electrostatic machine of claim 1, wherein the at least one seal comprises polytetrafluoroethylene/polyetherimide.

6. The electrostatic machine of claim 1, wherein the at least one seal comprises a high density terpolymer comprising ethylene, tetrafluoroethylene, and perfluoromethyl vinyl ether monomers.

7. The electrostatic machine of claim 1, wherein the at least one seal comprises a perfluoroelastomer.

8. The electrostatic machine of claim 1, further comprising a second seal associated with an electrical coupling between an exciter fluidly isolated from the dielectric fluid and at least one of the stator plates or the rotor plates, and wherein the second seal comprises a material compatible with the dielectric fluid.

9. The electrostatic machine of claim 8, wherein the second seal comprises a cured potting material.

10. The electrostatic machine of claim 1, wherein the at least one seal comprises a liquid seal.

11. The electrostatic machine of claim 10, wherein the liquid seal comprises a ferrofluid.

12. The electrostatic machine of claim 1,
wherein the dielectric fluid comprises a dielectric fluid base and at least one additive.

13. The electrostatic machine of claim 12, wherein the dielectric fluid comprises at least one base fluid selected from the fluids consisting of: a ketone, an ester, or a carbonate.

14. The electrostatic machine of claim 12, wherein the dielectric fluid comprises at least one base fluid selected from the fluids consisting of: isoamyl isovalerate, hexyl isobutyrate, diethyl ethyl malonate, a malonate, delta-nonalactone, or a lactone.

15. The electrostatic machine of claim 12, wherein the dielectric fluid comprises at least one base fluid selected from the fluids consisting of: a propylene carbonate-based fluid composition an oxalate an amide an imide or a lactam.

16. The electrostatic machine of claim 12, wherein the at least one additive comprises a free radical scavenger.

17. The electrostatic machine of claim 16, wherein the free radical scavenger comprises at least one compound selected from among: butylated hydroxytoluene, butylated hydroxyanisole, tertiary-butylhydroquinone, gallate, or a phenolic antioxidant.

18. The electrostatic machine of claim 12, wherein the at least one additive comprises a contamination scavenger.

19. The electrostatic machine of claim 18, wherein the contamination scavenger comprises at least one of an organo-metallic compound, trimethyl (phenyl) tin, or a bismuth organo-metallic.

20. The electrostatic machine of claim 12, wherein the at least one additive comprises barium titanate.

21. The electrostatic machine of claim 12, wherein the at least one additive comprises a water scavenger.

22. The electrostatic machine of claim 21, wherein the water scavenger comprises at least one compound selected from among: an oxazolidine, a monomeric isocyanate, and an alkoxysilane.

23. The electrostatic machine of claim 21, wherein the water scavenger comprises at least one compound selected from among: $CaCl$, $CaSO_4$, Copper (II) Sulfate, $LiAlH_4$, $MgSO_4$, phosphorous pentoxide, potassium carbonate, a silica gel, a monomeric isocyanate, and an alkoxysilane.

24. The electrostatic machine of claim 21, wherein the water scavenger comprises a molecular sieve provided in fluid contact with the dielectric fluid.

25. The electrostatic machine of claim 21, wherein the water scavenger is provided as an additive in fluid contact with the dielectric fluid.

26. The electrostatic machine of claim 12, wherein the at least one additive comprises a coated metal oxide.

27. The electrostatic machine of claim 12, wherein each of the at least one additive is present in an amount between 1 ppm and 1% by weight.

28. The electrostatic machine of claim 12, wherein the at least one additive comprises a coated metal oxide.

29. An electrostatic machine comprising:
a plurality of stator plates, each comprising a stator electrode, and rotationally fixed to a housing;
a shaft at least partially defined within the housing and configured to rotate about an axis;
a plurality of rotor plates, each comprising a rotor electrode, and rotationally fixed to the shaft;
a dielectric fluid disposed in the housing, and that fills a gap between the plurality of stator plates and the plurality of rotor plates;
at least one seal associated with the shaft; and
wherein the at least one seal comprises a first material encapsulated in a second material, wherein the second material is compatible with the dielectric fluid.

30. The electrostatic machine of claim 29, wherein the at least one seal comprises a fluorinated ethylene propylene.

31. The electrostatic machine of claim 29, wherein the at least one seal comprises a virgin polytetrafluoroethylene.

32. The electrostatic machine of claim 29, wherein the at least one seal comprises polytetrafluoroethylene/polyetherimide.

33. The electrostatic machine of claim 29, wherein the at least one seal comprises a high density terpolymer comprising ethylene, tetrafluoroethylene, and perfluoromethyl vinyl ether monomers.

34. The electrostatic machine of claim 29, wherein the at least one seal comprises a perfluoroelastomer.

35. The electrostatic machine of claim 29, further comprising a second seal associated with an electrical coupling between an exciter fluidly isolated from the dielectric fluid and at least one of the stator plates or the rotor plates, and wherein the second seal comprises a material compatible with the dielectric fluid.

36. The electrostatic machine of claim 35, wherein the second seal comprises a cured potting material.

37. The electrostatic machine of claim 29, wherein the at least one seal comprises a liquid seal.

38. The electrostatic machine of claim 37, wherein the liquid seal comprises a ferrofluid.

39. An electrostatic machine comprising:
a plurality of stator plates, each comprising a stator electrode, and rotationally fixed to a housing;
a shaft at least partially defined within the housing and configured to rotate about an axis;
a plurality of rotor plates, each comprising a rotor electrode, and rotationally fixed to the shaft;
a dielectric fluid disposed in the housing, and that fills a gap between the plurality of stator plates and the plurality of rotor plates;
at least one seal associated with the shaft;
wherein the at least one seal comprises a material compatible with the dielectric fluid; and
a second seal associated with an electrical coupling between an exciter fluidly isolated from the dielectric fluid and at least one of the stator plates or the rotor plates, and wherein the second seal comprises a material compatible with the dielectric fluid.

40. The electrostatic machine of claim 39, wherein the at least one seal comprises a fluorinated ethylene propylene.

41. The electrostatic machine of claim 39, wherein the at least one seal comprises a virgin polytetrafluoroethylene.

42. The electrostatic machine of claim 39, wherein the at least one seal comprises polytetrafluoroethylene/polyetherimide.

43. The electrostatic machine of claim 39, wherein the at least one seal comprises a high density terpolymer comprising ethylene, tetrafluoroethylene, and perfluoromethyl vinyl ether monomers.

44. The electrostatic machine of claim 39, wherein the at least one seal comprises a perfluoroelastomer.

45. The electrostatic machine of claim 39, wherein the second seal comprises a cured potting material.

46. The electrostatic machine of claim 39, wherein the at least one seal comprises a liquid seal.

47. The electrostatic machine of claim 46, wherein the liquid seal comprises a ferrofluid.

* * * * *

UNITED STATES PATENT AND TRADEMARK OFFICE
CERTIFICATE OF CORRECTION

PATENT NO. : 11,742,779 B2
APPLICATION NO. : 17/141193
DATED : August 29, 2023
INVENTOR(S) : Reed et al.

It is certified that error appears in the above-identified patent and that said Letters Patent is hereby corrected as shown below:

In the Specification

In Column 15, Line 60, delete "102" and insert --202-- therefor

In Column 27, Line 21, delete "d" and insert --dc-- therefor

In Column 41, Line 37, delete "LiAH$_4$," and insert --LiAlH$_4$,-- therefor

In Column 44, Line 22, delete "10002." and insert --1002.-- therefor

In Column 44, Line 24, delete "10002," and insert --1002,-- therefor

In Column 44, Line 31, delete "10002." and insert --1002.-- therefor

In Column 48, Line 44, delete "10604." and insert --10602.-- therefor

In Column 50, Line 30, delete "10900." and insert --10908.-- therefor

In the Claims

In Column 60, Line 30, in Claim 15, delete "composition an oxalate an amide an imide" and insert --composition, an oxalate, an amide, an imide,-- therefor Signed and Sealed this
Twenty-seventh Day of August, 2024

Katherine Kelly Vidal
*Director of the United States Patent and Trademark Office*